United States Patent
Green et al.

(10) Patent No.: US 9,311,410 B2
(45) Date of Patent: *Apr. 12, 2016

(54) SUBJECT MATTER CONTEXT SEARCH ENGINE

(71) Applicant: Oracle International Corporation, Redwood City, CA (US)

(72) Inventors: Edward A. Green, Englewood, CO (US); Kevin L. Markey, Longmont, CO (US); Mark Kreider, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,827

(22) Filed: Aug. 1, 2014

(65) Prior Publication Data

US 2015/0032712 A1    Jan. 29, 2015

Related U.S. Application Data

(63) Continuation of application No. 13/757,444, filed on Feb. 1, 2013, now Pat. No. 8,832,075, which is a continuation of application No. 10/970,372, filed on Oct. 21, 2004, now Pat. No. 8,396,859, which is a (Continued)

(51) Int. Cl.
  *G06F 17/30* (2006.01)
(52) U.S. Cl.
  CPC ...... *G06F 17/30864* (2013.01); *G06F 17/3064* (2013.01); *G06F 17/30598* (2013.01)
(58) Field of Classification Search
  None
  See application file for complete search history.

(56) References Cited

U.S. PATENT DOCUMENTS

| 4,141,005 A | 2/1979 | Bonner et al. |
| 5,442,782 A | 8/1995 | Malatesta et al. |
| 5,621,859 A | 4/1997 | Schwartz et al. |
| 5,664,206 A | 9/1997 | Murow et al. |
| 5,680,511 A | 10/1997 | Baker et al. |
| 5,778,213 A | 7/1998 | Shakib et al. |
| 5,845,283 A | 12/1998 | Williams et al. |
| 5,903,859 A | 5/1999 | Stone et al. |
| 5,987,401 A | 11/1999 | Trudeau |

(Continued)

OTHER PUBLICATIONS

Erhard Rahm, Philip A. Bernstein, A survey of approaches to automatic schema matching, the VLDB Journal—The International Journal on Very Large Data Bases, v. 10 n.4, p. 334-350, Dec. 2001.

(Continued)

*Primary Examiner* — Son T Hoang
(74) *Attorney, Agent, or Firm* — Marsh Fischmann & Breyfogle LLP

(57) ABSTRACT

A search system associates contextual metadata with search terms and/or stored terms to facilitate identification of relevant information. In one implementation, a search term is identified (4304) from a received search request. The search term is then rewritten (4306) in standard form and the standard form term is then set (4308) as the current search parameter. A source database is then searched (4310) using the current search parameter. If any results are obtained (4312) these results may be output (4320) to the user. If no results are obtained, a parent classification of the search term is set (4316) as the current search parameter and the process is repeated. The invention thereby provides the ease of use of term searching with the comprehensiveness of category searching.

7 Claims, 40 Drawing Sheets

Related U.S. Application Data continuation-in-part of application No. 10/931,789, filed on Sep. 1, 2004, now Pat. No. 7,865,358, which is a continuation-in-part of application No. 10/663,339, filed on Sep. 16, 2003, now Pat. No. 7,225,199, which is a continuation-in-part of application No. 09/892,204, filed on Jun. 26, 2001, now Pat. No. 6,986,104.

(60) Provisional application No. 60/214,090, filed on Jun. 26, 2000.

(56) References Cited

U.S. PATENT DOCUMENTS

| | | | |
|---|---|---|---|
| 5,991,751 | A | 11/1999 | Rivette et al. |
| 6,023,694 | A * | 2/2000 | Kouchi et al. ............ 707/770 |
| 6,035,121 | A | 3/2000 | Chiu et al. |
| 6,092,036 | A | 7/2000 | Hamann |
| 6,122,647 | A | 9/2000 | Horowitz et al. |
| 6,151,575 | A | 11/2000 | Newman et al. |
| 6,263,329 | B1 * | 7/2001 | Evans ............ G06F 17/30 |
| 6,266,094 | B1 | 7/2001 | Taylor, Jr. |
| 6,275,789 | B1 | 8/2001 | Moser et al. |
| 6,330,530 | B1 | 12/2001 | Horiguchi et al. |
| 6,345,243 | B1 | 2/2002 | Clark |
| 6,356,865 | B1 | 3/2002 | Franz et al. |
| 6,366,910 | B1 | 4/2002 | Rajaraman et al. |
| 6,393,415 | B1 | 5/2002 | Getchius et al. |
| 6,424,983 | B1 | 7/2002 | Schabes et al. |
| 6,453,312 | B1 | 9/2002 | Goiffon et al. |
| 6,546,406 | B1 | 4/2003 | DeRose et al. |
| 6,564,213 | B1 | 5/2003 | Ortega et al. |
| 6,598,039 | B1 | 7/2003 | Livowsky |
| 6,642,946 | B1 | 11/2003 | Janes et al. |
| 6,820,041 | B2 | 11/2004 | Royal, Jr. et al. |
| 6,829,759 | B1 | 12/2004 | Davis et al. |
| 7,058,643 | B2 | 6/2006 | Vailaya |
| 7,149,745 | B2 | 12/2006 | Janssen |
| 7,158,986 | B1 | 1/2007 | Oliver et al. |
| 7,225,199 | B1 | 5/2007 | Green et al. |
| 7,353,296 | B2 | 4/2008 | Nuuttila |
| 7,392,483 | B2 | 6/2008 | Wong et al. |
| 7,496,838 | B2 | 2/2009 | Salter et al. |
| 7,506,324 | B2 | 3/2009 | Thiagarajan et al. |
| 2001/0029455 | A1 | 10/2001 | Chin et al. |
| 2001/0032217 | A1 | 10/2001 | Huang |
| 2002/0035583 | A1 | 3/2002 | Price et al. |
| 2002/0040359 | A1 | 4/2002 | Green et al. |
| 2003/0037173 | A1 | 2/2003 | Pace et al. |
| 2003/0063120 | A1 | 4/2003 | Wong et al. |
| 2003/0212569 | A1 | 11/2003 | Casati et al. |
| 2004/0034615 | A1 | 2/2004 | Thomson et al. |
| 2004/0059705 | A1 | 3/2004 | Wittke et al. |
| 2004/0117352 | A1 | 6/2004 | Schabes et al. |
| 2004/0148571 | A1 | 7/2004 | Lue |
| 2004/0172484 | A1 | 9/2004 | Hafsteinsson et al. |
| 2005/0131751 | A1 | 6/2005 | Ahlers et al. |
| 2005/0160434 | A1 | 7/2005 | Tan et al. |
| 2005/0232046 | A1 | 10/2005 | Mamou et al. |
| 2005/0251742 | A1 | 11/2005 | Mogilevsky et al. |
| 2005/0288920 | A1 | 12/2005 | Green et al. |
| 2006/0242197 | A1 | 10/2006 | Tsyganskiy et al. |
| 2006/0271843 | A1 | 11/2006 | Yarde et al. |
| 2007/0011134 | A1 | 1/2007 | Langseth et al. |
| 2007/0143327 | A1 | 6/2007 | Rivas et al. |
| 2007/0242821 | A1 | 10/2007 | Kim et al. |

OTHER PUBLICATIONS

Liu et al., "PENS: A Machine-Aided English Writing System", Proc. of 38th Annual Meeting on Assoc. For Computational Linguistics, Oct. 2000.

Milo T, Zohar S (1998), "Using schema matching to simplify heterogenous data translation" In: Proc 24th Int Conf on Very Large Data Bases, pp. 122-133.

Toole, J., Turcato, D., Popowich, F., Fass, D. and McFetridge, P. (1998). "Time-constrained machine Translation." In: AMTA (1998), 103-112.

* cited by examiner

◎ Information

Rule: [number], Domain: ROOT

This rule is referenced by the following rules:

[attr_Current] in domain ROOT
[attr_Frequency] in domain ROOT
[attr_Inductance] in domain ROOT
[attr_Pin_Count] in domain ROOT
[attr_Power] in domain ROOT
[attr_Resistance] in domain ROOT
[attr_Tolerance] in domain ROOT

FIG.32

```
>[product_resistor]
    ([resistor] [res_type] [resistance] [tolerance])
[resistor]
    (RES)
[res_type]
    ([variable])
    ([carbon_film])
[variable]
    (VAR)
[carbon_film]
    (CF)
[resistance]
    ([number] [ohms])
[ohms]
    (OHMS)
    (KOHMS)
[percent]
    /%/
    (PCT)
```

```
>[product_capacitor]
    ([capacitor] [cap_type] [capacitance] [tolerance])
[capacitor]
    (CAP)
[capacitance]
    ([number] [farads])
[farads]
    (pF)
    (uF)
[tolerance]
    ([number] [percent])
[cap_type]
    ([variable])
    ([ceramic])
[ceramic]
    ([CERAMIC])
[number]
    /\d+/
    /\d+\.\d+/
```

FIG.34

```
>[screw_variety]
    ([screw_head] [screw])
[screw_size]
    ([number][dash][number])
[dash]
    /-/
```

```
[screw]
    (SCREW)
[screw_head]
    (SLOT)
    (PHILLIPS)
```

FIG.35

SUBJECT MATTER CONTEXT SEARCH ENGINE

CROSS REFERENCE TO RELATED APPLICATIONS

This application is a continuation of U.S. patent application Ser. No. 13/757,444 entitled "Subject Matter Context Search Engine", which was filed on Feb. 1, 2013, which is a continuation of U.S. patent application Ser. No. 10/970,372 entitled "Subject Matter Context Search Engine", which was filed on Oct. 21, 2004, now U.S. Pat. No. 8,396,859 issued on Mar. 12, 2013, which is a continuation-in-part of U.S. patent application Ser. No. 10/931,789 entitled "Multi-User Functionality for Converting Data from a First Form to a Second Form", which was filed on Sep. 1, 2004, now U.S. Pat. No. 7,865,358 issued on Jan. 4, 2011, which is a continuation-in-part of U.S. patent application Ser. No. 10/663,339 entitled "Normalizing and Classifying Locale-Specific Information", filed on Sep. 16, 2003, now U.S. Pat. No. 7,225,199 issued May 29, 2007, which is a continuation-in-part of U.S. patent application Ser. No. 09/892,204 entitled "Method and Apparatus for Normalizing and Converting Structured Content", filed on Jun. 26, 2001, now U.S. Pat. No. 6,986,104 issued Jan. 10, 2006, which claims priority from U.S. Provisional Application Ser. No. 60/214,090 entitled "Business Information Localization System", filed on Jun. 26, 2000, all of which are hereby incorporated by reference in their entirety as if set forth in full herein.

FIELD OF THE INVENTION

The present invention relates generally to search systems for searching stored electronic information and, in particular, to such a system that associates contextual metadata with search terms and/or stored terms to facilitate identification of relevant information.

BACKGROUND OF THE INVENTION

Search engines are used in a variety of contexts to allow a user of a data terminal, e.g., a computer, PDA or data enabled phone, to search stored data for items of interest. For example, search engines are used for research, for on-line shopping, and for acquiring business information. The case of on-line catalog searching is illustrative. On-line sales are an increasingly important opportunity for many businesses. To encourage and accommodate on-line purchasing, some companies have devoted considerable resources to developing search tools that help customers identify products of interest. This is particularly important for businesses that have an extensive product line, for example, office supply companies.

One type of search engine is the product category search engine. To implement a product category search engine, the available products are grouped by categories and subcategories. A user can then enter a product category term, or select a term from a pull-down window or the like, to access a list of available products. These search engines are very useful for customers that have considerable experience or expertise by which to understand the structure of the product space at interest. However, in many cases, the product category may not be obvious or may not be the most convenient way to identify a product. For example, a customer wishing to purchase Post-It notes may not be able to readily identify the category in which that product is grouped or may not want to work through a series of menus to narrow a search down to the desired product.

In addition or as an alternative to product category searching, web-sites often accommodate keyword searching. To execute a keyword search, the user enters a term to identify the product-of-interest; often a trademark or portion of a trademark. A conventional search engine can then access a database to identify hits or, in some cases, near hits. This allows a customer with a particular product in mind to quickly identify the product, even if the customer can not or does not wish to identify the product category for that product.

Unfortunately, keyword searching can result in a failed search, even when products of potential interest are available. For example, a customer needing to order appointment books may enter the popular trademark "Daytimer." If Daytimer appointment books are not carried or are not currently available at the site, the search results may indicate that there is no match, even though other appointment books, e.g., At-A-Glance brand books, are available. This, of course is a lost sales opportunity for the business.

SUMMARY OF THE INVENTION

It has been recognized that there is a need for search logic that provides the ease-of-use of term searching with the comprehensiveness of category searching. Such search logic would be useful for catalog searching or other data system searching applications. In accordance with the present invention, a knowledge base is constructed by which item descriptor terms and/or potential search terms are associated with contextual information by which the search logic can associate such a term including a specific, colloquial or otherwise idiosyncratic term, with a subject matter context, so as to enable a more complete search to be performed and increase the likelihood of yielding useful results.

In accordance with one aspect of the present invention, a method and apparatus ("utility") are provided for use in establishing a searchable data structure where search terms are associated with a subject matter context. The searchable data structure may be, for example, a database system or other data storage resident on a particular machine or distributed across a local or wide area network. The utility involves providing a list of potential search terms pertaining a subject matter area of interest and establishing a classification structure for the subject matter area of interest. For example, the list of potential search terms may be an existing list that has been developed based on analysis of the subject matter area or may be developed by a subject matter expert or based on monitoring search requests pertaining to the subject matter of interest. Alternatively, the list may be drawn from multiple sources, e.g., starting from existing lists and supplemented by monitoring search requests. It will be appreciated that lists exist in many contexts such as in connection with pay-per-click search engines.

The classification structure preferably has a hierarchical form defined by classes, each of which includes one or more sub-classes, and so on. The utility further involves associating each of the potential search terms with the classification structure such that the term is assigned to at least one sub-class and a parent class. For example, such associations may be reflected in an XML tag structure or by any other system for reflecting such metadata structure. In this manner, search terms are provided with a subject matter context for facilitating searching. Thus, in the Daytimer example noted above, a search query including the term Daytimer may be interpreted so as to provide search results related more generally to appointment books. For example, such a search may be implemented iteratively such that the search system first seeks results matching "Daytimer" and, if no responsive information is available, proceeds to the next rung on the classification system, for example, "Appointment Books." Such iterations may be repeated until results are obtained or until a predetermined number iterations are completed, at which point the system may return an error message such as "no results found."

In accordance with another aspect of the present invention, similar context information may be provided to terms associated with the data to be searched or source data. The utility generally involves providing a list of source data terms defining a subject matter area of interest and establishing a classification structure for the source data terms. Again, the classification structure preferably has a hierarchical form including classes each of which includes one or more sub-classes, and so on. Each of the source terms is associated with the classification structure such that the source term is assigned to at least one of the sub-classes and an associated parent class. In this manner, context is provided in connection with source data to facilitate searching. Thus, for example, a search query including the term "Appointment Book" may retrieve source data pertaining to Daytimer products, even though those products' descriptors may not include the term "Appointment Book."

In a preferred implementation, a data structure is established such that both potential search terms and source data terms are associated with a classification structure. This allows specific items of source data to be matched to specific search terms based on a common subject matter context despite the lack of overlap between the specific search and source terms. Thus, for example, a search query including the term "Daytimer" may be associated with a classification "Appointment Books." Similarly, a data item associated with the trademark "At-A-Glance" may be associated with the subject matter classification "Appointment Books." Consequently, a search query including the term "Daytimer" may return search results including the "At-A-Glance" products of potential interest.

In accordance with a still further aspect of the present invention, a utility is provided for searching stored data using contextual metadata. The utility involves establishing a knowledge base for a given subject matter area, receiving a search request including a first descriptive term, accessing a source data collection using the knowledge base, and responding to the search request using the responsive information. The knowledge base defines an association between a term of the search request and an item of source data based on a classification within a context of the subject matter area. Such a classification may be associated with the search term and/or a source term. A search request may thereby be addressed based on a second matter context even though the search is entered based on specific search terms and the item of source data is associated with specific source terms. As will be set forth below, the knowledge base may optionally include additional information related to the subject matter area, such as a system of rules for standardizing terminology and syntax, i.e., a grammar.

In accordance with a still further aspect of the present invention, a data search is facilitated based on a standardization of terms utilized to execute the search. It has been recognized that term searches are complicated by the fact that searchers may enter terms that are misspelled, colloquial, or otherwise idiosyncratic. Similarly, source data may include jargon, abbreviations or other matter that complicates term matching. Accordingly, term searches can be facilitated by standardizing one or both of the search terms and source terms. For example, a user searching for Post-it notes may enter a colloquial term such as "sticky tabs." This term may be rewritten by a utility according to the present invention, as, for example, "adhesive notepad" or some other selected standard term. In addition, the term may be associated with a classification as discussed above. Similarly, a source collection, such as a catalog, may include a highly stylized entry for a Post-it note product such as "3-Pk, 3×3 PI notes (pop-up)—Asst'd." Such an entry may be rewritten to include standard terminology and syntax. In relevant part, the term "PI notes" may be rewritten as "Post-it notes" and may be associated with the classification "adhesive notepad." Thus, a first order classification of the source term matches the standardized search term, thereby facilitating retrieval of relevant information. As this example illustrates, such matching is not limited to matching of terms rewritten in standardized form or matching of classifications, but may involve matching a rewritten search term to a classification or vice-versa.

Such searching using a data structure of standardized terms and/or associated classifications, e.g., a knowledge base, may be used for a variety of contexts. For example, such functionality may facilitate searching of a web-site, product database or other data of an entity by an outside party. In this regard, it may be useful to associate a product or product descriptor with multiple, alternative classifications to accommodate various types of search strategies that may be employed. Thus, a knowledge base may be constructed such that the classification "pen" or specific pen product records are retrieved in response to a search query including "writing instruments" and "office gifts."

As a further example, such functionality may facilitate searching of multiple legacy databases, e.g., by an inside or outside party or for advanced database merging functionality. Oftentimes, an entity may have information related to a particular product, company or other subject matter in multiple legacy databases, e.g., a product database and an accounting database. These databases may employ different conventions, or no taut conventions, regarding linguistics and syntax for identifying common data items. This complicates searching using conventional database search tools and commands, and can result in incomplete search results. In accordance with the present invention, a defined knowledge base can be used to relate a search term to corresponding information of multiple legacy systems, e.g., so that a substantially free form search query can retrieve relevant information from the multiple legacy system despite differing forms of that information in those legacy environments.

In accordance with yet another aspect of the present invention, a searchable data system using contextual metadata is provided. The searchable data system includes an input port for receiving a search request including a search term, a first storage structure for storing searchable data defining a subject matter of the searchable data system, a second storage structure for storing a knowledge base, and logic for identifying the search term and using the knowledge base to obtain responsive information. The system further comprises an output port for outputting the responsive data, e.g., to the user or an associated network node. The knowledge base relates a potential search term to a defined classification structure of the subject matter of the searchable data system. For example, the classification structure may include classes, sub-classes and so on to define the subject matter to a desired granularity. The logic then uses the knowledge base to relate the search term to a determined classification of the classification structure and, in turn, uses the determined classification to access the first storage structure to obtain the responsive data.

BRIEF DESCRIPTION OF THE DRAWINGS

For a more complete understanding of the present invention and further advantages thereof, reference is now made to the following detailed description taken in conjunction with the drawings, in which:

FIGS. 5-10 are demonstrative monitor screen shots illustrating normalization and translation processes in accordance with the present invention;

FIGS. 23-35 are sample user interface screens illustrating transformation information sharing functionality in accordance with the present invention;

DETAILED DESCRIPTION

In the following description, the invention is set forth in the context of a search system involving standardization of source and search terms, and the association of classification information with both source terms and search terms. Specific examples are provided in the environment of business information, e.g., searching a website or electronic catalog for products of interest. Although this particular implementation of the invention and this application environment is useful for illustrating the various aspects of the invention, it will be appreciated that the invention is more broadly applicable to a variety of application environments and searching functions. In particular, various aspects of the invention as set forth above may be beneficially used independent of others of these aspects and are not limited to combinative uses as set forth in the discussion that follows.

The discussion below begins by describing, at a functional and system component level, a search system constructed in accordance with the present invention. This description is contained in Section I. Thereafter, in Sections II et seq., the underlying framework for term standardization, classification and transformation is described in greater detail.

Generally, the search system of the present invention is operable in two modes; the setup mode and the use mode. In the setup mode, the user, generally a subject matter expert as will be described below, performs a number of functions including accessing lists of potential search terms and/or source terms, developing a standardized set or set of terms, establishing a classification structure, associating the standardized terms with the classification structure and selectively transforming (e.g., translating) the terms as necessary.

Figure 37:
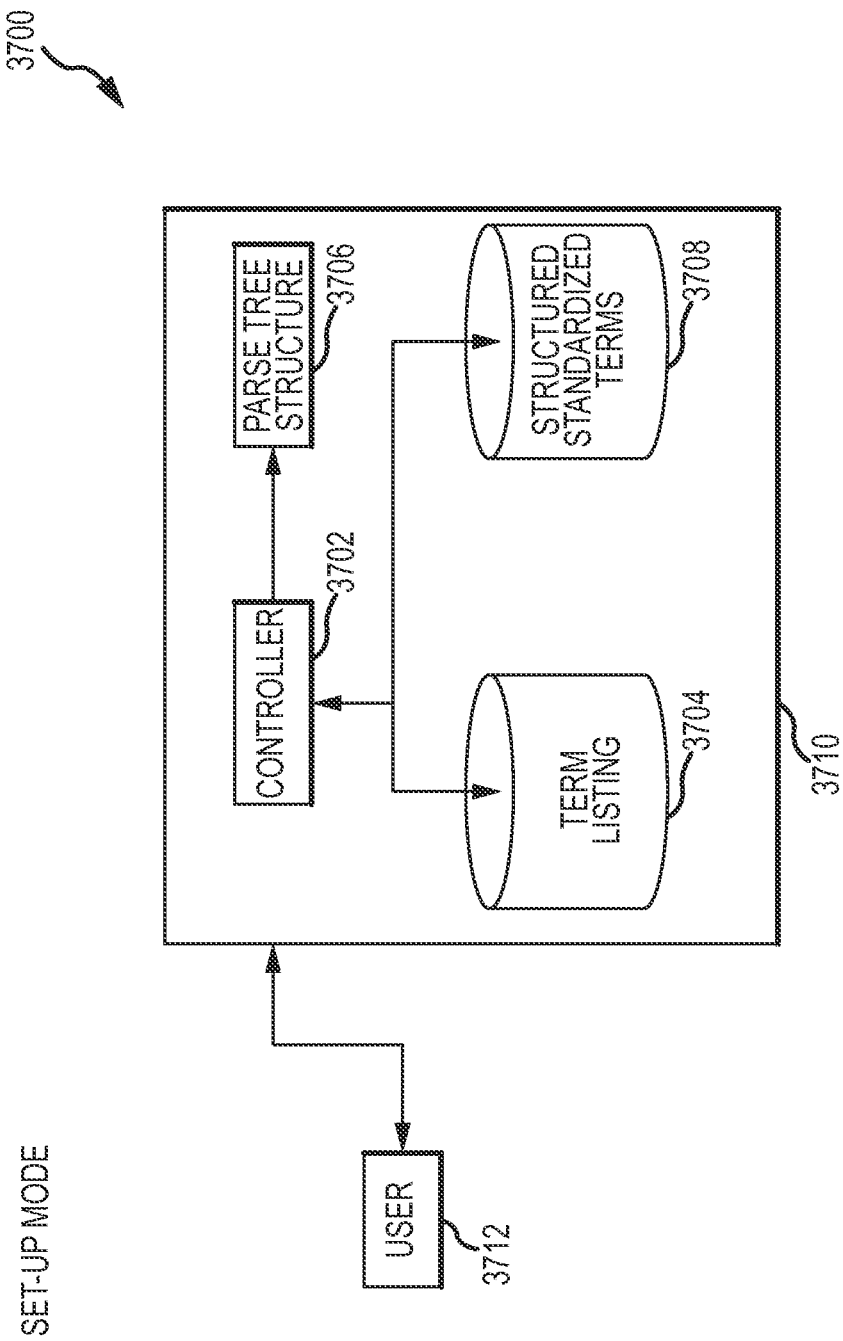
FIG. 37 is a schematic diagram of a search system in accordance with the present invention operating in the startup mode.

FIG. 37 is a schematic diagram of a search system 3700, in accordance with the present invention, operating in the startup mode. Generally, the system 3700 includes a controller 3702 and storage configured to store a term listing 3704, a parse tree structure 3706 and a set of structured standardized terms 3708. Although the system 3700 is illustrated as being implemented on a single platform 3710, it will be appreciated that the functionality of the system 3700 may be distributed over multiple platforms, for example, interconnected by a local or wide area network.

The user 3712 uses the controller 3702 to access a previously developed parse tree structure 3706 or to develop the structure 3706. In this regard, the parse tree structure 3706 generally defines a number of classifications, each generally including one or more sub-classifications that collectively define the subject matter area. Examples will be provided below. The number of layers of classifications and sub-classifications will generally be determined by the user 3712 and is dependent on the nature of the subject matter. In many cases, many such classifications will be available, for example, corresponding to headings and subheadings of a catalog or other pre-existing subdivisions of a subject matter of interest. In other cases, the subject matter expert may develop the classifications and sub-classifications based on an analysis of the subject matter.

The user can then use the controller 3702 to access a term listing 3704 to be processed. As noted above, such a term listing 3704 may include potential search terms, source terms or both from a source data collection or both. In the case of potential search terms, the terms may be obtained from a pre-existing list or may be developed by the user 3712. For example, the potential search terms may be drawn from a stored collection of search terms entered by users in the context of the subject matter of interest. Additional sources may be available, in a variety of contexts, for example, lists that have been developed in connection with administering a pay-per-click search engine. The list may be updated over time based on monitoring search requests. Similarly, the source term listing may be previously developed or may be developed by the user 3712. For example, in the context of online shopping applications, the source listing may be drawn from an electronic product catalog or other product data base.

After accessing the term listing, the user may perform a number of functions including standardization and classification. Standardization refers to mapping of terms from the term listing 3704 to a second set, generally a smaller set, of standardized terms. In this manner, misspellings, abbreviations, colloquial terms, synonyms, different linguistic/syntax conventions of multiple legacy systems and other idiosyncratic matter can be addressed such that the list of standardized terms is substantially reduced in relation to the original term listing 3704. It will be appreciated from the discussion below that such standardization facilitates execution of the searching functionality as well as transformation functions as may be desired in some contexts, e.g., translation.

The resulting list of standardized terms can then be mapped to the parse tree structure 3706. As will be described below, this can be executed via a simple drag and drop operation on a graphical user interface. Thus, an item from a source listing, for example, identifying a particular Post-it note product, may be associated with an appropriate base level classification, for example, "Adhesive Notepad." Similarly, a term from a potential search term listing such as "Sticky Pad" may be associated with the same base level classification. It will be appreciated that a given term may be associated with more than one base level classification, a given base level classification may be associated with more than one parent classification, etc.

As noted above, such a base level classification may be associated with a parent classification, grandparent classification, etc. All of these relationships are inherited when the term under consideration is associated with a base level classification. The result is that the standardized term is associated with a string of classes and sub-classes of the parse tree structure 3706. For example, these relationships may be reflected in an XML tag system or other metadata representation associated with the term. The resulting structured standardized terms are then stored in a storage structure 3708 such as a database.

Figure 38:
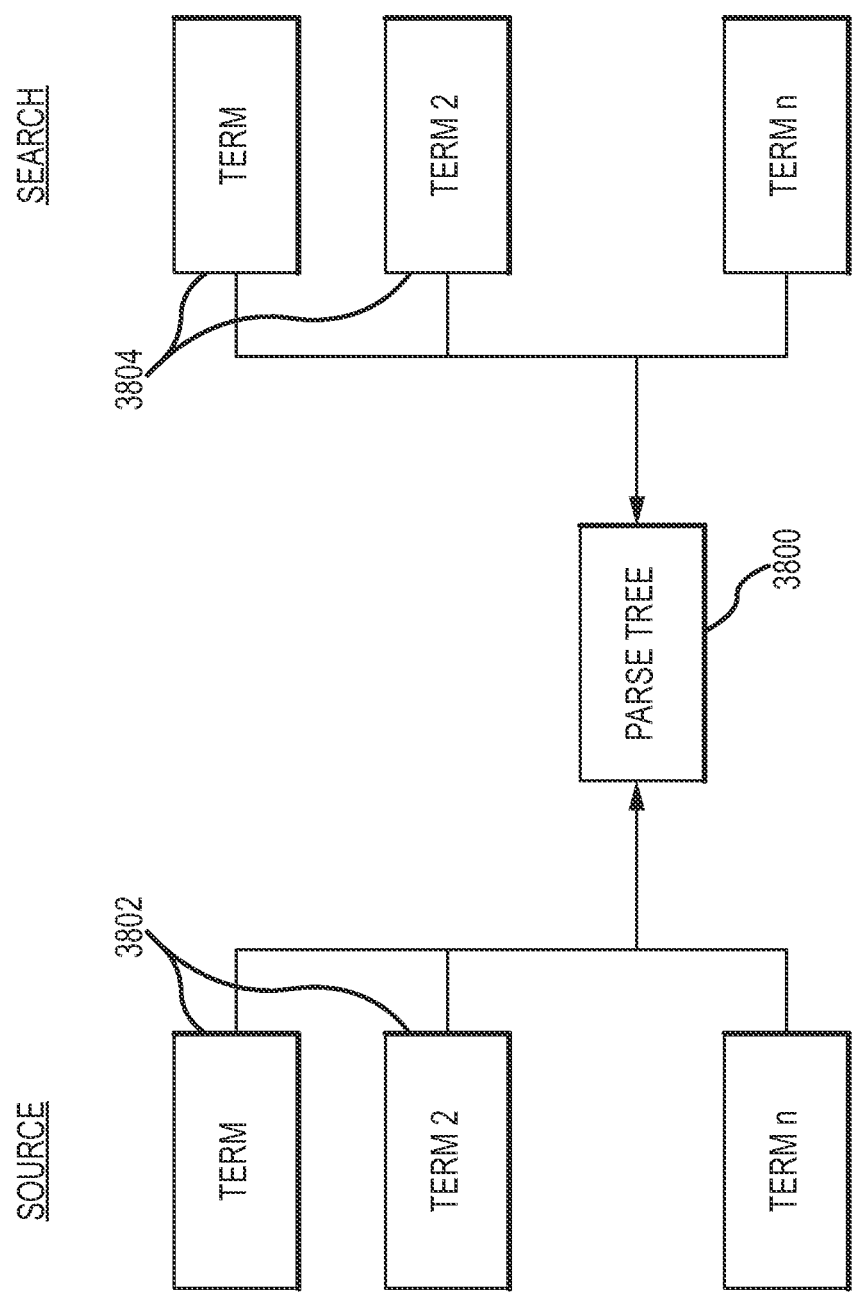
FIG. 38 is a schematic diagram illustrating the mapping of the potential search terms and source terms to a single parse tree in accordance with the present invention.

It will thus be appreciated that, in the illustrated embodiment, both source terms and potential search terms may be mapped to elements of the same parse tree structure. This is shown in FIG. 38. As shown, multiple terms 3802 from the source collection are mapped to the parse tree structure 3800. Similarly, multiple terms from the potential search term listing 3804 are mapped to corresponding elements of the parse tree structure 3800. In this manner, a particular search term entered by a user can be used to identify responsive information from the source collection based on a common classification or sub-classification despite the absence of any overlap between the entered search term and the corresponding items from the source collection. It will be appreciated that it may be desirable to link a given term 3802 or 3804 with more than one classification or classification lineage of the parse tree 3800. This may have particular benefits in connection with matching a particular product or product category to multiple potential search strategies, e.g., mapping "pen" to searches including "writing instrument" or "office gift."

Figure 39:
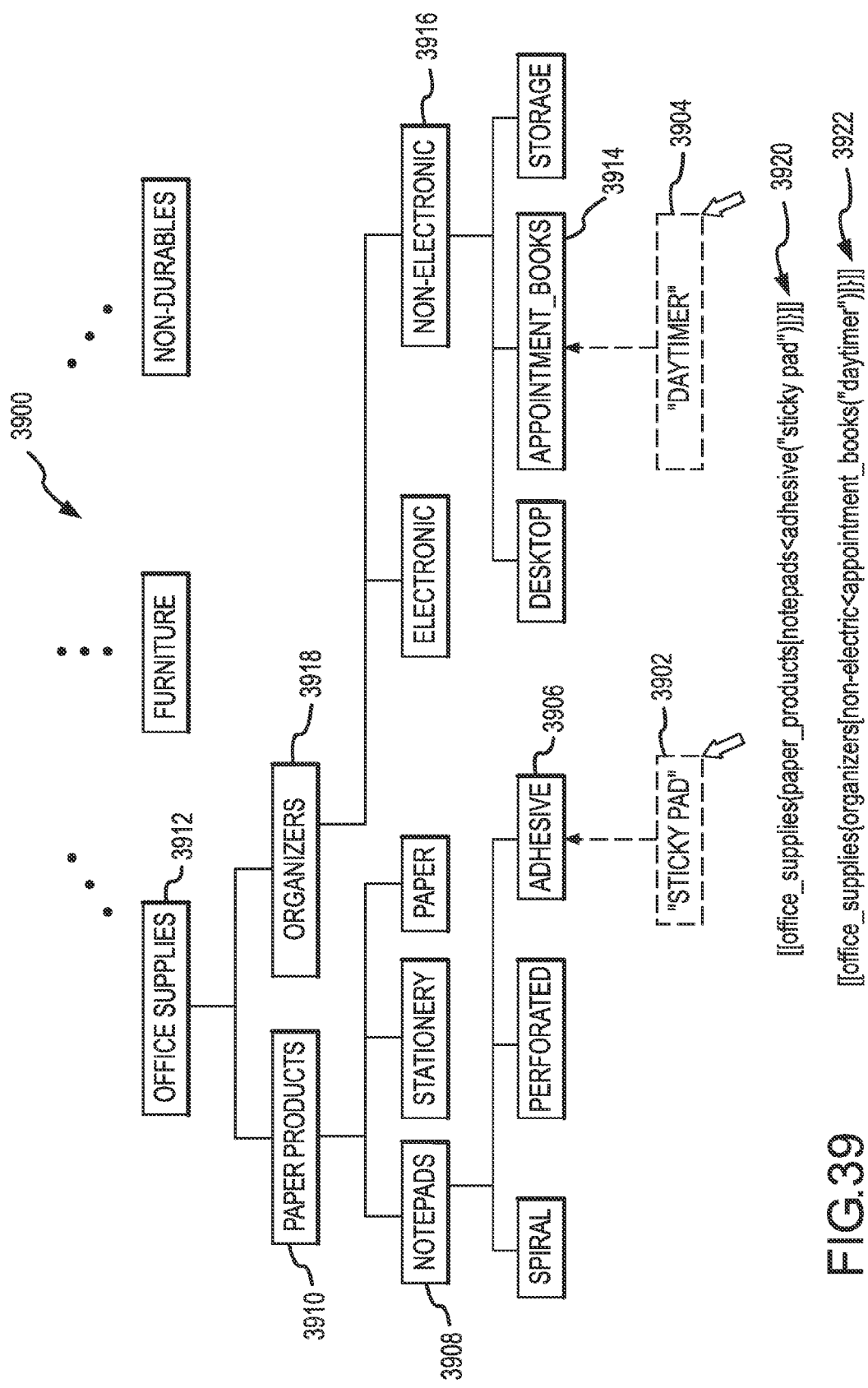
FIGS. 39 and 40 illustrate graphical user interfaces for mapping terms to a parse tree in accordance with the present invention.

An example of this process is shown in FIG. 39 with respect to particular search terms. In particular, FIG. 39 shows a user interface representing a portion of a parse tree 3900 for a particular subject matter such as the electronic catalog of a office supply warehouse. In this case, the user uses the graphical user interface to establish an association between search terms 3902 and 3904 and the parse tree 3900. Specifically, search term 3902, in this case "sticky pad" is dragged and dropped on the node 3906 of the parse tree 3900 labeled "Adhesive." This node 3906 or classification is a sub-classification of "Notepads" 3908 which is a sub-classification of "Paper Products" 3910 which, finally, is a sub-classification of "Office_Supplies" 3912. Similarly, term 3904, in this case "Daytimer," is associated with classification "Appointment_Books which is a sub-classification of "Non-electronic" 3916 which, in turn, is a sub-classification of "Organizers" 3918 which, finally, is a sub-classification of "Office_Supplies" 3912. Data strings 3920 and 3922 illustrate the resulting structured terms reflecting the classification relationships (other syntax, such as standard XML tag syntax, may be used to reflect the classification structure). It will be appreciated that the example of FIG. 39 omits the optional step of term standardization. That is, the potential search term "Sticky Pad" may alternatively first be mapped to a standardized term such as "Post-it note" before being associated with the parse tree. Such standardization will be described in more detail below.

Figure 40:
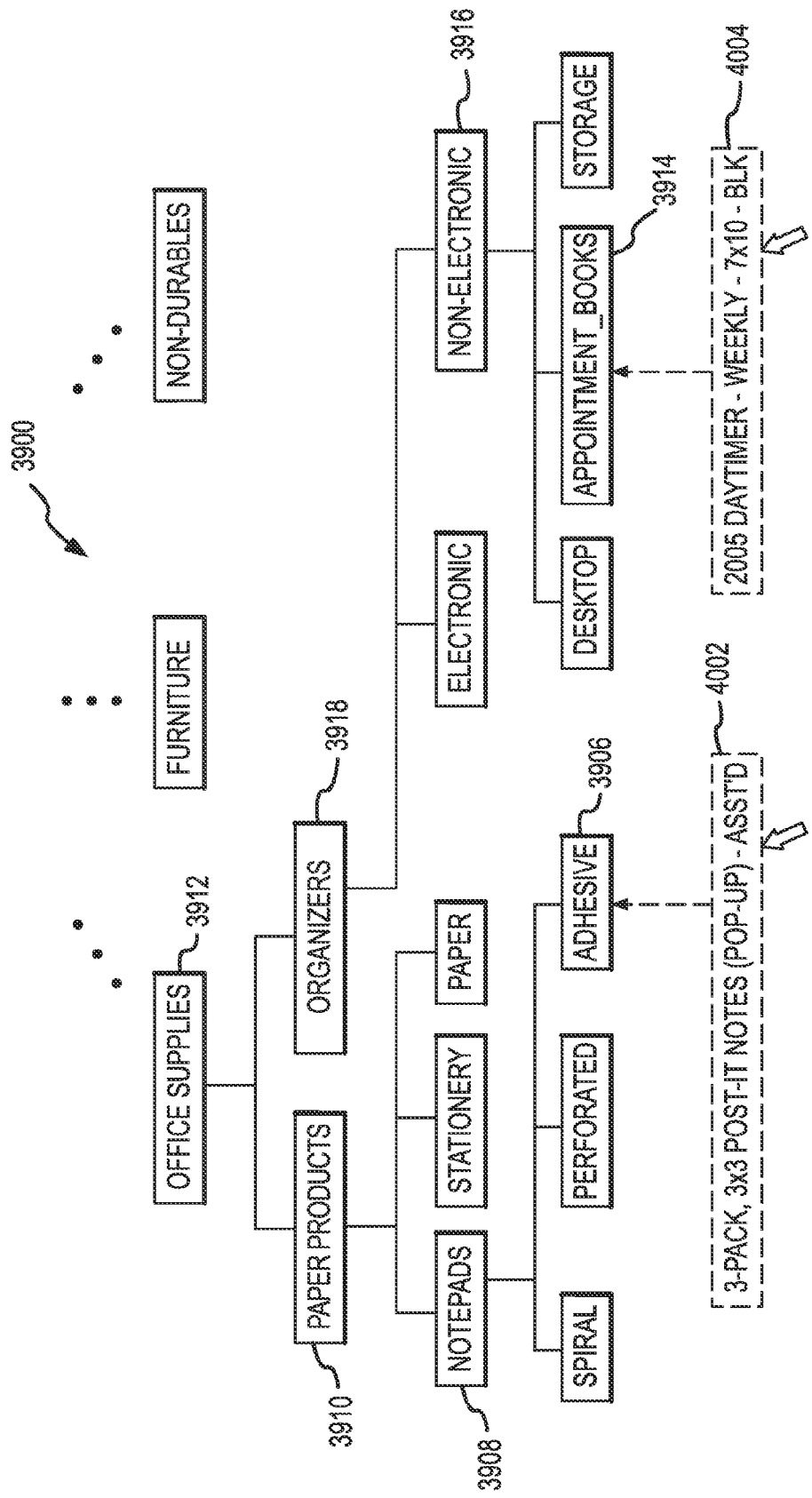

FIG. 40 illustrates how the same parse tree 3900 may be used to associate a classification with items from a source collection. For example, such a source collection may be drawn from an electronic catalog or other database of the business. In this case, the source term 4002 denoted "3-pack, 3x3 Post-it notes (Pop-up)-Asst'd" is associated with the same node 3906 as "Sticky Pad" was in the previous example. Similarly, term 4004 denoted "2005 Daytimer-Weekly-7x10-Blk" is associated with the same node 3914 as potential search term "Daytimer" was in the previous example. As will be appreciated from the discussion below, such common associations with respect to the parse tree 3900 facilitate searching.

Figure 41:
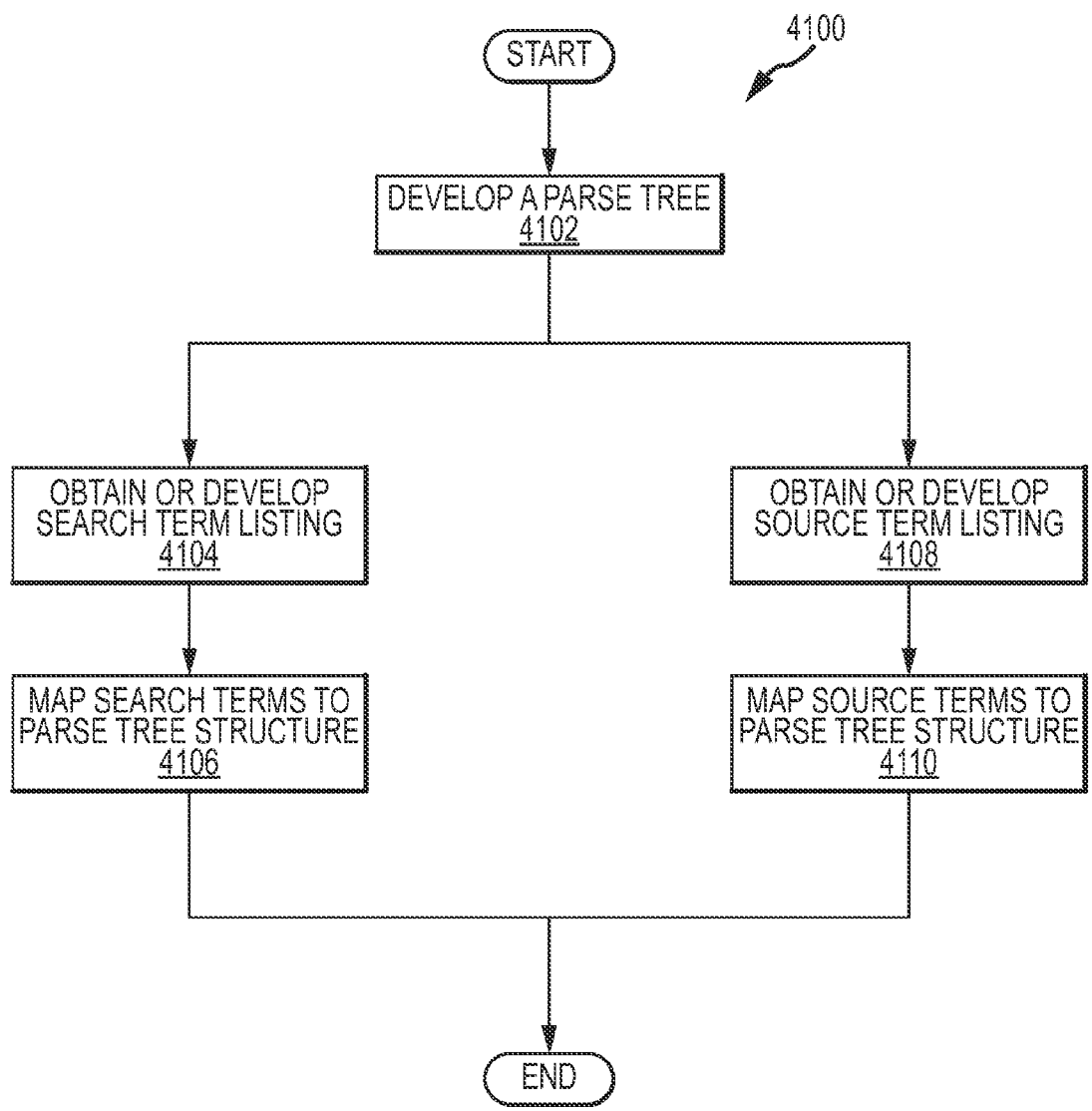
FIG. 41 is a flow chart illustrating a process for mapping terms to a parse tree in accordance with the present invention.

This process for establishing a knowledge base may be summarized with respect to the flow chart of FIG. 41. The illustrated process 4100 is initiated by developing (4102) a parse tree that defines the subject matter of interest in terms of a number of classifications and sub-classifications. As noted above, such parsing of the subject matter may be implemented with enough levels to divide the subject matter to the desired granularity. The process 4100 then proceeds on two separate paths relating to establishing classifications for potential search terms and classifications for items from the source collection. It will be appreciated that these two paths may be executed in any order or concurrently. On the potential search term path, the process involves obtaining or developing (4104) a potential search term listing. As noted above, an existing list may be obtained, a new list may be developed by a subject matter expert, or some combination of these processes may occur. The terms are then mapped (4106) to the parse tree structure such as by a drag and drop operation on a graphical user interface as illustrated above. On the source term process line, the process 4100 proceeds by obtaining or developing (4108) a source term listing. Again, the source term listing may be obtained from existing sources, developed by subject matter expert or some combination of these processes may occur. The individual terms are then mapped (4110) to the parse tree structure, again, for example, by way of a drag and drop operation as illustrated above. Although not shown, the process 4100 may further include the steps of re-writing the potential search terms and source terms in a standardized form.

Figure 42:
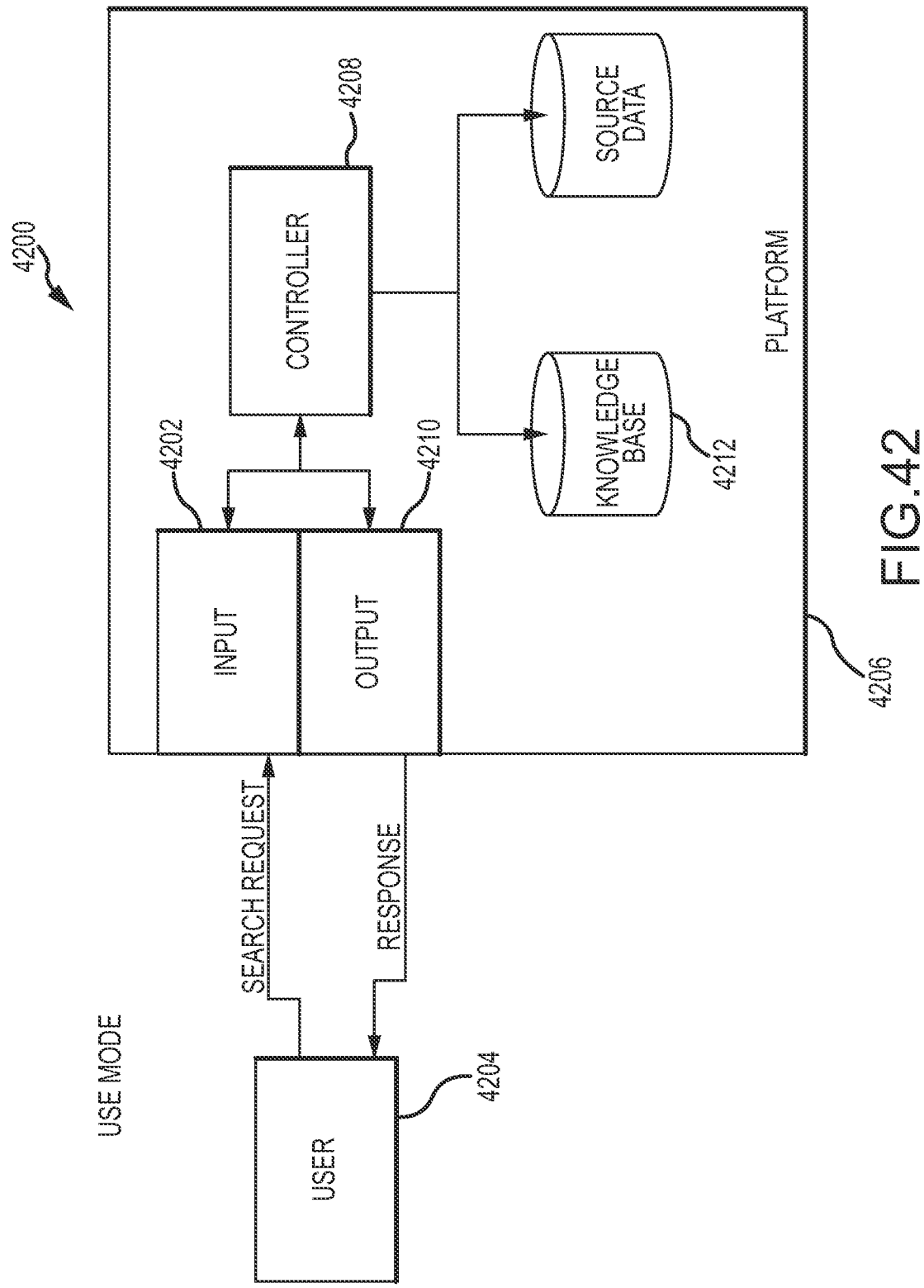
FIG. 42 is a schematic diagram illustrating a search system, in accordance with the present invention, in a use mode.
Figure 43:
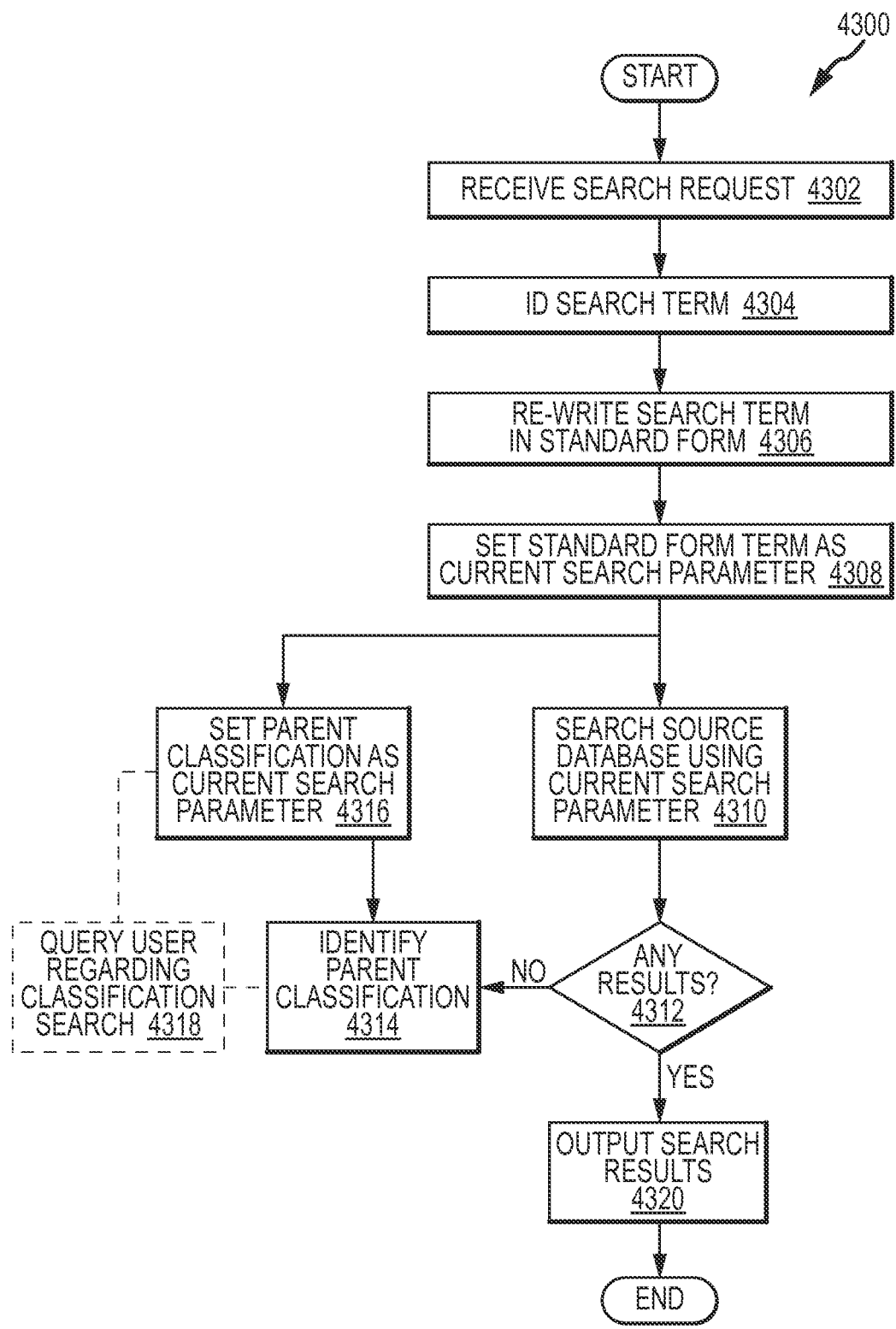
FIG. 43 is a flow chart illustrating a process for operating the system of FIG. 42 in the use mode.

The search system of the present invention is also operative in a use mode. This is illustrated in FIG. 42. The illustrated system 4200 includes input structure 4202 for receiving a search request from a user 4204. Depending on the specific network context in which the system 4200 is implemented, the search request may be entered directly at the machine executing the search system, or may be entered at a remote node interconnected to the platform 4206 via a local or wide area network. The nature of the input structure 4202 may vary accordingly. The search request is processed by a controller 4208 to obtain responsive information that is transmitted to the user 4204 via output structure 4210. Again, the nature of the output structure 4210 may vary depending on the specific network implementation.

In the illustrated implementation, in order to obtain the responsive information, the controller accesses the knowledge base 4212. The knowledge base 4212 includes stored information sufficient to identify a term from the search request, rewrite the term in a standardized form, transform the term if necessary, and obtain the metadata associated with the term that reflects the classification relationships of the term. The controller then uses the standardized term together with the classification information to access responsive information from the source data 4214.

FIG. 4300 is a flow chart illustrating a corresponding process 4300. The process 4300 is initiated by receiving (4302) a search request, for example, from a keyboard, graphical user interface or network port. The system is then operative to identify (4304) a search term from the search request. In this regard, any appropriate search query syntax may be supported. For example, a search term may be entered via a template including predefined Boolean operators or may be entered freeform. Existing technologies allow for identification of search terms thus entered.

The search term is then rewritten (4306) in standard form. This may involve correcting misspellings, mapping multiple synonyms to a selected standard term, implementing a predetermined syntax and grammar, etc., as will be described in more detail below. The resulting standard form term is then set (4308) as the current search parameter.

In the illustrated implementation, the search then proceeds iteratively through the hierarchy of the parse tree structure. Specifically, this is initiated by searching (4310) the source database using the current search parameter. If any results are obtained (4312) these results may be output (4320) to the user. If no results are obtained, the parent classification at the next level of the parse tree is identified (4314). That parent classification is then set (4316) as the current search parameter and the process is repeated. Optionally, the user may be queried (4318) regarding such a classification search. For example, the user may be prompted to answer a question such as "no match found—would you like to search for other products in the same classification?" In addition, the logic executed by the process controller may limit such searches to certain levels of the parse tree structure, e.g., no more than three parse levels (parent, grandparent, great grandparent) in order to avoid returning undesired results. Alternatively or additionally, such searching may be limited to a particular number of responsive items. The responsive items as presented to the user may be ordered or otherwise prioritized based on relevancy as determined in relation to proximity to the search term in the parse tree structure.

Figure 44:
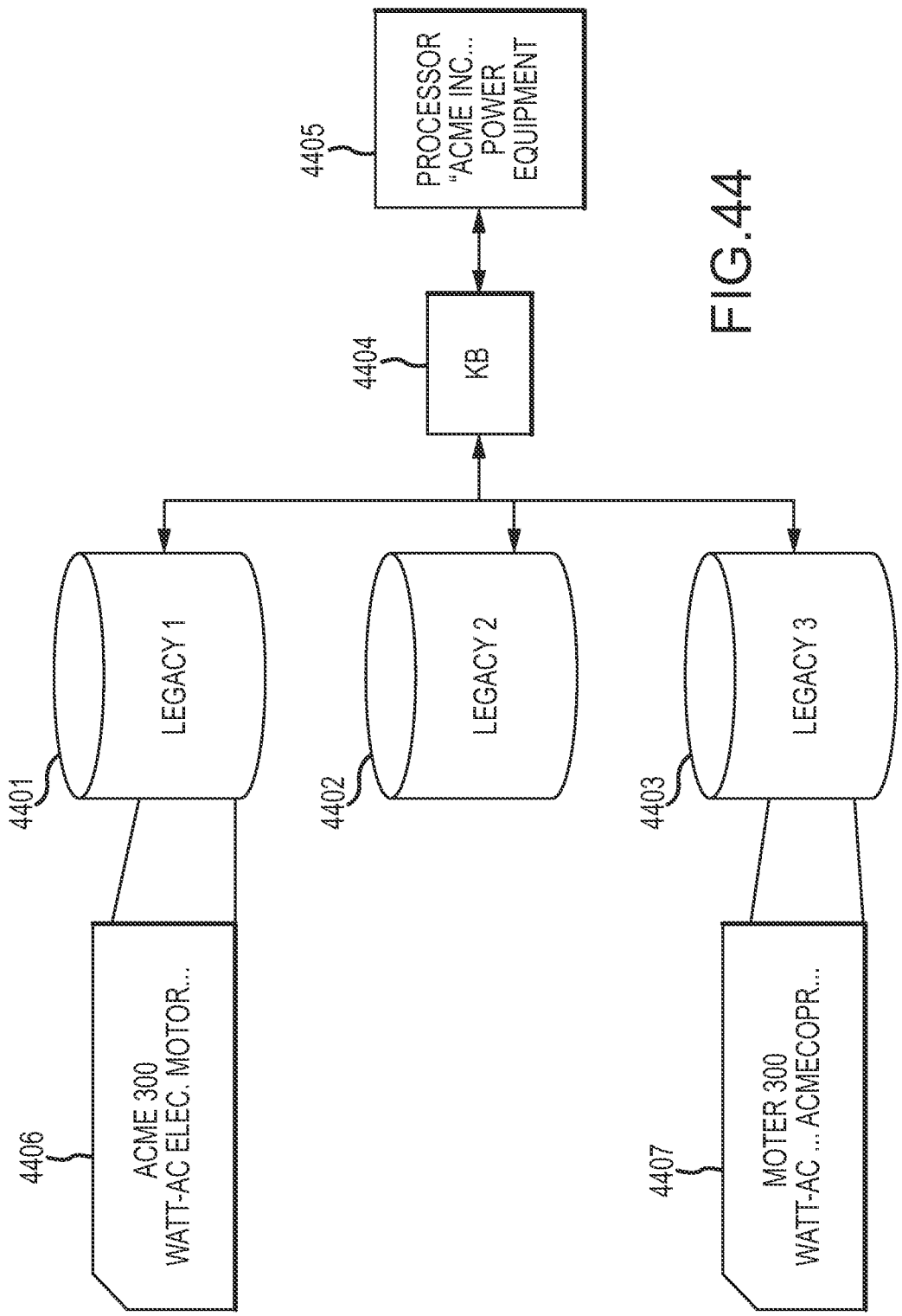
FIG. 44 is a schematic diagram illustrating use of a knowledge base to search multiple legacy systems in accordance with the present invention.

It will be appreciated that searching functionalities such as discussed above is not limited to searching of a web-site or electronic catalog by outside parties but is more generally useful in a variety of searching and database merging environments. FIG. 44 illustrates a system 4400 for using a knowledge base 4404 to access information from multiple legacy databases 4401-4403. Many organizations have related information stored in a variety of legacy databases, for example, product databases and accounting databases. Those legacy databases may have been developed or populated by different individuals or otherwise include different conventions relating to linguistics and syntax.

In the illustrated example, a first record 4406 of a first legacy database 4401 reflects a particular convention for identifying a manufacturer ("Acme") and product ("300 W AC Elec. Motor . . . "). Record 4407 associated with another legacy database 4403 reflects a different convention including, among other things, a different identification of the manufacturer ("AcmeCorp") and a misspelling ("Moter").

In this case, an internal or external user can use the processor 4405 to enter a substantially freeform search request, in this case "Acme Inc. Power Equipment." For example, such a search request may be entered in the hopes of retrieving all relevant information from all of the legacy databases 4401-4403. This is accommodated, in the illustrated embodiment, by processing the search request using the knowledge base 4404. The knowledge base 4404 executes functionality as discussed above and in more detail below relating to standardizing terms, associating terms with a classification structure and the like. Thus, the knowledge base 4404 may first process the search query to standardize and/or classify the search terms. For example, Acme, Inc. may be associated with the standardized term "Acme." The term polar equipment may be associated with the standardized term or classification "motor." Each of these terms/classifications may in turn be associated with associated legacy forms of the databases 4401-4403 to retrieve responsive information from each of the databases. Additional conventional functionality such as merge functionality may be implemented to identify and prioritize the responsive information provided as search results to the processor 4405. In this manner, searching or merging of legacy data systems is accommodated with minimal additional code.

From the discussion above, it will be appreciated that substantial effort is involved in transforming data from one form to another, e.g., from a raw list of potential search or source terms to a set or sets of standardized, classified and, perhaps, translated terms. The present invention also accommodates sharing information established in developing a transformation model such as a semantic metadata model (SMM) used in this regard. Such sharing of information allows multiple users to be involved in creating the knowledge base, e.g., at the same time, and allows components of such information to be utilized in starting new knowledge base creation projects.

The invention is preferably implemented in connection with a computer-based tool for facilitating substantially real-time transformation of electronic communications. As noted above, the invention is useful in a variety of contexts, including transformation of business as well as non-business content and also including transformation of content across language boundaries as well as within a single language environment.

It will be appreciated that transformation of data in accordance with the present invention is not limited to searching applications as described above, but is useful in a variety of applications including translation assistance. In the following description, such a system is described in connection with the transformation of business content from a source language to a target language using a Structured Object Localization expert (SOLx) system. The invention is further described in connection with classification of terminology for enhanced processing of electronic communications in a business or non-business context. The information sharing functionality and structure of the invention is then described. Such applications serve to fully illustrate various aspects of the invention. It will be appreciated, however, that the invention is not limited to such applications.

In addition, in order to facilitate a more complete understanding of the present invention and its advantages over conventional machine translation systems, the following description includes considerable discussion of grammar rules and other linguistic formalities. It shall be appreciated that, to a significant degree, these formalities are developed and implemented with the assistance of the SOLx system. Indeed, a primary advantage of the SOLx system is that it is intended for use by subject matter experts, not linguistic experts. Moreover, the SOLx system can handle source data in its native form and does not require substantial database revision within the source system. The SOLx system thereby converts many service industry transformation tasks into tools that can be addressed by in-house personnel or substantially automatically by the SOLx system.

The following description is generally divided into two sections. In the first section, certain subjects relevant to the configuration of SOLx are described. This includes a discussion of configuration objectives as well as the normalization classification and translation processes. Then, the structure of SOLx is described, including a discussion of network environment alternatives as well as the components involved in configuration and run-time operation. In the second section, the information sharing functionality and structure is described. This includes a discussion of the creation, editing and extension of data domains, as well as domain management and multi-user functionality.

II. Transformation Configuration

As noted above, the information sharing technology of the present invention is preferably implemented in connection with a machine based tool that is configured or trained by one or more SMEs who develop a knowledge base including an SMM. This machine based tool is first described in this Section I. The knowledge sharing functionality and structure is described in Section II that follows.

A. System Configuration

1. Introduction—Configuration Challenges

The present invention addresses various shortcomings of conventional data transformation, including manual translation and conventional machine translation, especially in the context of handling business content. In the former regard, the present invention is largely automated and is scalable to meet the needs of a broad variety of applications.

In the latter regard, there are a number of problems associated with typical business content that interfere with good functioning of a conventional machine translation system. These include out-of-vocabulary (OOV) words that are not really OOV and covert phrase boundaries. When a word to be translated is not in the machine translation system's dictionary, that word is said to be OOV. Often, words that actually are in the dictionary in some form are not translated because they are not in the dictionary in the same form in which they appear in the data under consideration. For example, particular data may contain many instances of the string "PRNTD CRCT BRD", and the dictionary may contain the entry "PRINTED CIRCUIT BOARD," but since the machine translation system cannot recognize that "PRNTD CRCT BRD" is a form of "PRINTED CIRCUIT BOARD" (even though this may be apparent to a human), the machine translation system fails to translate the term "PRNTD CRCT BRD". The SOLx tool set of the present invention helps turn these "false OOV" terms into terms that the machine translation system can recognize.

Conventional language processing systems also have trouble telling which words in a string of words are more closely connected than other sets of words. For example, humans reading a string of words like Acetic Acid Glass Bottle may have no trouble telling that there's no such thing as "acid glass," or that the word Glass goes together with the word Bottle and describes the material from which the bottle is made. Language processing systems typically have difficulty finding just such groupings of words within a string of words. For example, a language processing system may analyze the string Acetic Acid Glass Bottle as follows:

i) Acetic and Acid go together to form a phrase
  ii) Acetic Acid and Glass go together to form a phrase
  iii) Acetic Acid Glass and Bottle go together to form a phrase The first item of the analysis is correct, but the remaining two are not, and they can lead to an incorrect analysis of the item description as a whole. This faulty analysis may lead to an incorrect translation. The actual boundaries between phrases in data are known as phrase boundaries. Phrase boundaries are often covert—that is, not visibly marked. The SOLx tool of the present invention, as described in detail below, prepares data for translation by finding and marking phrase boundaries in the data. For example, it marks phrase boundaries in the string Acetic Acid Glass Bottle as follows:

Acetic Acid|Glass Bottle

This simple processing step—simple for a human, difficult for a language processing system—helps the machine translation system deduce the correct subgroupings of words within the input data, and allows it to produce the proper translation.

The present invention is based, in part, on the recognition that some content, including business content, often is not easily searchable or analyzable unless a schema is constructed to represent the content. There are a number of issues that a computational system must address to do this correctly. These include: deducing the "core" item; finding the attributes of the item; and finding the values of those attributes. As noted above, conventional language processing systems have trouble telling which words in a string of words are more closely connected than other sets of words. They also have difficulty determining which word or words in the string represent the "core," or most central, concept in the string. For example, humans reading a string of words like Acetic Acid Glass Bottle in a catalogue of laboratory supplies may have no trouble telling that the item that is being sold is acetic acid, and that Glass Bottle just describes the container in which it is packaged. For conventional language processing systems, this is not a simple task. As noted above, a conventional language processing system may identify a number of possible word groupings, some of which are incorrect. Such a language processing system may deduce, for example, that the item that is being sold is a bottle, and that the bottle is made of "acetic acid glass." Obviously, this analysis leads to a faulty representation of bottles (and of acetic acid) in a schema and, therefore, is of little assistance in building an electronic catalogue system.

In addition to finding the "core" of an item description, it is also useful to find the groups of words that describe that item. In the following description, the terms by which an item can be described are termed its attributes, and the contents or quantity of an attribute is termed its value. Finding attributes and their values is as difficult for a language processing system as is finding the "core" of an item description. For instance, in the string Acetic Acid Glass Bottle, one attribute of the core item is the package in which it is distributed. The value of this attribute is Glass Bottle. It may also be deemed that one attribute of the core item is the kind of container in which it is distributed. The value of this attribute would be Bottle. One can readily imagine other container types, such as Drum, Bucket, etc., in which acetic acid could be distributed. It happens that the kind of container attribute itself has an attribute that describes the material that the container is made of. The value of this attribute is Glass. Conventional natural language processing systems have trouble determining these sorts of relationships. Continuing with the example above, a conventional language processing system may analyze the string Acetic Acid Glass Bottle as follows:

Acetic and Acid go together to describe Glass

Acetic Acid and Glass go together to describe Bottle

This language processing system correctly deduced that Acetic and Acid go together. It incorrectly concluded that Acetic Acid go together to form the value of some attribute that describes a kind of Glass, and also incorrectly concluded that Acetic Acid Glass go together to give the value of some attribute that describes the bottle in question.

The SOLx system of the present invention, as described in detail below, allows a user to provide guidance to its own natural language processing system in deducing which sets of words go together to describe values. It also adds one very important functionality that conventional natural language processing systems cannot perform without human guidance. The SOLx system allows you to guide it to match values with specific attribute types. The combination of (1) finding core items, and (2) finding attributes and their values, allows the SOLx system to build useful schemas. As discussed above, covert phrase boundaries interfere with good translation. Schema deduction contributes to preparation of data for machine translation in a very straightforward way: the labels that are inserted at the boundaries between attributes correspond directly to phrase boundaries. In addition to identifying core items and attributes, it is useful to classify an item. In the example above, either or both of the core item (acetic acid) and its attributes (glass, bottle and glass bottle) may be associated with classifications. Conveniently, this may be performed after phrase boundaries have been inserted and core items and attributes have been defined. For example, acetic acid may be identified by a taxonomy where acetic acid belongs to the class aqueous solutions, which belongs to the class industrial chemicals and so on. Glass bottle may be identified by a taxonomy where glass bottle (as well as bucket, drum, etc.) belong to the family aqueous solution containers, which in turn belongs to the family packaging and so on. These relationships may be incorporated into the structure of a schema, e.g., in the form of grandparent, parent, sibling, child, grandchild, etc. tags in the case of a hierarchical taxonomy. Such classifications may assist in translation, e.g., by resolving ambiguities, and allow for additional functionality, e.g., improve searching for related items.

The next section describes a number of objectives of the SOLx system configuration process. All of these objectives relate to manipulating data from its native from to a form more amenable for translation or other localization, i.e., performing an initial transformation to an intermediate form.

2. Configuration Objectives

Based on the foregoing, it will be appreciated that the SOLx configuration process has a number of objectives, including solving OOVs and solving covert phrase boundaries based on identification of core items, attribute/value pairs and classification. Additional objectives, as discussed below, relate to taking advantage of reusable content chunks and resolving ambiguities. Many of these objectives are addressed automatically, or are partially automated, by the various SOLx tools described below. The following discussion will facilitate a more complete understanding of the internal functionality of these tools as described below.

False OOV words and true OOV words can be discovered at two stages in the translation process: before translation, and after translation. Potential OOV words can be found before translation through use of a Candidate Search Engine as described in detail below. OOV words can be identified after translation through analysis of the translated output. If a word appears in data under analysis in more than one form, the Candidate Search Engine considers the possibility that only one of those forms exists in the machine translation system's dictionary. Specifically, the Candidate Search Engine offers two ways to find words that appear in more than one form prior to submitting data for translation: the full/abbreviated search option; and the case variant search option. Once words have been identified that appear in more than one form, a SOLx operator can force them to appear in just one form through the use of vocabulary adjustment rules.

In this regard, the full/abbreviated search may output pairs of abbreviations and words. Each pair represents a potential false OOV term where it is likely that the unabbreviated form is in-vocabulary. Alternatively, the full/abbreviated search may output both pairs of words and unpaired abbreviations. In this case, abbreviations that are output paired with an unabbreviated word are potentially false OOV words, where the full form is likely in-vocabulary. Abbreviations that are output without a corresponding full form may be true OOV words. The machine translation dictionary may therefore be consulted to see if it includes such abbreviations. Similarly, some entries in a machine translation dictionary may be case sensitive. To address this issue, the SOLx system may implement a case variant search that outputs pairs, triplets, etc. of forms that are composed of the same letters, but appear with different variations of case. The documentation for a given machine translation system can then be consulted to learn which case variant is most likely to be in-vocabulary. To determine if a word is falsely OOV, words that are suspected to be OOV can be compared with the set of words in the machine translation dictionary. There are three steps to this procedure: 1) for each word that you suspect is falsely OOV, prepare a list of other forms that that word could take; 2) check the dictionary to see if it contains the suspected false OOV form; 3) check the dictionary to see if it contains one of the other forms of the word that you have identified. If the dictionary does not contain the suspected false OOV word and does contain one of the other forms of the word, then that word is falsely OOV and the SOLx operator can force it to appear in the "in-vocabulary" form in the input data as discussed below. Generally, this is accomplished through the use of a vocabulary adjustment rule. The vocabulary adjustment rule converts the false OOV form to the in-vocabulary form. The process for writing such rules is discussed in detail below.

Problems related to covert phrase boundaries appear as problems of translation. Thus, a problem related to covert phrase boundaries may initially be recognized when a translator/translation evaluator finds related errors in the translated text. A useful objective, then, is to identify these problems as problems related to covert phrase boundaries, rather than as problems with other sources. For example, a translation evaluator may describe problems related to covert phrase boundaries as problems related to some word or words modifying the wrong word or words. Problems related to potential covert phrase boundaries can also be identified via statistical analysis. As discussed below, the SOLx system includes a statistical tool called the N-gram analyzer (NGA) that analyzes databases to determine, among other things, what terms appear most commonly and which terms appear in proximity to one another. A mistranslated phrase identified in the quality control analysis (described below in relation to the TQE module) which has a low NGA probability for the transition between two or more pairs of words suggests a covert phrase boundary. Problems related to covert phrase boundaries can also be addressed through modifying a schematic representation of the data under analysis. In this regard, if a covert phrase boundary problem is identified, it is often a result of attribute rules that failed to identify an attribute. This can be resolved by modifying the schema to include an appropriate attribute rule. If a schema has not yet been produced for the data, a schema can be constructed at this time. Once a categorization or attribute rule has been constructed for a phrase that the translator/translation evaluator has identified as poorly translated, then the original text can be re-translated. If the result is a well-translated phrase, the problem has been identified as one of a covert phrase boundary and the operator may consider constructing more labeling rules for the data under analysis. Covert phrase boundary problems can be addressed by building a schema, and then running the schematized data through a SOLx process that inserts a phrase boundary at the location of every labeling/tagging rule.

The core item of a typical business content description is the item that is being sold/described. An item description often consists of its core item and some terms that describe its various attributes. For example, in the item description Black and Decker 3/8" drill with accessories, the item that is being described is a drill. The words or phrases Black and Decker, 3/8", and with accessories all give us additional information about the core item, but do not represent the core item itself. The core item in an item description can generally be found by answering the question, what is the item that is being sold or described here? For example, in the item description Black and Decker 3/8" drill with accessories, the item that is being described is a drill. The words or phrases Black and Decker, 3/8", and with accessories all indicate something about the core item, but do not represent the core item itself.

A subject matter expert (SME) configuring SOLx for a particular application can leverage his domain-specific knowledge by listing the attributes of core items before beginning work with SOLx, and by listing the values of attributes before beginning work with SOLx. Both classification rules and attribute rules can then be prepared before manipulating data with the SOLx system. Domain-specific knowledge can also be leveraged by recognizing core items and attributes and their values during configuration of the SOLx system and writing rules for them as they appear. As the SME works with the data within the SOLx system, he can write rules for the data as the need appears. The Candidate Search Engine can also be used to perform a collocation search that outputs pairs of words that form collocations. If one of those words represents a core item, then the other word may represent an attribute, a value, or (in some sense) both. Attribute-value pairs can also be identified based on a semantic category search implemented by the SOLx system. The semantic category search outputs groups of item descriptions that share words belonging to a specific semantic category. Words from a specific semantic category that appear in similar item descriptions may represent a value, an attribute, or (in some sense) both.

Business content is generally characterized by a high degree of structure that facilitates writing phrasing rules and allows for efficient reuse of content "chunks." As discussed above, much content relating to product descriptions and other structured content is not free-flowing sentences, but is an abbreviated structure called a 'noun phrase'. Noun phrases are typically composed of mixtures of nouns (N), adjectives (A), and occasionally prepositions (P). The mixtures of nouns and adjectives may be nested. The following are some simple examples:

TABLE 1

| A | N |   | Ceramic insulator |
| N | N |   | Distribution panel |
| A | A | N | Large metallic object |
| A | N | N | Variable speed drill |
| N | A | N | Plastic coated plate |
| N | N | N | Nine pin connector |
| N | P | N | Angle of entry |

Adjective phrases also exist mixed with adverbs (Av). Table 2 lists some examples.

TABLE 2

| Av | A |   | Manually operable |
| N  | A |   | Color coded |
| N  | N | A | Carbon fiber reinforced |

The noun phrase four-strand color-coded twisted-pair telephone wire has the pattern NNNAANNN. It is grouped as $(four_N \; strand_N)_N \; (color_N \; coded_A)_A \; (twisted_A \; pair_N)_N \; telephone_N \; wire_N$. Another way to look at this item is an object-attribute list. The primary word or object is wire; of use type telephone; strand type twisted-pair; color property color-coded, and strand number type is four-stranded. The structure is $N_1AN_2N_3N_4$. With this type of compound grouping, each group is essentially independent of any other group. Hence, the translation within each group is performed as an independent phrase and then linked by relatively simple linguistic rules.

For example, regroup $N_1AN_2N_3N_4$ as $NN_3N_4$ where $N=N_1AN_2$. In Spanish this can be translated as $NN_3N_4 \rightarrow N_4$ 'de' $N_3$ 'de' {N} where {N} means the translated version of N, and $\rightarrow$ means translated as. In Spanish, it would be $N_1AN_2 \rightarrow N_2A$ 'de' $N_1$. The phrase then translates as $N_1AN_2N_3N_4 \rightarrow N_4$ 'de' $N_3$ 'de' $N_2A$ 'de' $N_1$.

In addition to defining simple rule sets for associating translated components of noun phrases, there is another factor that leads to the feasibility of automatically translating large component databases. This additional observation is that very few terms are used in creating these databases. For example, databases have been analyzed that have 70,000 part descriptions, yet are made up of only 4,000 words or tokens. Further, individual phrases are used hundreds of times. In other words, if the individual component pieces or "chunks" are translated, and there are simple rules for relating theses chunks, then the translation of large parts of the content, in principle, is straightforward. The SOLx system includes tools as discussed in more detail below for identifying reusable chunks, developing rules for translation and storing translated terms/chunks for facilitating substantially real-time transformation of electronic content.

Another objective of the configuration process is enabling SOLx to resolve certain ambiguities. Ambiguity exists when a language processing system does not know which of two or more possible analyses of a text string is the correct one. There are two kinds of ambiguity in item descriptions: lexical ambiguity and structural ambiguity. When properly configured, the SOLx system can often resolve both kinds of ambiguity.

Lexical ambiguity occurs when a language processing system does not know which of two or more meanings to assign to a word. For example, the abbreviation mil can have many meanings, including million, millimeter, military, and Milwaukee. In a million-item database of tools and construction materials, it may occur with all four meanings. In translation, lexical ambiguity leads to the problem of the wrong word being used to translate a word in your input. To translate your material, it is useful to expand the abbreviation to each of its different full forms in the appropriate contexts. The user can enable the SOLx system to do this by writing labeling rules that distinguish the different contexts from each other. For example, mil might appear with the meaning million in the context of a weight, with the meaning millimeter in the context of a length, with the meaning military in the context of a specification type (as in the phrase MIL SPEC), and with the meaning Milwaukee in the context of brand of a tool. You then write vocabulary adjustment rules to convert the string mil into the appropriate full form in each individual context. In schematization, resolving lexical ambiguity involves a number of issues, including identification of the core item in an item description; identification of values for attributes; and assignment of values to proper attributes.

Lexical ambiguity may also be resolved by reference to an associated classification. The classification may be specific to the ambiguous term or a related term, e.g., another term in the same noun phrase. Thus, for example, the ambiguous abbreviation "mil" may be resolved by 1) noting that it forms an attribute of an object-attribute list, 2) identifying the associated object (e.g., drill), 3) identifying a classification of the object (e.g., power tool), and 4) applying a rule set for that classification to select a meaning for the term (e.g., mil—Milwaukee). These relationships may be defined by the schema.

Structural ambiguity occurs when a language processing system does not know which of two or more labeling rules to use to group together sets of words within an item description. This most commonly affects attribute rules and may require further nesting of parent/child tag relationships for proper resolution. Again, a related classification may assist in resolving structural ambiguity.

3. Configuration Processes a. Normalization

As the foregoing discussion suggests, the various configuration objectives (e.g., resolving false OOVs, identifying covert phrase boundaries, taking advantage of reusable chunks and resolving ambiguities) can be addressed in accordance with the present invention by transforming input data from its native form into an intermediate form that is more amenable to translation or other localization/transformation. The corresponding process, which is a primary purpose of SOLx system configuration, is termed "normalization." Once normalized, the data will include standardized terminology in place of idiosyncratic terms, will reflect various grammar and other rules that assist in further processing, and will include tags that provide context including classification information for resolving ambiguities and otherwise promoting proper transformation. The associated processes are executed using the Normalization Workbench of the SOLx system, as will be described below. There are two kinds of rules developed using the Normalization Workbench: grammatical rules, and normalization rules. The purpose of a grammatical rule is to group together and label a section of text. The purpose of a normalization rule is to cause a labeled section of text to undergo some change. Although these rules are discussed in detail below in order to provide a more complete understanding of the present invention, it will be appreciated that these rules are, to a large extent, developed and implemented internally by the various SOLx tools. Accordingly, SOLx operators need not have linguistics expertise to realize the associated advantages.

i) Normalization Rules

The Normalization Workbench offers a number of different kinds of normalization rules relating to terminology including: replacement rules, joining rules, and ordering rules. Replacement rules allow the replacement of one kind of text with another kind of text. Different kinds of replacement rules allow the user to control the level of specificity of these replacements. Joining rules allow the user to specify how separated elements should be joined together in the final output. Ordering rules allow the user to specify how different parts of a description should be ordered relative to each other.

With regard to replacement rules, data might contain instances of the word centimeter written four different ways—as cm, as cm., as c.m., and as centimeter—and the user might want to ensure that it always appears as centimeter. The Normalization Workbench implements two different kinds of replacement rules: unguided replacement, and guided replacement. The rule type that is most easily applicable to a particular environment can be selected. Unguided replacement rules allow the user to name a tag/category type, and specify a text string to be used to replace any text that is under that tag. Guided replacement rules allow the user to name a tag/category type, and specify specific text strings to be used to replace specific text strings that are under that tag. Within the Normalization Workbench logic, the format of unguided replacement rules may be, for example:

[category_type]=>'what to replace its text with'

For instance, the following rule says to find any [foot] category label, and replace the text that it tags with the word feet:

[foot]=>'feet'

If that rule was run against the following input,
Steel piping 6 [foot] foot long
Steel piping 3 [foot] feet long
it would produce the following output:
Steel piping 6 [foot] feet long
Steel piping 3 [foot] feet long
The second line is unchanged; in the first line, foot has been changed to feet.

Guided replacement rules allow the user to name a tag/category type, and specify specific text strings to be used to replace specific text strings that are under that tag. This is done by listing a set of possible content strings in which the normalization engine should "look up" the appropriate replacement. The format of these rules is:

```
[category_type] :: lookup
    'text to replace' => 'text to replace it with'
    'other text to replace' => 'text to replace it with'
    'more text to replace' => 'text to replace it with'
end lookup
```

For instance, the following rule says to find any [length_metric] label. If you see mm, mm., m.m., or m. m. beneath it, then replace it with millimeter. If you see cm, cm., c.m., or c. m. beneath it, then replace it with centimeter:

```
[length_metric] :: lookup
    'mm' => 'millimeter'
    'mm.' => 'millimeter'
    'm.m.' => 'millimeter'
    'm. m.' => 'millimeter'
```

-continued

```
'cm' => 'centimeter'
'cm.' => 'centimeter'
'c.m.' => 'centimeter'
'c. m.' => 'centimeter'
end lookup
```

Figure 1:
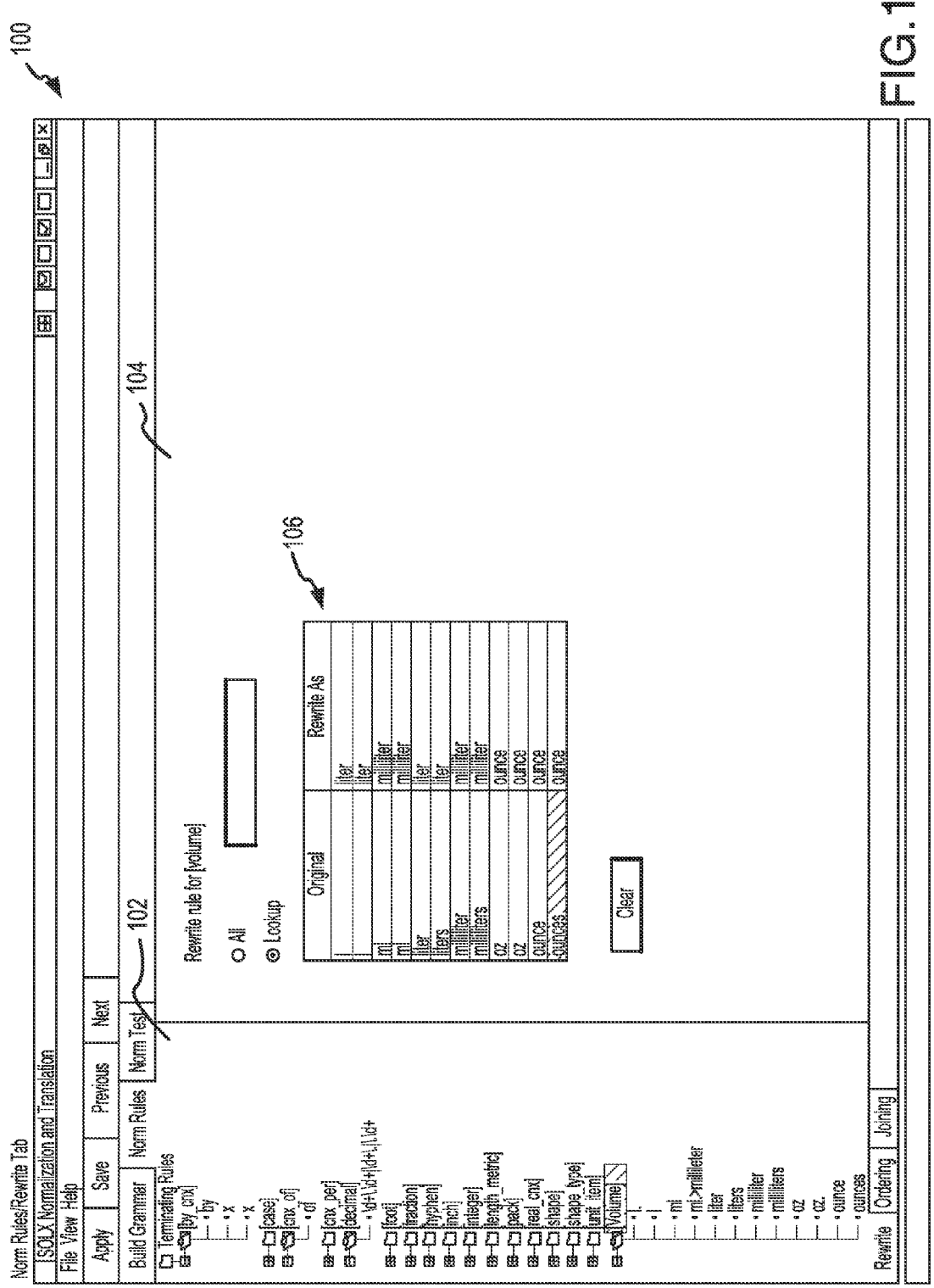
FIG. 1 is a monitor screen shot illustrating a process for developing replacement rules in accordance with the present invention.

If that rule was run against the following input
Stainless steel scalpel handle, [length_metric] (5 mm)
[length_metric] (5 mm) disposable plastic scalpel handle
it would produce the following output:
Stainless steel scalpel handle, [length_metric] (5 millimeter)
[length_metric] (5 millimeter) disposable plastic scalpel handle From the user's perspective, such replacement rules may be implemented via a simple user interface such as shown in FIG. 1. FIG. 1 shows a user interface screen 100 including a left pane 102 and a right pane 104. The left pane 102 displays the grammar rules that are currently in use. The rules are shown graphically, including alternative expressions (in this case) as well as rule relationships and categories. Many alternative expressions or candidates therefor are automatically recognized by the workbench and presented to the user. The right pane 104 reflects the process to update or add a text replacement rule. In operation, a grammar rule is selected in the left pane 102. All text that can be recognized by the rule appears in the left column of the table 106 in the right pane 104. The SME then has the option to unconditionally replace all text with the string from the right column of the table 106 or may conditionally enter a replacement string. Although not shown in each case below, similar interfaces allow for easy development and implementation of the various rules discussed herein. It will be appreciated that "liter" and "ounce" together with their variants thus are members of the class "volume" and the left pane 102 graphically depicts a portion of a taxonomy associated with a schema.

Joining rules allow the user to specify how separated elements should be joined together in the final output. Joining rules can be used to re-join elements that were separated during the process of assigning category labels. The user can also use joining rules to combine separate elements to form single delimited fields.

Some elements that were originally adjacent in the input may have become separated in the process of assigning them category labels, and it may be desired to re-join them in the output. For example, the catheter tip configuration JL4 will appear as [catheter_tip_configuration] (J L 4) after its category label is assigned. However, the customary way to write this configuration is with all three of its elements adjacent to each other. Joining rules allow the user to join them together again.

The user may wish the members of a particular category to form a single, delimited field. For instance, you might want the contents of the category label [litter_box] (plastic hi-impact scratch-resistant) to appear as plastic,hi-impact,scratch-resistant in order to conserve space in your data description field. Joining rules allow the user to join these elements together and to specify that a comma be used as the delimiting symbol.

The format of these rules is:
[category_label]:: join with 'delimiter'
The delimiter can be absent, in which case the elements are joined immediately adjacent to each other. For example, numbers emerge from the category labeler with spaces between them, so that the number twelve looks like this:
[real] (1 2)
A standard normalization rule file supplied with the Normalization Workbench contains the following joining rule:
[real]:: join with ' '
This rule causes the numbers to be joined to each other without an intervening space, producing the following output:
[real] (12)
The following rule states that any content that appears with the category label [litter_box] should be joined together with commas:
[litter_box]:: join with ','
If that rule was run against the following input,
[litter_box] (plastic hi-impact dog-repellant)
[litter_box] (enamel shatter-resistant)
it would produce the following output:
[litter_box] (plastic,hi-impact,dog-repellant)
[litter_box] (enamel,shatter-resistant)

Ordering rules allow the user to specify how different parts of a description should be ordered relative to each other. For instance, input data might contain catheter descriptions that always contain a catheter size and a catheter type, but in varying orders—sometimes with the catheter size before the catheter type, and sometimes with the catheter type before the catheter size:
[catheter] ([catheter_size] (8Fr) [catheter_type] (JL4) [item] (catheter))
[catheter] ([catheter_type] (JL5) [catheter_size] (8Fr) [item] (catheter))
The user might prefer that these always occur in a consistent order, with the catheter size coming first and the catheter type coming second. Ordering rules allow you to enforce this ordering consistently.

The internal format of ordering rules is generally somewhat more complicated than that of the other types of rules. Ordering rules generally have three parts. Beginning with a simple example:
[catheter]/[catheter_type] [catheter_size]=>($2 $1)
The first part of the rule, shown in bold below, specifies that this rule should only be applied to the contents of a [catheter] category label:
[catheter]/[catheter_type] [catheter_size]=>($2 $1)
The second part of the rule, shown in bold below, specifies which labeled elements are to have their orders changed:
[catheter]/[catheter_type] [catheter_size]=>($2 $1)
Each of those elements is assigned a number, which is written in the format $number in the third part of the rule. The third part of the rule, shown in bold below, specifies the order in which those elements should appear in the output:
[catheter]/[catheter_type] [catheter_size]=>($2 $1)
The order $2 $1 indicates that the element which was originally second (i.e., $2) should be first (since it appears in the leftmost position in the third part of the rule), while the element which was originally first (i.e., $1) should be second (since it appears in the second position from the left in the third part of the rule). Ordering rules can appear with any number of elements. For example, this rule refers to a category label that contains four elements. The rule switches the position of the first and third elements of its input, while keeping its second and fourth elements in their original positions:
[resistor]/[resistance] [tolerance] [wattage] [manufacturer]=>($3 $2 $1 $4)

Figure 2:
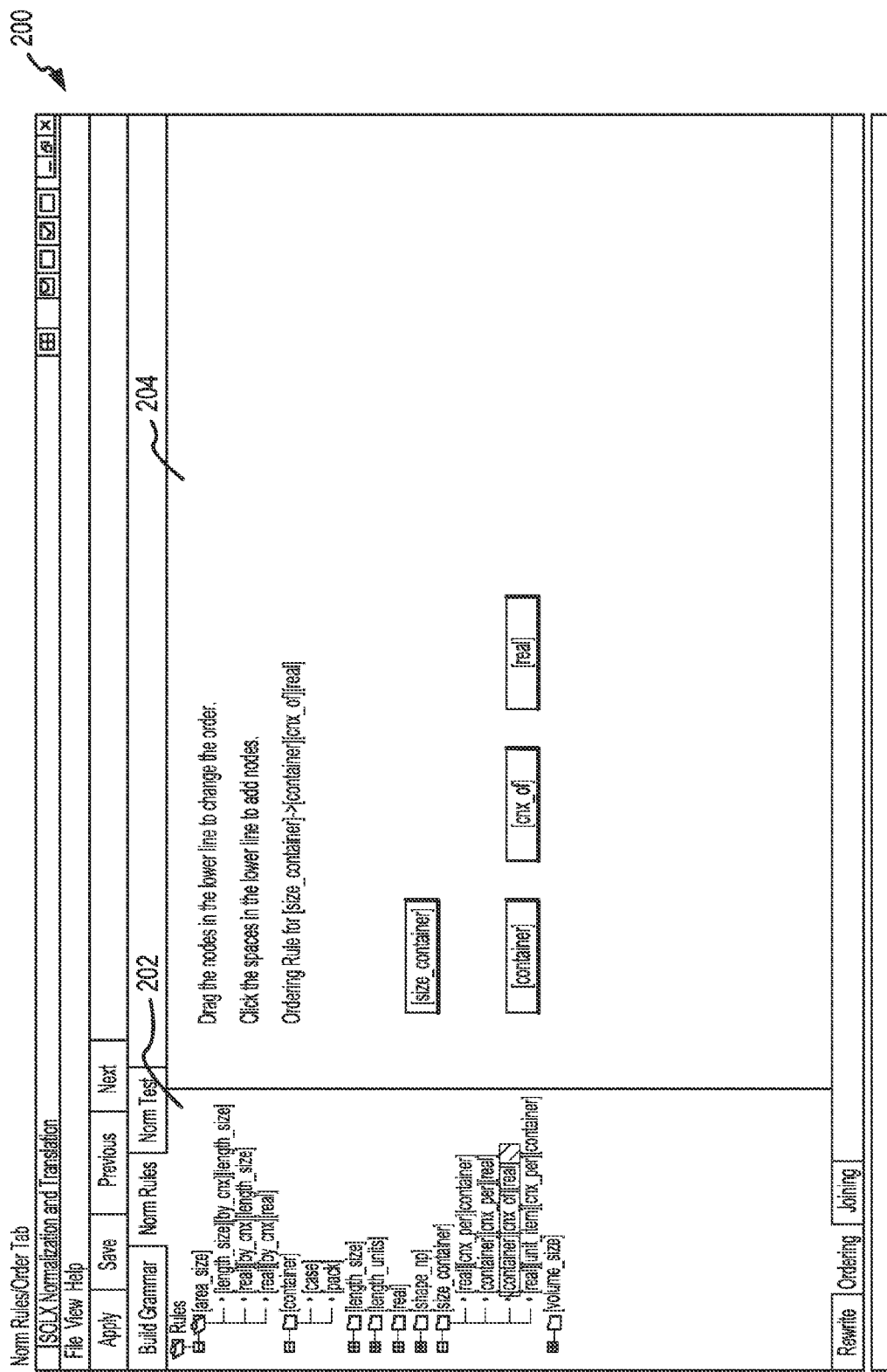
FIG. 2 is a monitor screen shot illustrating a process for developing ordering rules in accordance with the present invention.

FIG. 2 shows an example of a user interface screen 200 that may be used to develop and implement an ordering rule. The screen 200 includes a left pane 202 and a right pane 204. The left pane 202 displays the grammar rules that are currently in use—in this case, ordering rules for container size—as well as various structural productions under each rule. The right pane 204 reflects the process to update or add structural reorganization to the rule. In operation, a structural rule is selected using the left pane 202. The right pane 204 can then be used to develop or modify the rule. In this case, the elements or "nodes" can be reordered by simple drag-and-drop process. Nodes may also be added or deleted using simple mouse or keypad commands.

Ordering rules are very powerful, and have other uses besides order-changing per se. Other uses for ordering rules include the deletion of unwanted material, and the addition of desired material.

To use an ordering rule to delete material, the undesired material can be omitted from the third part of the rule. For example, the following rule causes the deletion of the second element from the product description:
[notebook]/[item] [academic_field] [purpose]=>($1 $3)
If that rule was run against the following input,
[notebook] ([item] (notebook) [academic_field] (linguistics) [purpose] (fieldwork)
[notebook] ([item] (notebook) [academic_field] (sociology) [purpose] (fieldwork)
it would produce the following output:
[notebook] ([item] (notebook) [purpose] (fieldwork)
[notebook] ([item] (notebook) [purpose] (fieldwork)

To use an ordering rule to add desired material, the desired material can be added to the third part of the rule in the desired position relative to the other elements. For example, the following rule causes the string [real_cnx]'-' to be added to the product description:
[real]/(integer][fraction])=>($1 [real_cnx]'-' $2)
If that rule was run against the following input,
[real] (11/2)
[real] (15/8)
it would produce the following output:
[real] (1 [real_cnx] (-) 1/2)
[real] (1 [real_cnx] (-) 5/8)
After final processing, this converts the confusing 11/2 and 15/8 to 1-1/2 ("one and a half") and 1-5/8 ("one and five eighths").

In addition to the foregoing normalization rules relating to terminology, the SOLx system also involves normalization rules relating to context cues, including classification and phrasing. The rules that the SOLx system uses to identify contexts and determine the location and boundaries of attribute/value pairs fall into three categories: categorization rules, attribute rules, and analysis rules. Categorization rules and attribute rules together form a class of rules known as labeling/tagging rules. labeling/tagging rules cause the insertion of labels/tags in the output text when the user requests parsed or labeled/tagged texts. They form the structure of the schema in a schematization task, and they become phrase boundaries in a machine translation task. Analysis rules do not cause the insertion of labels/tags in the output. They are inserted temporarily by the SOLx system during the processing of input, and are deleted from the output before it is displayed.

Although analysis tags are not displayed in the output (SOLx can allow the user to view them if the data is processed in a defined interactive mode), they are very important to the process of determining contexts for vocabulary adjustment rules and for determining where labels/tags should be inserted. The analysis process is discussed in more detail below.

ii. Grammar Rules

The various rules described above for establishing normalized content are based on grammar rules developed for a particular application. The process for developing grammar rules is set forth in the following discussion. Again, it will be appreciated that the SOLx tools guide an SME through the development of these rules and the SME need not have any expertise in this regard. There are generally two approaches to writing grammar rules, known as "bottom up" and "top down." Bottom-up approaches to writing grammar rules begin by looking for the smallest identifiable units in the text and proceed by building up to larger units made up of cohesive sets of the smaller units. Top-down approaches to writing grammar rules begin by identifying the largest units in the text, and proceed by identifying the smaller cohesive units of which they are made.

Consider the following data for an example of building grammar rules from the bottom up. It consists of typical descriptions of various catheters used in invasive cardiology:
8Fr. JR4 Cordis
8 Fr. JR5 Cordis
8Fr JL4 catheter, Cordis, 6/box
8Fr pigtail 6/box
8 French pigtail catheter, 135 degree
8Fr Sones catheter, reusable
4Fr. LC angioplasty catheter with guidewire and peelaway sheath Each of these descriptions includes some indication of the (diametric) size of the catheter, shown in bold text below:
8Fr. JR4 Cordis
8 Fr. JR5 Cordis
8Fr JL4 catheter, Cordis, 6/box
8Fr pigtail 6/box
8 French pigtail catheter, 135 degree
8Fr Sones catheter, reusable
4Fr. LC angioplasty catheter with guidewire and peelaway sheath One can make two very broad generalizations about these indications of catheter size: all of them include a digit, and the digits all seem to be integers.

One can further make two weaker generalizations about these indications of catheter size: all of them include either the letters Fr, or the word French; and if they include the letters Fr, those two letters may or may not be followed by a period. A subject matter expert (SME) operating the SOLx system will know that Fr, Fr., and French are all tokens of the same thing: some indicator of the unit of catheter size. Having noted these various forms in the data, a first rule can be written. It will take the form x can appear as w, y, or z, and this rule will describe the different ways that x can appear in the data under analysis. The basic fact that the rule is intended to capture is French can appear as Fr, as Fr., or as French.

In the grammar rules formalism, that fact may be indicated like this:
[French]
   (Fr)
   (Fr.)
   (French)

[French] is the name assigned to the category of "things that can be forms of the word that expresses the unit of size of catheters" and could just as well have been called [catheter_size_unit], or [Fr], or [french]. The important thing is to give the category a label that is meaningful to the user.

(Fr), (Fr.), and (French) are the forms that a thing that belongs to the category [French] can take. Although the exact name for the category [French] is not important, it matters much more how these "rule contents" are written. For example, the forms may be case sensitive. That is, (Fr) and (fr) are different forms. If your rule contains the form (Fr), but not the form (fr), then if there is a description like this:

8 fr cordis catheter

The fr in the description will not be recognized as expressing a unit of catheter size. Similarly, if your rule contained the form (fr), but not the form (Fr), then Fr would not be recognized. "Upper-case" and "lower-case" distinctions may also matter in this part of a rule.

Returning to the list of descriptions above, a third generalization can be made: all of the indications of catheter size include an integer followed by the unit of catheter size.

This suggests another rule, of the form all x consist of the sequence a followed by b. The basic fact that the rule is intended to capture is: all indications of catheter size consist of a number followed by some form of the category [French]. In the grammar rules formalism, that fact may be indicated like this:

>[catheter_size]
    ([real] [French])

[catheter_size] is the name assigned to the category of "groups of words that can indicate the size of a catheter;" and could just as well have been called [size], or [catheterSize], or [sizeOfACatheter]. The important thing is to give the category a label that is meaningful to the user.

([real] [French]) is the part of the rule that describes the things that make up a [catheter_size]—that is, something that belongs to the category of things that can be [French], and something that belongs to the categories of things that can be [real]—and what order they have to appear in—in this case, the [real] first, followed by the [French]. In this part of the rule, exactly how things are written is important.

In this rule, the user is able to make use of the rule for [French] that was defined earlier. Similarly, the user is able to make use of the [real] rule for numbers that can generally be supplied as a standard rule with the Normalization Workbench. Rules can make reference to other rules. Furthermore, rules do not have to be defined in the same file to be used together, as long as the parser reads in the file in which they are defined.

So far this example has involved a set of rules that allows description of the size of every catheter in a list of descriptions. The SME working with this data might then want to write a set of rules for describing the various catheter types in the list. Up to this point, this example has started with the smallest units of text that could be identified (the different forms of [French]) and worked up from there (to the [catheter_size] category). Now, the SME may have an idea of a higher-level description (i.e., catheter type), but no lower-level descriptions to build it up out of; in this case, the SME may start at the top, and think his way down through a set of rules.

The SME can see that each of these descriptions includes some indication of the type of the catheter, shown in bold text below:

8Fr. JR4 Cordis

8 Fr. JR5 Cordis

8Fr JL4 catheter, Cordis, 6/box

8Fr pigtail 6/box

8 French pigtail catheter, 135 degree

8Fr Sones catheter, reusable

4Fr. angioplasty catheter with guidewire and peelaway sheath

He is aware that a catheter type can be described in one of two ways: by the tip configuration of the catheter, and by the purpose of the catheter. So, the SME may write a rule that captures the fact that catheter types can be identified by tip configuration or by catheter purpose.

In the grammar rules formalism, that fact may be indicated like this:

>[catheter_type]
    ([catheter_tip_configuration])
    ([catheter_purpose])

This involves a rule for describing tip configuration, and a rule for identifying a catheter's purpose.

Starting with tip configuration, the SME knows that catheter tip configurations can be described in two ways: 1) by a combination of the inventor's name, an indication of which blood vessel the catheter is meant to engage, and by an indication of the length of the curve at the catheter tip; or 2) by the inventor's name alone.

The SME can write a rule that indicates these two possibilities in this way:

[catheter_tip_configuration]
    ([inventor] [coronary_artery] [curve_size])
    ([inventor])

In this rule, [catheter_tip_configuration] is the category label; ([inventor] [coronary_artery] [curve_size]) and ([inventor]) are the two forms that things that belong to this category can take. In order to use these rules, the SME will need to write rules for [inventor], [coronary_artery], and [curve_size]. The SME knows that in all of these cases, the possible forms that something that belongs to one of these categories can take are very limited, and can be listed, similarly to the various forms of [French]:

[inventor]
    (J)
    (Sones)
[coronary_artery]
    (L)
    (R)
[curve_size]
    (3.5)
    (4)
    (5)

With these rules, the SME has a complete description of the [catheter_tip_configuration] category. Recall that the SME is writing a [catheter_tip_configuration] rule because there are two ways that a catheter type can be identified: by the configuration of the catheter's tip, and by the catheter's purpose. The SME has the [catheter_tip_configuration] rule written now and just needs a rule that captures descriptions of a catheter's purpose.

The SME is aware that (at least in this limited data set) a catheter's purpose can be directly indicated, e.g. by the word angioplasty, or can be inferred from something else—in this case, the catheter's shape, as in pigtail. So, the SME writes a rule that captures the fact that catheter purpose can be identified by purpose indicators or by catheter shape.

In the grammar rules formalism, that fact can be indicated like this:

[catheter_purpose]
    ([catheter_purpose_indicator])
    ([catheter_shape])

The SME needs a rule for describing catheter purpose, and a rule for describing catheter shape. Both of these can be simple in this example:

[catheter_purpose_indicator]
    (angioplasty)
[catheter_shape]
    (pigtail)

With this, a complete set of rules is provided for describing catheter type, from the "top" (i.e., the [catheter_type] rule) "down" (i.e., to the rules for [inventor], [coronary_artery], [curve_size], [catheter_purpose], and [catheter_shape]).

"Top-down" and "bottom-up" approaches to writing grammar rules are both effective, and an SME should use whichever is most comfortable or efficient for a particular data set. The bottom-up approach is generally easier to troubleshoot; the top-down approach is more intuitive for some people. A grammar writer can use some combination of both approaches simultaneously.

Grammar rules include a special type of rule called a wanker. Wankers are rules for category labels that should appear in the output of the token normalization process. In one implementation, wankers are written similarly to other rules, except that their category label starts with the symbol >. For example, in the preceding discussion, we wrote the following wanker rules:

>[catheter_size]
    ([real] [French])
>[catheter_type]
    ([catheter_tip_configuration])
    ([catheter_purpose])

Other rules do not have this symbol preceding the category label, and are not wankers.

Chunks of text that have been described by a wanker rule will be tagged in the output of the token normalization process. For example, with the rule set that we have defined so far, including the two wankers, we would see output like the following:

[catheter_size] (8Fr.) [catheter_type] (JR4) Cordis
[catheter_size] (8 Fr.) [catheter_type] (JR5) Cordis
[catheter_size] (8Fr) [catheter_type] (JL4) catheter, Cordis, 6/box
[catheter_size] (8Fr) [catheter_type] (pigtail) 6/box
[catheter_size] (8 French) [catheter_type] (pigtail) catheter, 135 degree
[catheter_size](8Fr) [catheter_type] (Sones) catheter, reusable
[catheter_size] (4Fr.) LC [catheter_type] (angioplasty) catheter with guidewire and peelaway sheath Although the other rules are used in this example to define the wanker rules, and to recognize their various forms in the input text, since the other rules are not wankers, their category labels do not appear in the output. If at some point it is desired to make one or more of those other rules' category labels to appear in the output, the SME or other operator can cause them to do so by converting those rules to wankers.

Besides category labels, the foregoing example included two kinds of things in rules. First, the example included rules that contained other category labels. These "other" category labels are identifiable in the example by the fact that they are always enclosed in square brackets, e.g.,

[catheter_purpose]
    ([catheter_purpose_indicator])
    ([catheter_shape])

The example also included rules that contained strings of text that had to be written exactly the way that they would appear in the input. These strings are identifiable by the fact that they are directly enclosed by parentheses, e.g.

[French]
    (Fr)
    (Fr.)
    (French)

There is a third kind of thing that can be used in a rule. These things, called regular expressions, allow the user to specify approximately what a description will look like. Regular expressions can be recognized by the facts that, unlike the other kinds of rule contents, they are not enclosed by parentheses, and they are immediately enclosed by "forward slashes."

Regular expressions in rules look like this:

```
[angiography_catheter_french_size]
    /7|8/
[rocket_engine_size]
    /^X\d{2}/
[naval_vessel_hull_number]
    /\w+\d+/
```

Although the foregoing example illustrated specific implementations of specific rules, it will be appreciated that a virtually endless variety of specialized rules may be provided in accordance with the present invention. The SOLx system of the present invention consists of many components, as will be described below. One of these components is the Natural Language Engine module, or NLE. The NLE module evaluates each item description in data under analysis by means of rules that describe the ways in which core items and their attributes can appear in the data. The exact (machine-readable) format that these rules take can vary depending upon the application involved and computing environment. For present purposes, it is sufficient to realize that these rules express relationships like the following (stated in relation to the drill example discussed above):

Descriptions of a drill include the manufacturer's name, the drill size, and may also include a list of accessories and whether or not it is battery powered.

A drill's size may be three eighths of an inch or one half inch inch may be written as inch or as "

If inch is written as ", then it may be written with or without a space between the numbers 3/8 or 1/2 and the "

The NLE checks each line of the data individually to see if any of the rules seem to apply to that line. If a rule seems to apply, then the NLE inserts a label/tag and marks which string of words that rule seemed to apply to. For example, for the set of rules listed above, then in the item description Black and Decker 3/8" drill with accessories, the NLE module would notice that 3/8" might be a drill size, and would mark it as such. If the user is running the NLE in interactive mode, he may observe something like this in the output:

[drill_size] (3/8")

In addition to the rules listed above, a complete set of rules for describing the ways that item descriptions for/of drills and their attributes would also include rules for manufacturers' names, accessory lists, and whether or not the drill is battery powered. If the user writes such a set of rules, then in the item description Black and Decker 3/8" drill with accessories, the NLE module will notice and label/tag the following attributes of the description:

[manufacturer name] (Black and Decker)
[drill_size] (3/8")

The performance of the rules can be analyzed in two stages. First, determine whether or not the rules operate adequately. Second, if it is identified that rules that do not operate adequately, determine why they do not operate adequately.

For translations, the performance of the rules can be determined by evaluating the adequacy of the translations in the output text. For schematization, the performance of the rules can be determined by evaluating the adequacy of the schema that is suggested by running the rule set. For any rule type, if a rule has been identified that does not perform adequately, it can be determined why it does not operate adequately by operating the NLE component in interactive mode with output to the screen.

For tagging rules, test data set can be analyzed to determine if: every item that should be labeled/tagged has been labeled/tagged and any item that should not have been labeled/tagged has been labeled/tagged in error.

In order to evaluate the rules in this way, the test data set must include both items that should be labeled/tagged, and items that should not be tagged.

Vocabulary adjustment rules operate on data that has been processed by tagging/tagging rules, so troubleshooting the performance of vocabulary adjustment rules requires attention to the operation of tagging/tagging rules, as well as to the operation of the vocabulary adjustment rules themselves.

In general, the data set selected to evaluate the performance of the rules should include: examples of different types of core items, and for each type of core item, examples with different sets of attributes and/or attribute values.

b. Processing

1. Searching

Normalization facilitates a variety of further processing options. One important type of processing is translation as noted above and further described below. However, other types of processing in addition to or instead of translation are enhanced by normalization including database and network searching, document location and retrieval, interest/personality matching, information aggregation for research/analysis, etc.

For purposes of illustration, a database and network searching application will now be described. It will be appreciated that this is closely related to the context assisted searching described above. In many cases, it is desirable to allow for searching across semantic boundaries. For example, a potential individual or business consumer may desire to access company product descriptions or listings that may be characterized by abbreviations and other terms, as well as syntax, that are unique to the company or otherwise insufficiently standardized to enable easy access. Additionally, submitting queries for searching information via a network (e.g., LAN, WAN, proprietary or open) is subject to considerable lexicographic uncertainty, even within a single language environment, which uncertainty expands geometrically in the context of multiple languages. It is common for a searcher to submit queries that attempt to encompass a range of synonyms or conceptually related terms when attempting to obtain complete search results. However, this requires significant knowledge and skill and is often impractical, especially in a multi-language environment. Moreover, in some cases, a searcher, such as a consumer without specialized knowledge regarding a search area, may be insufficiently knowledgeable regarding a taxonomy or classification structure of the subject matter of interest to execute certain search strategies for identifying information of interest through a process of progressively narrowing the scope of responsive information based on conceptual/class relationships.

It will be observed that the left panel 102 of FIG. 1 graphically depicts a portion of a taxonomy where, for example, the units of measure "liter" and "ounce", as well as variants thereof, are subclasses of the class "volume." Thus, for example, a searcher entering a query including the term "ounce" (or "oz") may access responsive information for a database or the like including the term "oz" or ("ounce"). Moreover, metric equivalent items, e.g., including the term "ml," may be retrieved in response to the query based on tags commonly linking the search term and the responsive item to the class "volume." In these cases, both normalization (oz=ounce) and classification (≤_volume<<ounce>> <<liter>>_>) (where the markings < > and << >> indicate parent-child tag relationships) are used to enhance the search functionality. Such normalization may involve normalizing a locale-specific search term and/or normalizing terms in a searched database to a normalized form. It will be appreciated that the normalized (or unnormalized) terms may be translated from one language to another, as disclosed herein, to provide a further degree of search functionality.

Figure 19:
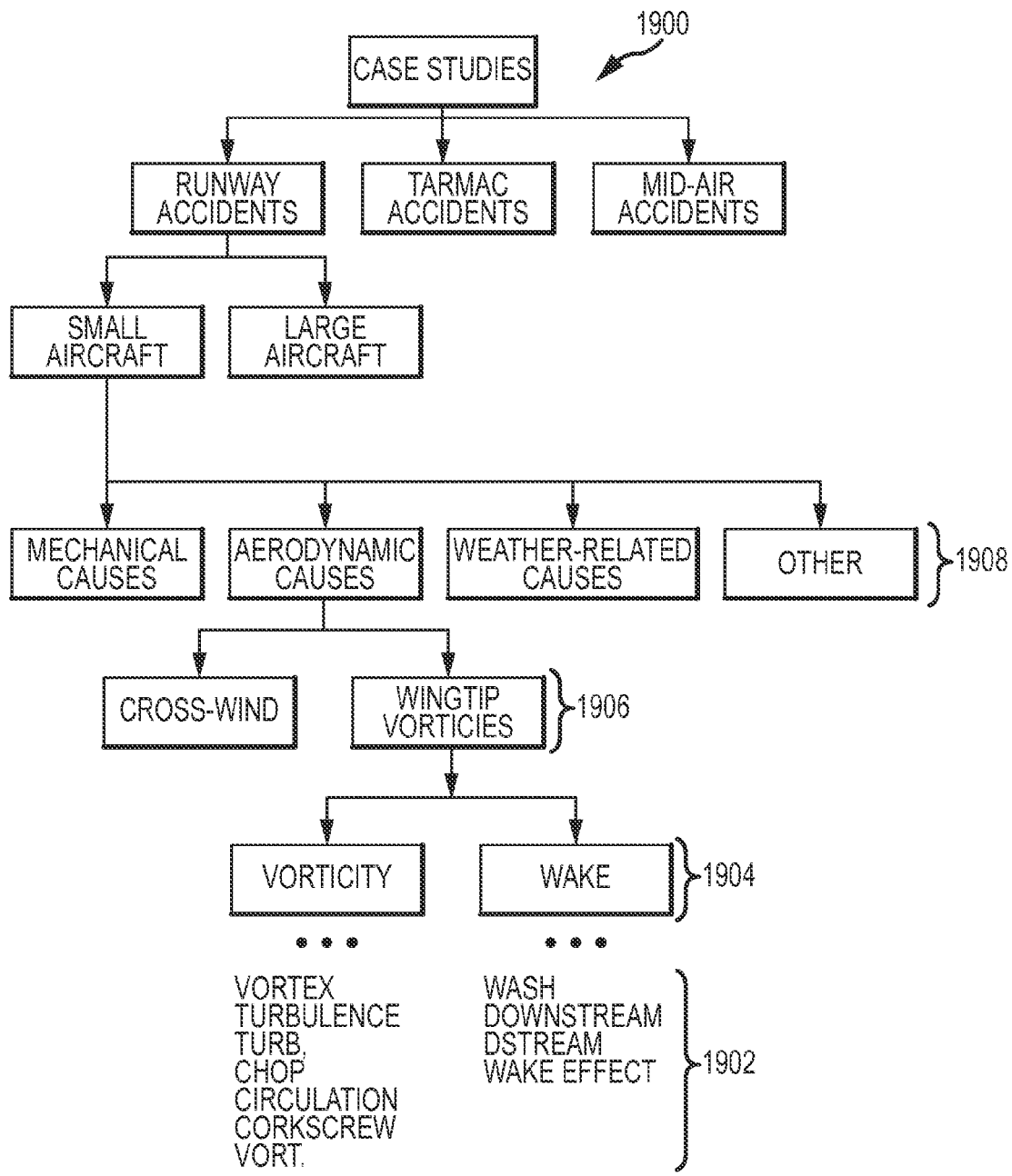
FIG. 19 illustrates a taxonomy related to the area of mechanics in accordance with the present invention.

Moreover, such normalization and classification assisted searches are not limited to the context of product descriptions but may extend to the entirety of any language. In this regard, FIG. 19 illustrates a taxonomy 1900 related to the area of mechanics that may be used in connection with research related to small aircraft runway accidents attributed to following in the wake of larger aircraft. Terms 1902 represent alternative terms that may be normalized by an SME using the present invention, such as an administrator of a government crash investigation database, to the normalized terms 1904, namely, "vorticity" and "wake." These terms 1904 may be associated with a parent classification 1906 ("wingtip vortices") which in turn is associated with a grandparent classification 1908 ("aerodynamic causes") and so on. In this context, normalization allows for mapping of a range of colloquial or scientific search terms into predefined taxonomy, or for tagging of documents including such terms relative to the taxonomy. The taxonomy can then be used to resolve, lexicographic ambiguities and to retrieve relevant documents.

Figure 20:
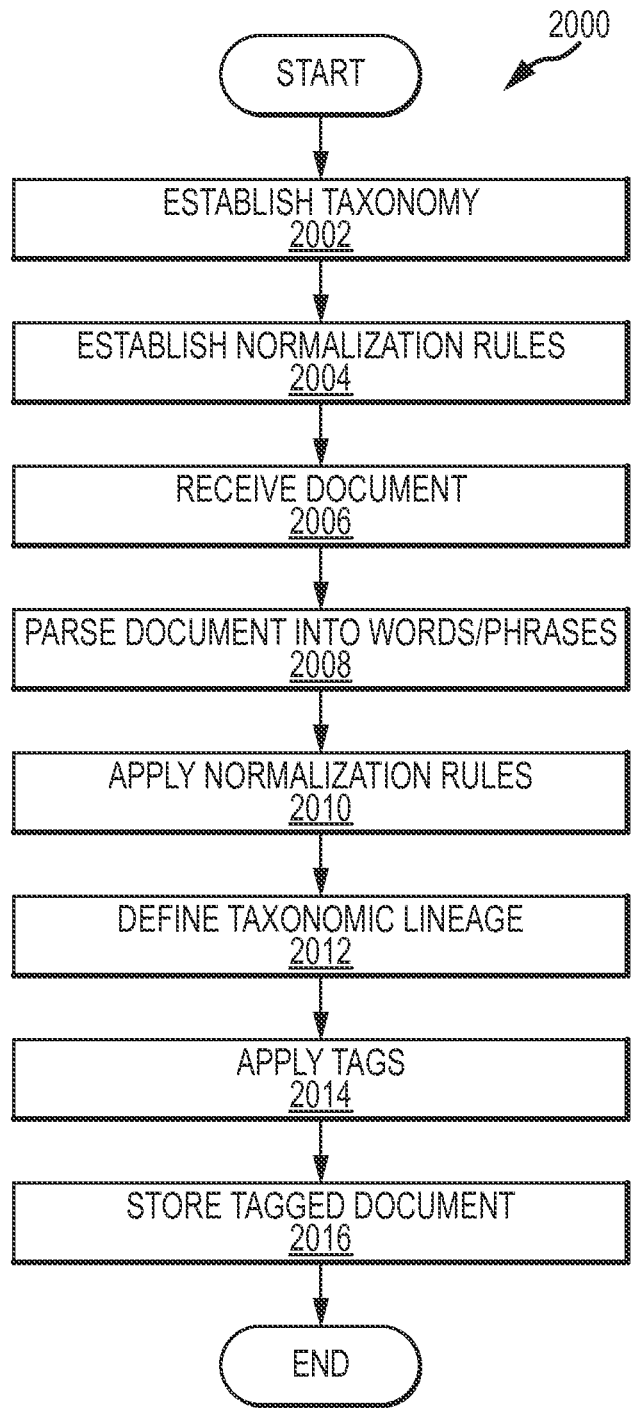
FIG. 20 is a flowchart illustrating a process for constructing a database in accordance with the present invention.

FIG. 20 is a flowchart illustrating a process 2000 for constructing a database for enhanced searching using normalization and classification. The illustrated process 2000 is initiated by establishing (2002) a taxonomy for the relevant subject matter. This may be performed by an SME and will generally involve dividing the subject matter into conceptual categories and subcategories that collectively define the subject matter. In many cases, such categories may be defined by reference materials or industry standards. The SME may also establish (2004) normalization rules, as discussed above, for normalizing a variety of terms or phrases into a smaller number of normalized terms. For example, this may involve surveying a collection or database of documents to identify sets of corresponding terms, abbreviations and other variants. It will be appreciated that the taxonomy and normalization rules may be supplemented and revised over time based on experience to enhance operation of the system.

Once the initial taxonomy and normalization rules have been established, a document to be stored is received (2004) and parsed (2006) into appropriate chunks, e.g., words or phrases. Normalization rules are then applied (2008) to map the chunks into normalized expressions. Depending on the application, the document may be revised to reflect the normalized expressions, or the normalized expressions may merely be used for processing purposes. In any case, the normalized expressions are then used to define (2010) a taxonomic lineage (e.g., wingtip vortices, aerodynamic causes, etc.) for the subject term and to apply (2012) corresponding tags. The tagged document (2014) is then stored and the tags can be used to retrieve, print, display, transmit, etc., the document or a portion thereof. For example, the database may be searched based on classification or a term of a query may be normalized and the normalized term may be associated with a classification to identify responsive documents.

Figure 3:
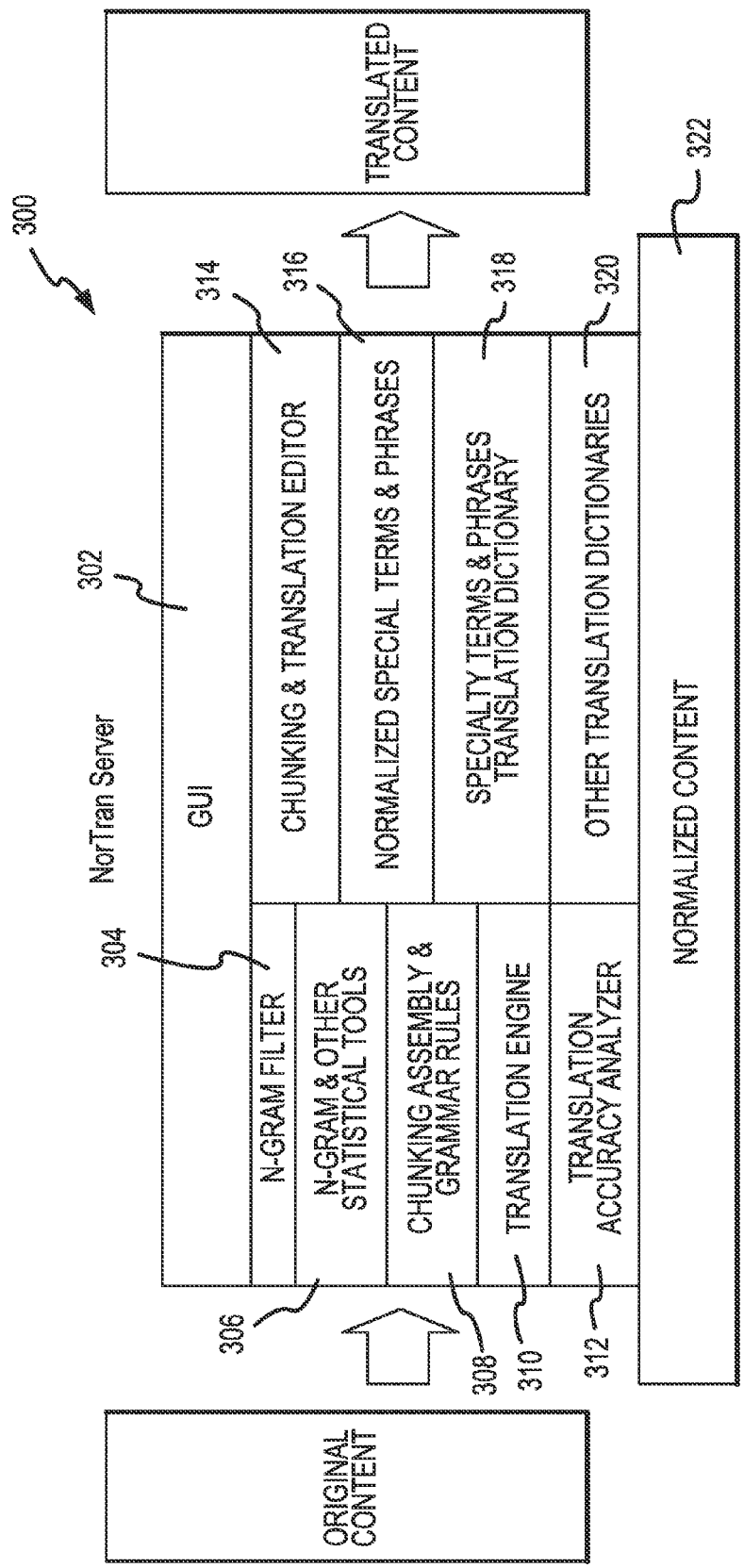
FIG. 3 is a schematic diagram of the NorTran Server components of a SOLx system in accordance with the present invention.

The SOLx paradigm is to use translators to translate repeatable complex terms and phrases, and translation rules to link these phrases together. It uses the best of both manual and machine translation. The SOLx system uses computer technology for repetitive or straightforward applications, and uses people for the complex or special-case situations. The NorTran (Normalization/Translation) server is designed to support this paradigm. FIG. 3 represents a high-level architecture of the NorTran platform 300. Each module is discussed below as it relates to the normalization/classification process. A more detailed description is provided below in connection with the overall SOLx schematic diagram description for configuration and run-time operation.

The GUI 302 is the interface between the subject matter expert (SME) or human translator (HT) and the core modules of the NorTran server. Through this interface, SMEs and HTs define the filters for content chunking, classification access dictionaries, create the terms and phrases dictionaries, and monitor and edit the translated content.

This N-Gram 304 filter for the N-gram analysis defines the parameters used in the N-gram program. The N-gram program is the key statistical tool for identifying the key reoccurring terms and phrases of the original content.

The N-Gram and other statistical tools module 306 is a set of parsing and statistical tools that analyze the original content for significant terms and phrases. The tools parse for the importance of two or more words or tokens as defined by the filter settings. The output is a sorted list of terms with the estimated probabilities of the importance of the term in the totality of the content. The goal is to aggregate the largest re-usable chunks and have them directly classified and translated.

The chunking classification assembly and grammar rules set 308 relates the pieces from one language to another. For example, as discussed earlier, two noun phrases $N_1N_2$ are mapped in Spanish as $N_2$ 'de' $N_1$. Rules may need to be added or existing ones modified by the translator. The rules are used by the translation engine with the dictionaries and the original content (or the normalized content) to reassemble the content in its translated form.

The rules/grammar base language pairs and translation engine 310 constitute a somewhat specialized machine translation (MT) system. The translation engine portion of this system may utilize any of various commercially available translation tools with appropriate configuration of its dictionaries.

Given that the translation process is not an exact science and that round trip processes (translations from A to B to A) rarely work, a statistical evaluation is likely the best automatic tool to assess the acceptability of the translations. The Translation Accuracy Analyzer 312 assesses words not translated, heuristics for similar content, baseline analysis from human translation and other criteria.

The chunking and translation editor 314 functions much like a translator's workbench. This tool has access to the original content; helps the SME create normalized content if required; the normalized content and dictionaries help the translator create the translated terms and phase dictionary, and when that repository is created, helps the translator fill in any missing terms in the translation of the original content. A representation of the chunking functionality of this editor is shown in the example in Table 3.

TABLE 3

| Original Content | Normalized Terms | Freq | Chunk No. | Chunked Orig Cont |
|---|---|---|---|---|
| Round Baker (A) Poland | Emile Henry | 6 | 1 | 7-A-6 |
| Round Baker with Handles (B) Poland | Oval Baker | 6 | 2 | 7-18-B-6 |
| Oval Baker (C) Red E. Henry | Lasagna Baker | 4 | 3 | 2-C-15-1 |
| Oval Baker (D) Polish Pottery | Polish Pottery | 4 | 4 | 2-D-5 |
| Oval Baker (E) Red, Emile Henry | Poland | 2 | 5 | 2-E-15-1 |
| Oval Baker (F) Polish Pottery | Round Baker | 2 | 6 | 2-F-5 |
| Oval Baker (G) Polish Pottery | Baker Chicken Shaped | 1 | 7 | 2-G-5 |
| Oval Baker Polish Pottery (H) | Baker Deep Dish SIGNITURE | 1 | 8 | 2--5-H |
| Lasagna Baker (I) Emile Henry Cobalt | Baker with cover/handles | 1 | 9 | 4-I-1-13 |
| Lasagna Baker (I) Emile Henry Green | Baker Rectangular | 1 | 10 | 4-I-1-14 |
| Lasagna Baker (I) Emile Henry Red | Ceramic | 1 | 11 | 4-I-1-15 |
| Lasagna Baker (I) Emile Henry Yellow | cobalt | 1 | 12 | 4-I-1-17 |
| Baker Chicken Shaped (J) | green | 1 | 13 | 8-J |
| Baker Deep Dish SIGNATURE (K) | red | 1 | 14 | 9-K |
| Baker Rectangular (L) White Ceramic | Signature | 1 | 15 | 11-L-18-12 |
| Baker with cover/handles Polish Pottery | yellow | 1 | 16 | 10-5 |
|  | white | 1 | 17 |  |
|  | with Handles | 1 | 18 |  |

The first column lists the original content from a parts list of cooking dishes. The term (A) etc. are dimensional measurements that are not relevant to the discussion. The second column lists the chunked terms from an N-gram analysis; the third column lists the frequency of each term in the original content set. The fourth column is the number associated with the chunk terms in column 2. The fifth column is the representation of the first column in terms of the sequence of chunked content. Although not shown, a classification lineage is also associated with each chunk to assist in translation, e.g., by resolving ambiguities.

If the translation of each chunk is stored in another column, and translation rules exist for reassembling the chunks, then the content is translated. It could be listed in another column that would have a direct match or link to the original content. Table 4 lists the normalized and translated normalized content.

TABLE 4

| Normalized Terms | Spanish Translation |
|---|---|
| Emile Henry | Emile Henry |
| Oval Baker | Molde de Hornear Ovalado |
| Lasagna Baker | Molde de Hornear para Lasagna |
| Polish Pottery | Alfarería Polaca |
| Poland | Polonia (if Country), Poland (if brandname) |
| Round Baker | Molde de Hornear Redondo |
| Baker Chicken-Shaped | Molde de Hornear en Forma de Pollo |
| Baker Deep Dish SIGNITURE | Molde de Hornear Plato Profundo SIGNATURE |
| Baker with cover/handles | Molde de Hornear con Tapa/Asas |
| Baker Rectangular | Molde de Hornear Rectangular |

TABLE 4-continued

| Normalized Terms | Spanish Translation |
|---|---|
| Ceramic | Alfarería |
| cobalt | Cobalto |
| green | Verde |
| red | Rojo |
| Signature | SIGNATURE (brandname) FIRMA (not brand name) |
| yellow | Amarillo |
| white | Blanco |
| with Handles | Con Asas |

Finally, Table 5 shows the Original Content and the Translated Content that is created by assembling the Translated Normalized Terms in Table 4 according to the Chunked Original Content sequence in Table 3.

TABLE 5

| Original Content | Translated Content |
|---|---|
| Round Baker (A) Poland | Molde de Hornear Redondo (A) Polonia |
| Round Baker with Handles (B) Poland | Molde de Hornear Redondo Con Asas (B) Polonia |
| Oval Baker (C) Red Emile Henry | Molde de Hornear Ovalado Rojo Emile Henry |
| Oval Baker (D) Polish Pottery | Molde de Hornear Ovalado (D) Alfarería Polaca |
| Oval Baker (E) Red, Emile Henry | Molde de Hornear Ovalado (E) Rojo, Emile Henry |
| Oval Baker (F) Polish Pottery | Molde de Hornear Ovalado (F) Alfarería Polaca |
| Oval Baker (G) Polish Pottery | Molde de Hornear Ovalado (G) Alfarería Polaca |
| Oval Baker Polish Pottery (H) | Molde de Hornear Ovalado Alfarería Polaca (H) |
| Lasagna Baker (I) Emile Henry Cobalt | Molde de Hornear para Lasagna (I) Emile Henry Cobalto |
| Lasagna Baker (I) Emile Henry Green | Molde de Hornear para Lasagna (I) Emile Henry Verde |
| Lasagna Baker (I) Emile Henry Red | Molde de Hornear para Lasagna (I) Emile Henry Rojo |
| Lasagna Baker (I) Emile Henry Yellow | Molde de Hornear para Lasagna (I) Emile Henry Amarillo |
| Baker Chicken Shaped (J) | Molde de Hornear en Forma de Pollo (J) |
| Baker Deep Dish SIGNATURE (K) | Molde de Hornear Plato Profundo SIGNATURE (K) |
| Baker Rectangular (L) White Ceramic | Molde de Hornear Rectangular (L) Blanco Alfarería |
| Baker with cover/handles Polish Pottery | Molde de Hornear con Tapa/Asas Alfarería Polaca |

This example shows that when appropriately "chunked," machine translation grammar knowledge for noun phrases can be minimized. However, it cannot be eliminated entirely.

Referring to FIG. 3, the Normalized Special Terms and Phrases repository 316 contains chunked content that is in a form that supports manual translation. It is free of unusual acronyms, misspellings, and strived for consistency. In Table 3 for example, Emile Henry was also listed as E. Henry. Terms usage is maximized.

The Special Terms and Phrases Translation Dictionary repository 318 is the translated normalized terms and phrases content. It is the specialty dictionary for the client content.

Other translation dictionaries 320 may be any of various commercially available dictionary tools and/or SOLx developed databases. They may be general terms dictionaries, industry specific, SOLx acquired content, or any other knowledge that helps automate the process.

One of the tenets of the SOLx process is that the original content need not be altered. Certainly, there are advantages to make the content as internally consistent as possible, and to define some form of structure or syntax to make translations easier and more accurate. However, there are situations where a firm's IT department does not want the original content modified in any way. Taking advantage of the benefits of normalized content, but without actually modifying the original, SOLx uses a set of meta or non-persistent stores so that the translations are based on the normalized meta content 322. Tags reflecting classification information may also be kept here.

Figure 4:
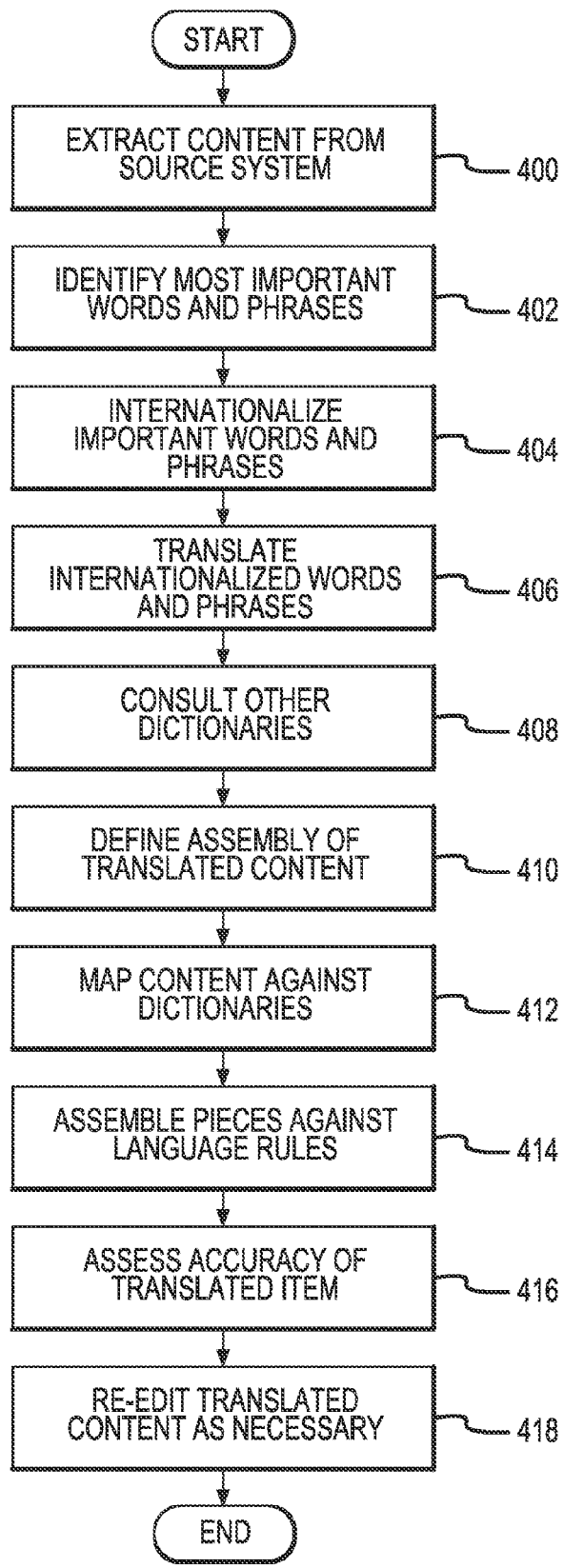
FIG. 4 is a flowchart providing an overview of SOLx system configuration in accordance with the present invention.

The above discussion suggests a number of processes that may be implemented for the automatic translation of large databases of structured content. One implementation of these processes is illustrated in the flowchart of FIG. 4 and is summarized below. It will be appreciated that these processes and the ordering thereof can be modified.

First, the firm's IT organization extracts 400 the content from their IT systems—ideally with a part number or other unique key. As discussed above, one of the key SOLx features is that the client need not restructure or alter the original content in their IT databases. However, there are reasons to do so. In particular, restructuring benefits localization efforts by reducing the translation set up time and improving the translation accuracy. One of these modifications is to adopt a 'normalized' or fixed syntactic, semantic, and grammatical description of each content entry.

Next, software tools identify (402) the most important terms and phrases. Nearest neighbor, filtered N-gram, and other analysis tools identify the most used and important phrases and terms in the content. The content is analyzed one description or item at a time and re-usable chunks are extracted.

Subject matter experts then "internationalize" (404) the important terms and phrases. These experts "translate" the abbreviations and acronyms, correct misspellings and in general redefine and terms that would be ambiguous for translation. This is a list of normalized terms and phrases. It references the original list of important terms and phrases. The SMEs also associate such terms and phrases with a classification lineage.

Translators can then translate (406) the internationalized important terms and phrases. This translated content forms a dictionary of specialty terms and phrases. In essence, this translated content corresponds to the important and re-usable chunks. Depending on the translation engine used, the translator may need to specify the gender alternatives, plural forms, and other language specific information for the special terms and phrases dictionary. Referring again to an example discussed above, translators would probably supply the translation for (four-strand), (color-coded), (twisted-pair), telephone, and wire. This assumes that each term was used repeatedly. Any other entry that uses (color-coded) or wire would use the pre-translated term.

Other dictionaries for general words and even industry specific nomenclature can then be consulted (408) as available. This same approach could be used for the creation of general dictionaries. However, for purposes of this discussion it is assumed that they already exist.

Next, language specific rules are used to define (410) the assembly of translated content pieces. The types of rules described above define the way the pre-translated chunks are reassembled. If, in any one description, the grammatical structure is believed to be more complicated than the pre-defined rule set, then the phrase is translated in its entirety.

The original content (on a per item basis) is then mapped (412) against the dictionaries. Here, the line item content is parsed and the dictionaries are searched for the appropriate chunked and more general terms (content chunks to translated chunks). Ideally, all terms in the dictionaries map to a single-line item in the content database, i.e. a single product description. This is the first function of the translation engine. The classification information may be used to assist in this mapping and to resolve ambiguities.

A software translation engine then assembles (414) the translated pieces against the language rules. Input into the translation engine includes the original content, the translation or assembly rules, and the translated pieces. A translation tool will enable a translator to monitor the process and directly intercede if required. This could include adding a new chunk to the specialty terms database, or overriding the standard terms dictionaries.

A statistically based software tool assesses (416) the potential accuracy of the translated item. One of the difficulties of translation is that when something is translated from one language to another and then retranslated back to the first, the original content is rarely reproduced. Ideally, one hopes it is close, but rarely will it be exact. The reason for this is there is not a direct inverse in language translation. Each language pair has a circle of 'confusion' or acceptability. In other words, there is a propagation of error in the translation process. Short of looking at every translated phrase, the best than can be hoped for in an overall sense is a statistical evaluation.

Translators may re-edit (418) the translated content as required. Since the content is stored in a database that is indexed to the original content on an entry-by-entry basis, any entry may be edited and restored if this process leads to an unsatisfactory translation.

Although not explicitly described, there are terms such as proper nouns, trade names, special terms, etc., that are never translated. The identification of these invariant terms would be identified in the above process. Similarly, converted entries such as metrics would be handled through a metrics conversion process.

The process thus discussed uses both human and machine translation in a different way than traditionally employed. This process, with the correct software systems in place should generate much of the accuracy associated with manual translation. Further, this process should function without manual intervention once sufficient content has been pre-translated.

The various configuration processes are further illustrated by the screenshots of FIGS. 5-10. Although these figures depict screenshots, it will be appreciated that these figures would not be part of the user interface as seen by an SME or other operator. Rather, these screenshots are presented here for purposes of illustration and the associated functionality would, to a significant extent, be implemented transparently. These screenshots show the general processing of source content. The steps are importing the data, normalizing the data based on a set of grammars and rules produced by the SME using the NTW user interface, then analysis of the content to find phrases that need to be translated, building a translation dictionary containing the discovered phrases, translation of the normalized content, and finally, estimation of the quality of the translated content.

Figure 5:
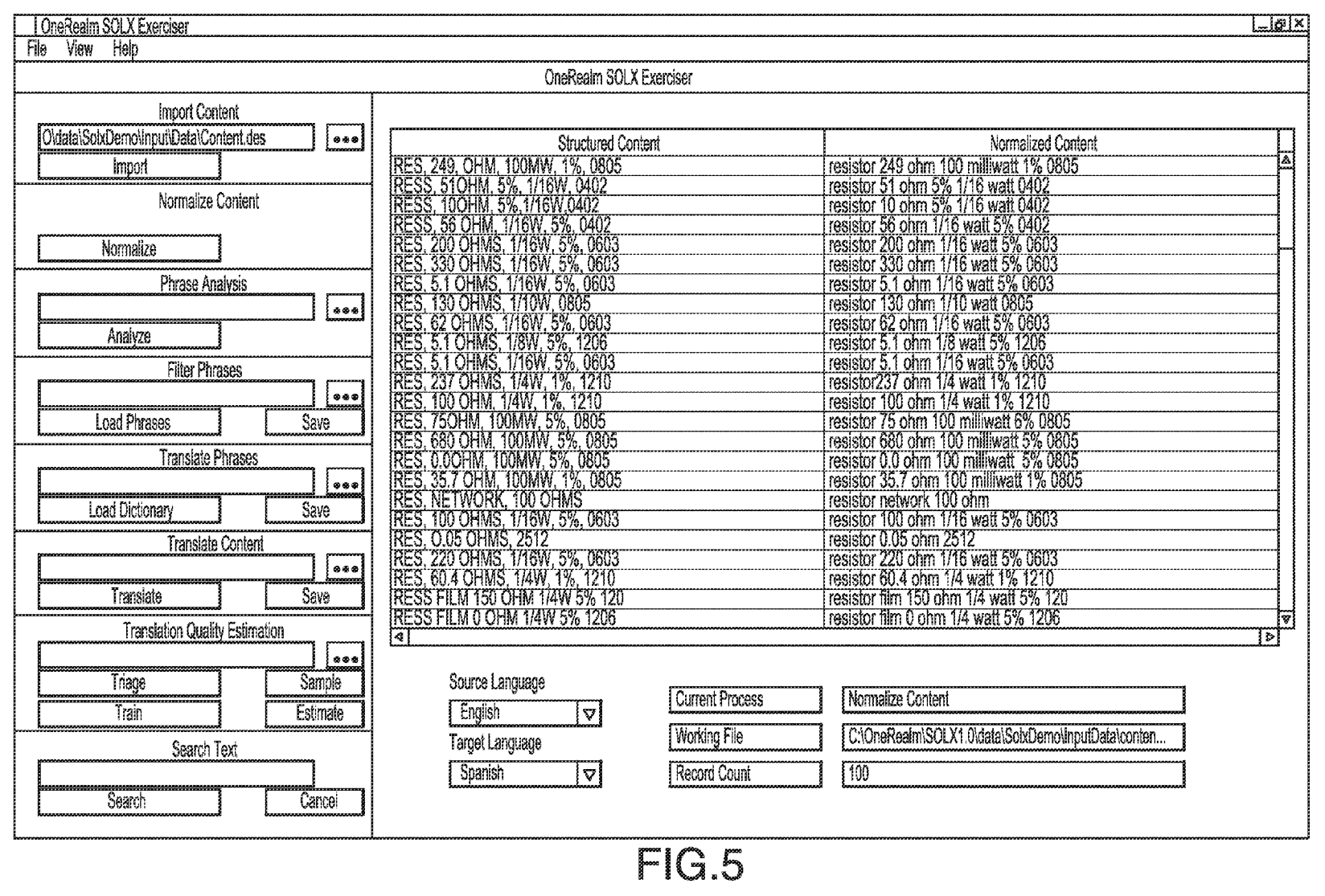

The first step, as illustrated in FIG. 5, is to import the source structured content file. This will be a flat set file with the proper character encoding, e.g., UTF-8. There will generally be one item description per line. Some basic formatting of the input may be done at this point.

Figure 6:
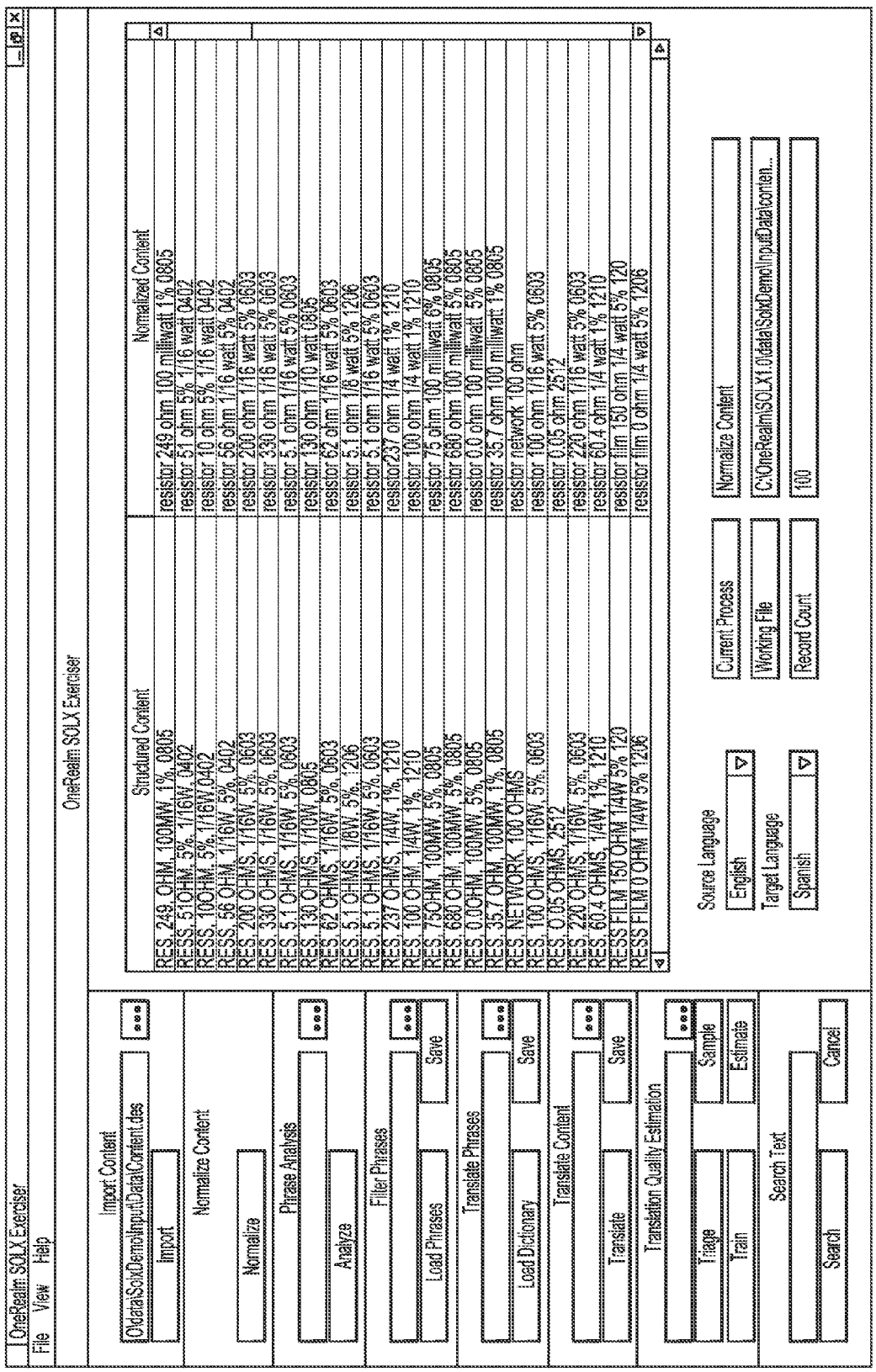
Figure 8:
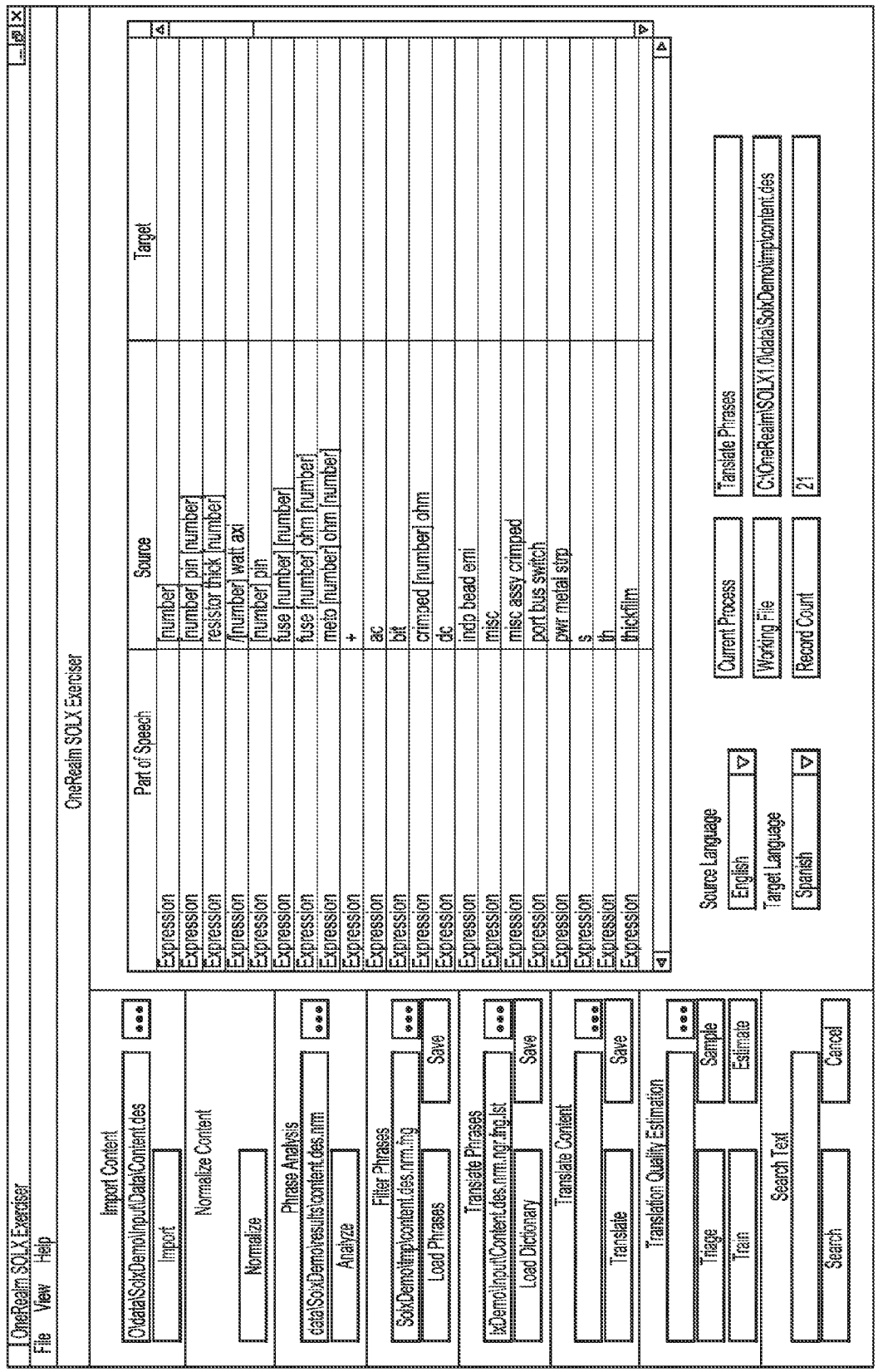

FIG. 6 shows normalized form of the content on the right and the original content (as imported above) on the left. What is not shown here are the grammars and rules used to perform the normalization. The form of the grammars and rules and how to created them are described above.

In this example, various forms of the word resistor that appear on the original content, for example "RES" or RESS" have been normalized to the form "resistor". The same is true for "W" being transformed to "watt" and "MW" to "milliwatt". Separation was added between text items, for example, "1/4W" is now "1/4 watt" or "75 OHM" is now "75 ohm". Punctuation can also be added or removed, for example, "RES,35.7" is now "resistor 35.7". Not shown in the screenshot: the order of the text can also be standardized by the normalization rules. For example, if the user always want a resistor description to of the form:

resistor <ohms rating> <tolerance> <watts rating>
the normalization rules can enforce this standard form, and the normalized content would reflect this structure.

Another very valuable result of the normalization step can be to create a schematic representation of the content. In the phrase analysis step, as illustrated, the user is looking for the phrases in the now normalized content that still need to be translated to the target language. The purpose of Phrase Analysis, and in fact, the next several steps, is to create a translation dictionary that will be used by machine translation. The value in creating the translation dictionary is that only the phrases need translation not the complete body of text, thus providing a huge savings in time and cost to translate. The Phrase Analyzer only shows us here the phrases that it does not already have a translation for. Some of these phrases we do not want to translate, which leads us to the next step.

Figure 7:
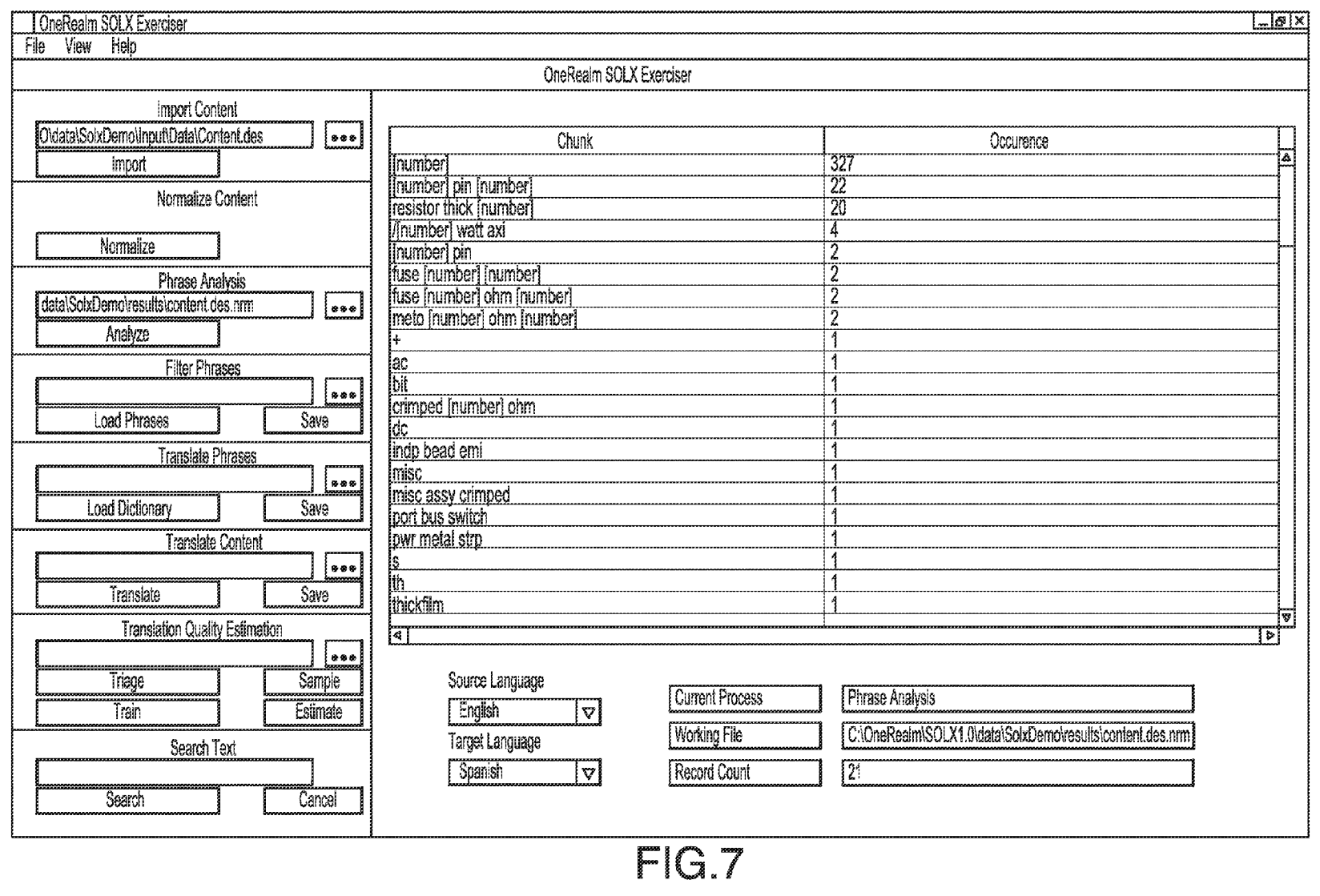
Figure 9:
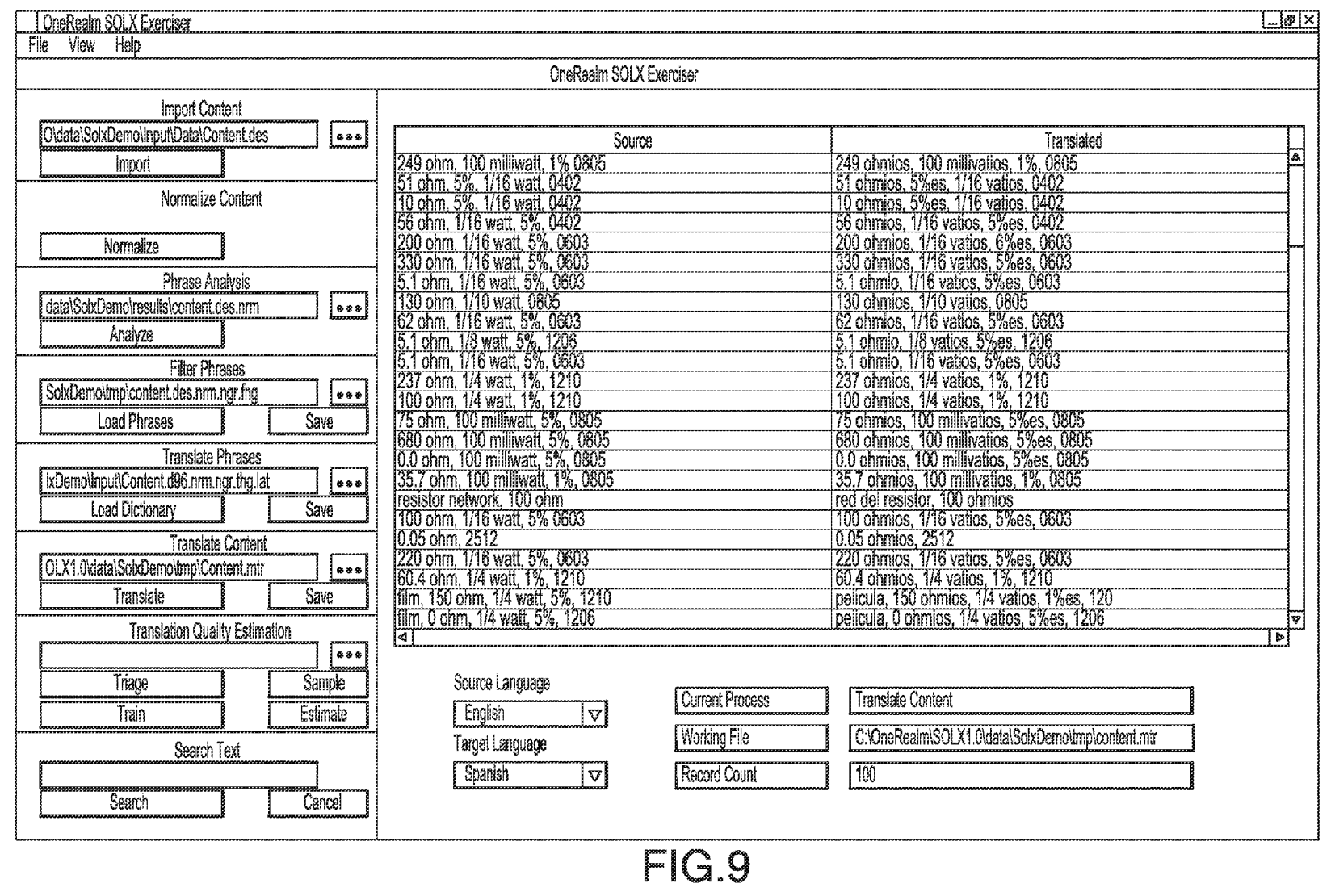

In the filter phrases step as shown in FIG. 7, an SME reviews this phrase data and determines which phrases should be translated. Once the SME has determined which phrases to translate, then a professional translator and/or machine tool translates the phrases (FIGS. 8-9) from the source language, here English, to the target language, here Spanish, using any associated classification information. A SOLx user interface could be used to translate the phrases, or the phrases are sent out to a professional translator as a text file for translation. The translated text is returned as a text file and loaded into SOLx. The translated phrases become the translation dictionary that is then used by the machine translation system.

The machine translation system uses the translation dictionary created above as the source for domain specific vocabulary. By providing the domain specific vocabulary in the form of the translation dictionary, the SOLx system greatly increases the quality of the output from the machine translation system.

Figure 10:
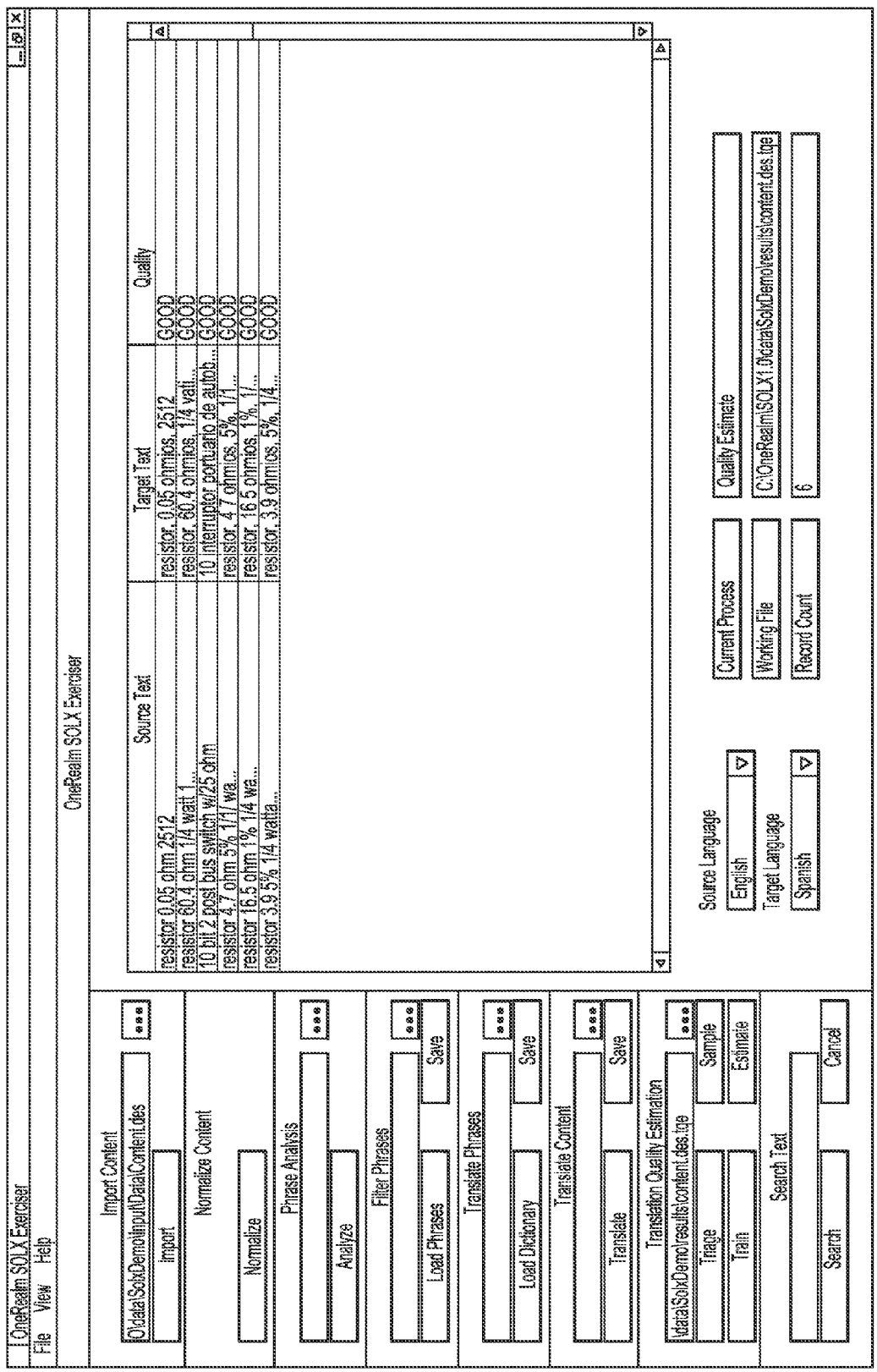

The SOLx system can also then provide an estimation of the quality of the translation result (FIG. 10). Good translations would then be loaded into the run-time localization system for use in the source system architecture. Bad translations would be used to improve the normalization grammars and rules, or the translation dictionary. The grammars, rules, and translation dictionary form a model of the content. Once the model of the content is complete, a very high level of translations are of good quality.

Figure 11:
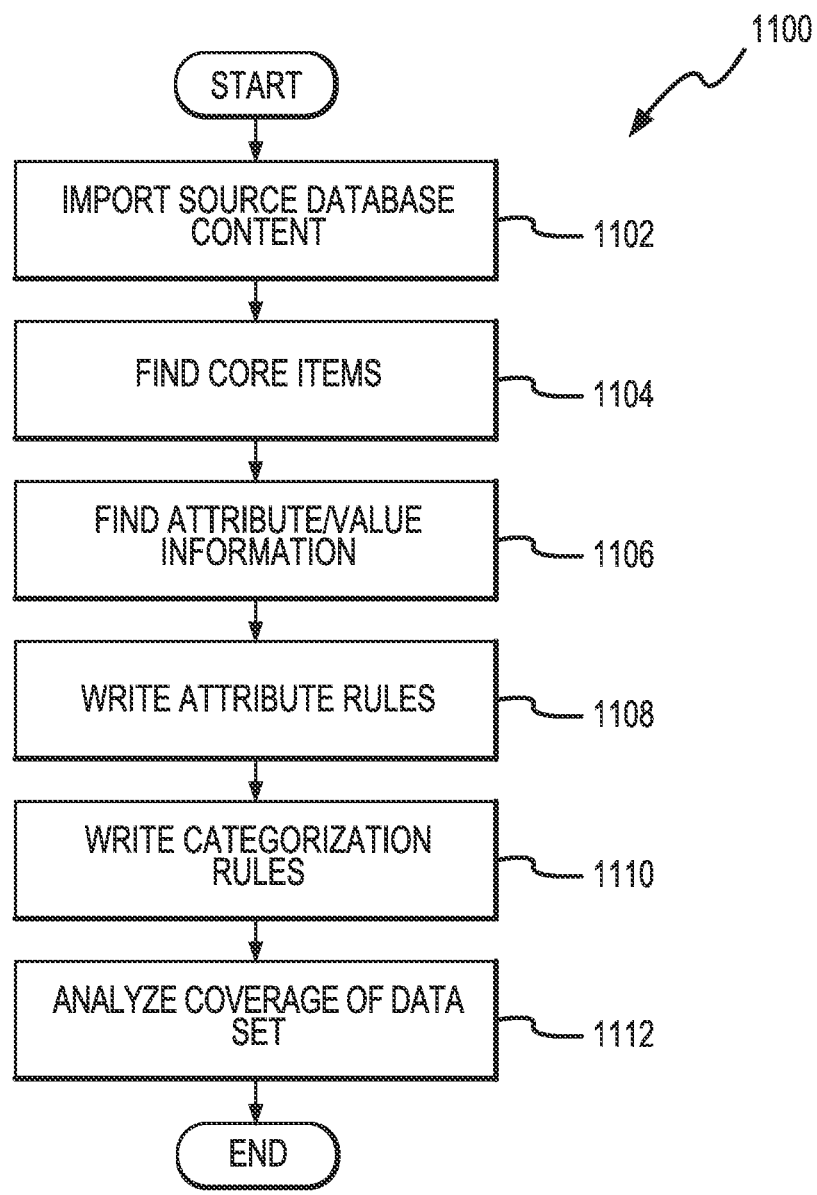
FIG. 11 is a flowchart of a normalization configuration process in accordance with the present invention.
Figure 12:
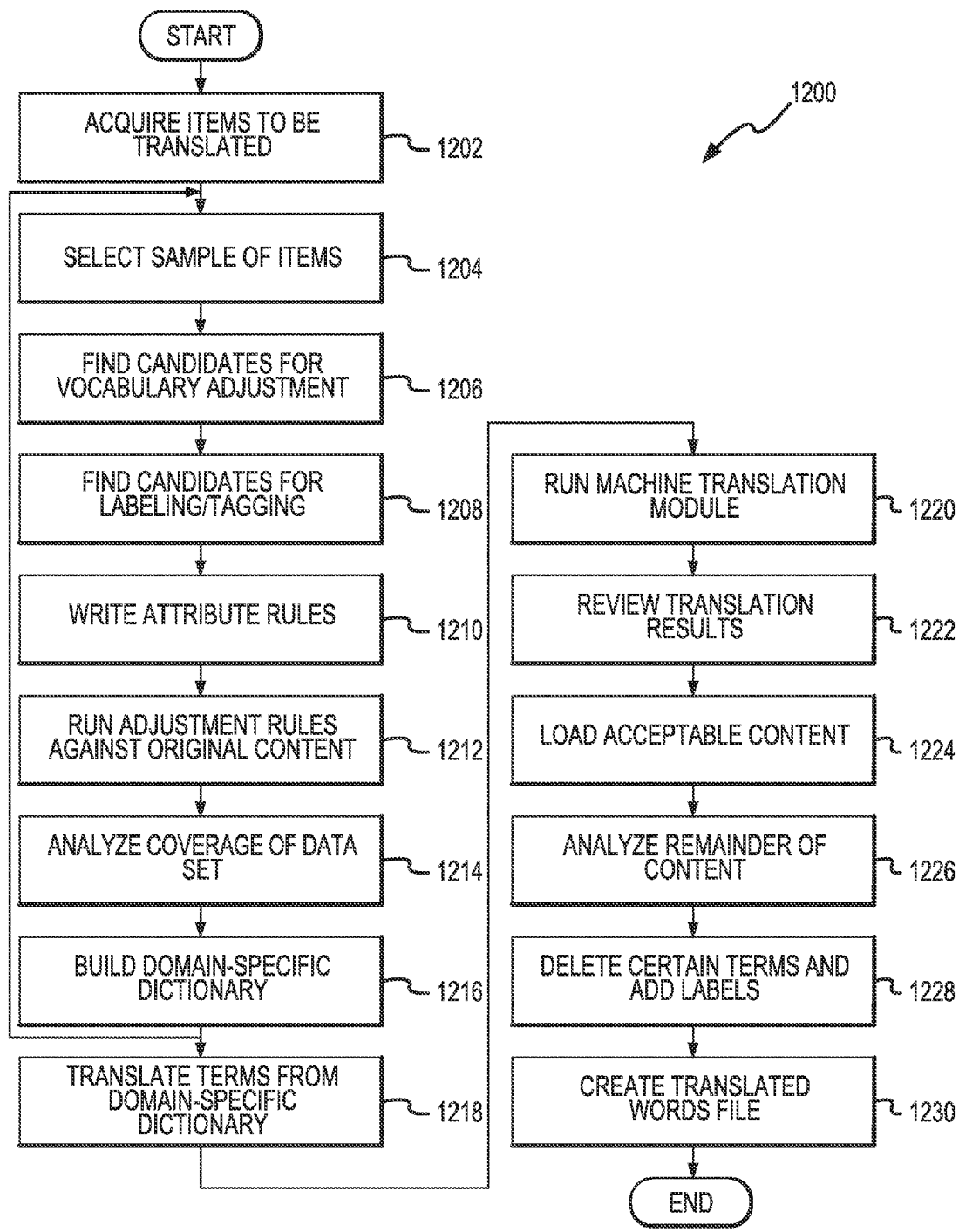
FIG. 12 is a flowchart of a translation configuration process in accordance with the present invention.

Particular implementations of the above described configuration processes can be summarized by reference to the flowcharts of FIGS. 11-12. Specifically, FIG. 11 summarizes the steps of an exemplary normalization configuration process and FIG. 12 summarizes an exemplary translation configuration process.

Referring first to FIG. 11, a new SOLx normalization process (1000) is initiated by importing (1102) the content of a source database or portion thereof to be normalized and selecting a quantify of text from a source database. For example, a sample of 100 item descriptions may be selected from the source content "denoted content.txt file." A text editor may be used to select the 100 lines. These 100 lines are then saved to a file named samplecontent.txt for purposes of this discussion.

The core items in the samplecontent.txt file are then found (1104) using the Candidate Search Engine, for example, by running a words-in-common search. Next, attribute/value information is found (1106) in the samplecontent.txt file using the Candidate Search Engine by running collocation and semantic category searches as described above. Once the attributes/values have been identified, the SOLx system can be used to write (1108) attribute rules. The formalism for writing such rules has been discussed above. It is noted that the SOLx system performs much of this work for the user and simple user interfaces can be provided to enable "writing" of these rules without specialized linguistic or detailed code-writing skills. The SOLx system can also be used at this point to write (1110) categorization or classification rules. As noted above, such categorization rules are useful in defining a context for avoiding or resolving ambiguities in the transformation process. Finally, the coverage of the data set can be analyzed (1112) to ensure satisfactory run time performance. It will be appreciated that the configuration process yields a tool that can not only translate those "chunks" that were processed during configuration, but can also successfully translate new items based on the knowledge base acquired and developed during configuration. The translation process is summarized below.

Referring to FIG. 12, the translation process 1200 is initiated by acquiring (1202) the total set of item descriptions that you want to translate as a flat file, with a single item description per line. For purposes of the present discussion, it is assumed that the item descriptions are in a file with the name of content.txt. A text editor may be used to setup an associated project configuration file.

Next, a sample of 100 item descriptions is selected (1204) from the content.txt file. A text editor may be used to select the 100 lines. These 100 lines to a file named samplecontent.txt.

The translation process continues with finding (1206) candidates for vocabulary adjustment rules in the samplecontent.txt file using the Candidate Search Engine. The Candidate Search Engine may implement a case variant search and full/abbreviated variant search, as well as a classification analysis, at this point in the process. The resulting information can be used to write vocabulary adjustment rules. Vocabulary adjustment rules may be written to convert abbreviated forms to their full forms.

Next, candidates for labeling/tagging rules are found (1208) in the sample/content.txt file using the Candidate Search Engine. Labeling/tagging rules may be written to convert semantic category and collocation forms. Attribute rules can then be written (1210) following the steps set forth in the previous flowchart.

Vocabulary adjustment rules are then run (1212) using the Natural Language Engine against the original content. Finally, the coverage of the data set can be analyzed (1214) evaluating performance of your vocabulary adjustment rules and evaluating performance of your attribute rules. At this point, if the proper coverage is being achieved by the vocabulary adjustment rules, then the process proceeds to building (1216) a domain-specific dictionary. Otherwise, a new set of 100 item descriptions can be selected for analysis and the intervening steps are repeated.

To build a domain specific dictionary, the SME can run a translation dictionary creation utility. This runs using the rule files created above as input, and produces the initial translation dictionary file. This translation dictionary file contains the words and phrases that were found in the rules. The words and phrases found in the translation dictionary file can then be manually and/or machine translated (1218). This involves extracting a list of all word types using a text editor and then translating the normalized forms manually or through a machine tool such as SYSTRAN. The translated forms can then be inserted into the dictionary file that was previously output.

Next, the SME can run (1220) the machine translation module, run the repair module, and run the TQE module. The file outputs from TQE are reviewed (1222) to determine whether the translation results are acceptable. The acceptable translated content can be loaded (1224) into the Localized Content Server (LCS), if desired. The remainder of the translated content can be analyzed (1226) to determine what changes to make to the normalization and translation knowledge bases in order to improve the quality of the translation. Words and phrases that should be deleted during the translation process can be deleted (1228) and part-of-speech labels can be added, if needed. The SME can then create (1230) a file containing the translated words in the source and target languages. Once all of the content is found to be acceptable, the system is fully trained. The good translated content is then loaded into the LCS.

Figure 13:
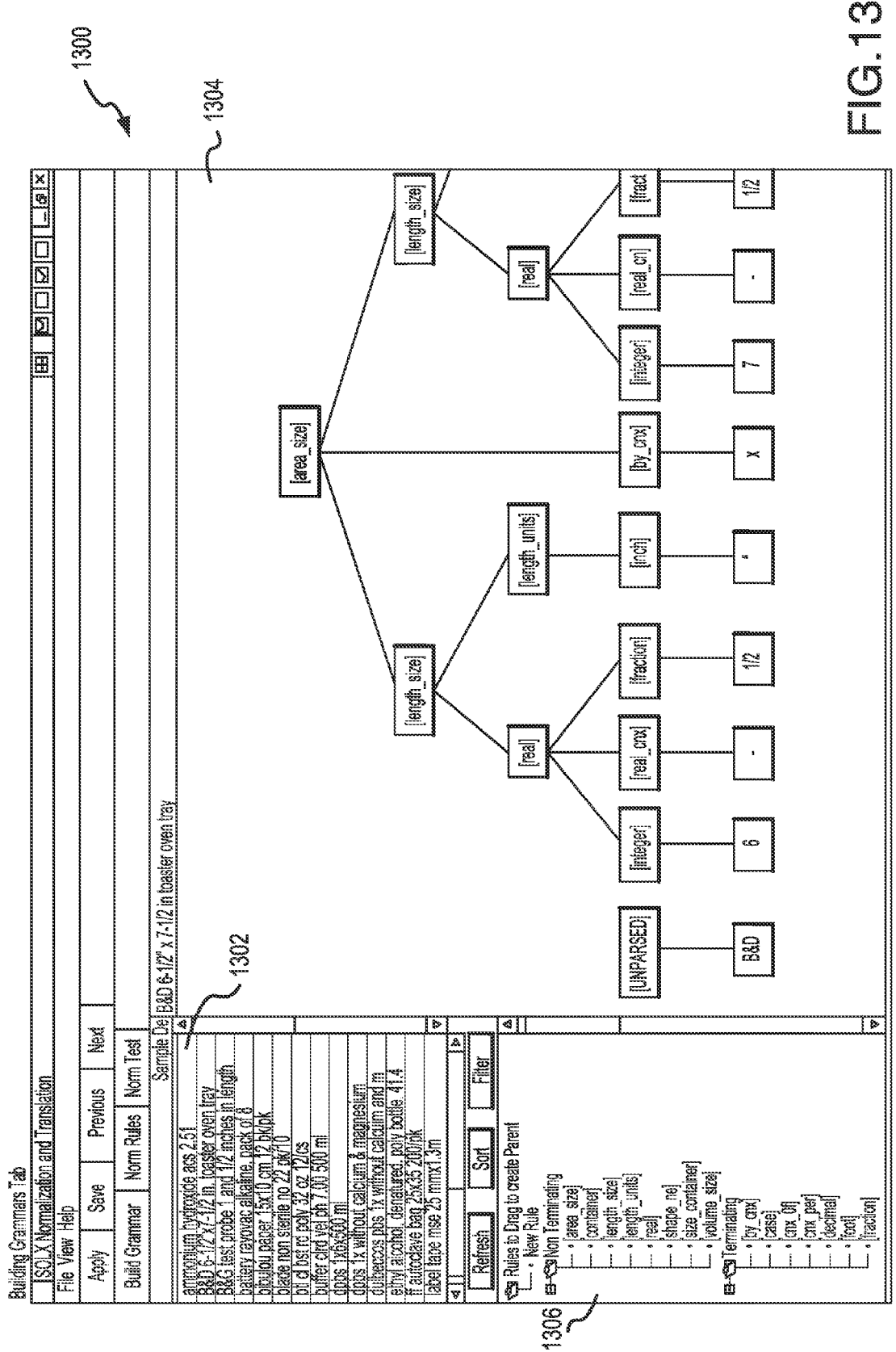
FIG. 13 is an illustration of a graphical desktop implementation for monitoring the configuration process in accordance with the present invention.

It has been found that it is useful to provide graphical feedback during normalization to assist the SME in monitoring progress. Any appropriate user interface may be provided in this regard. FIG. 13 shows an example of such an interface. As shown, the graphical desktop 1300 is divided into multiple workspaces, in this case, including workspaces 1302, 1304 and 1306. One workspace 1302 presents the source file content that is in process, e.g., being normalized and translated. A second area 1304, in this example, functions as the normalization workbench interface and is used to perform the various configuration processes such as replacing various abbreviations and expressions with standardized terms or, in the illustrated example, defining a parse tree. Additional workspaces such as workspace 1306 may be provided for accessing other tools such as the Candidate Search Engine which can identify terms for normalization or, as shown, allow for selection of rules. In the illustrated example, normalized terms are highlighted relative to the displayed source file in workspace 1302 on a currently updated basis. In this manner, the SME can readily determine when all or enough of the source file has been normalized.

In a traditional e-business environment, this translation process essentially is offline. It becomes real-time and online when new content is added to the system. In this case, assuming well-developed special-purpose dictionaries and linguistic information already exists, the process can proceed in an automatic fashion. Content, once translated is stored in a specially indexed look-up database. This database functions as a memory translation repository. With this type of storage environment, the translated content can be scaled to virtually any size and be directly accessed in the e-business process. The associated architecture for supporting both configuration and run-time operation is discussed below.

B. SOLx Architecture

1. Network Architecture Options

The SOLx system operates in two distinct modes. The "off-line" mode is used to capture knowledge from the SME/translator and knowledge about the intended transformation of the content. This collectively defines a knowledge base. The off-line mode includes implementation of the configuration and translation processes described above. Once the knowledge base has been constructed, the SOLx system can be used in a file in/file out manner to transform content.

Figure 14:
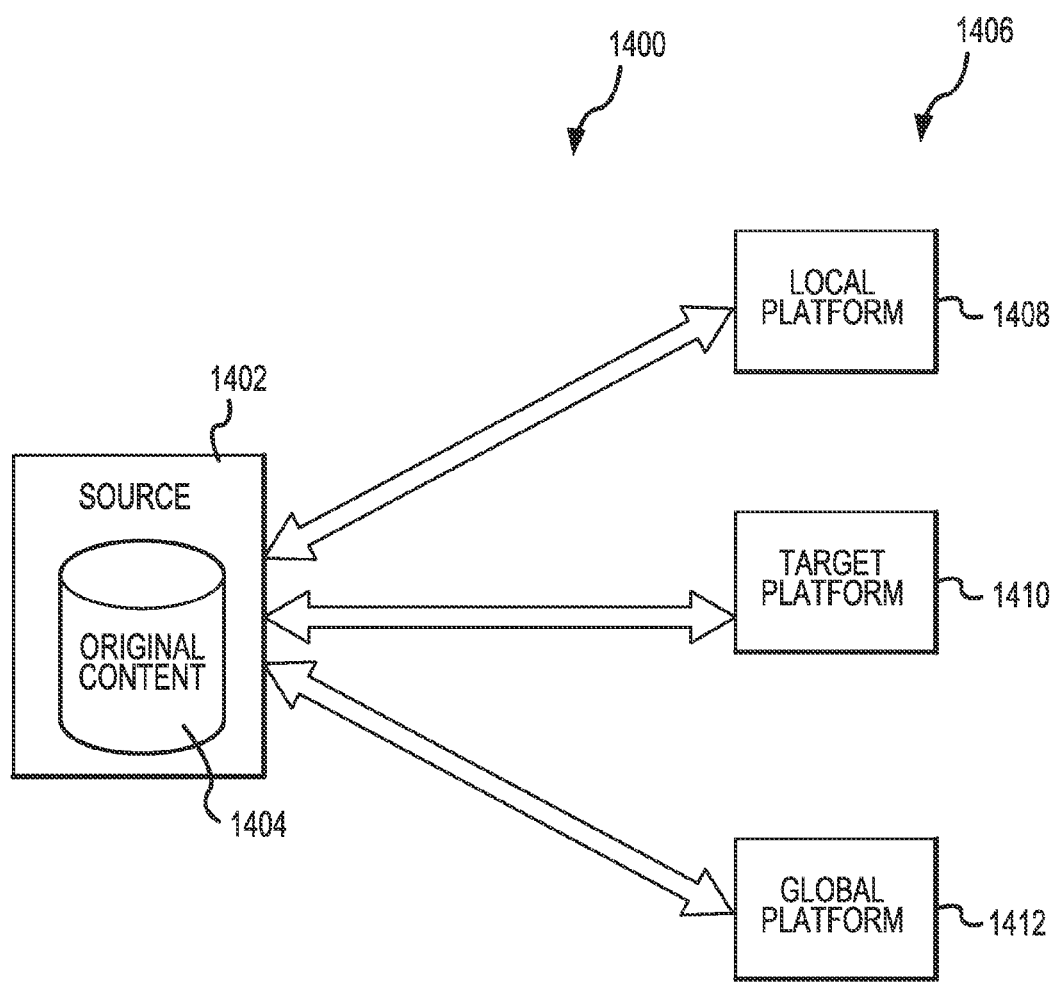
FIG. 14 illustrates various network environment alternatives for implementation of the present invention.

The SOLx system may be implemented in a variety of business-to-business (B2B) or other frameworks, including those shown in FIG. 14. Here the Source 1402, the firm that controls the original content 1404, can be interfaced with three types of content processors 1406. The SOLx system 1400 can interface at three levels: with a Local Platform 1408 (associated with the source 1402), with a Target Platform 1410 (associated with a target to whom the communication is addressed or is otherwise consumed by) and with a Global Platform 1412 (separate from the source 1402 and target 1408).

A primary B2B model of the present invention focuses on a Source/Seller managing all transformation/localization. The Seller will communicate with other Integration Servers (such as WebMethods) and bare applications in a "Point to Point" fashion, therefore, all locales and data are registered and all localization is done on the seller side. However, all or some of the localization may be managed by the buyer or on a third party platform such as the global platform.

Another model, which may be implemented using the global server, would allow two SOLx B2B-enabled servers to communicate in a neutral environment, e.g. English. Therefore, a Spanish and a Japanese system can communicate in English by configuring and registering the local communication in SOLx B2B.

A third model would include a local seller communicating directly (via HTTP) with the SOLx B2B enabled Buyer.

2. Network Interface

Previously, it was discussed how structured content is localized. The next requirement is to rapidly access this content. If there are ongoing requests to access a particular piece of localized content, it may be inefficient to continually translate the original entry. The issues, of course, are speed and potentially quality assurance. One solution is to store the translated content along with links to the original with a very fast retrieval mechanism for accessing the translated content. This is implemented by the SOLx Globalization Server.

The SOLx Globalization server consists of two major components (1) the Document Processing Engine and (2) the Translated Content Server (TCS). The Document Processing Engine is a WebMethods plug-compatible application that manages and dispenses localized content through XML-tagged business objects. The TCS contains language-paired content that is accessed through a cached database. This architecture assures very high-speed access to translated content.

This server uses a hash index on the translated content cross-indexed with the original part number or a hash index on the equivalent original content, if there is not a unique part number. A direct link between the original and translated content via the part number (or hash entry) assures retrieval of the correct entry. The indexing scheme also guarantees very fast retrieval times. The process of adding a new localized item to the repository consists of creating the hash index, link to the original item, and its inclusion into the repository. The TCS will store data in Unicode format.

The TCS can be used in a standalone mode where content can be accessed by the SKU or part number of the original item, or through text searches of either the original content or its translated variant. If the hashed index of the translated content is known. It, of course, can be assessed that way. Additionally, the TCS will support SQL style queries through the standard Oracle SQL query tools.

The Document Processing Engine is the software component of the Globalization Server that allows localized content in the TCS to be integrated into typical B2B Web environments and system-to-system transactions. XML is rapidly replacing EDI as the standard protocol for Web-based B2B system-to-system communication. There are a number of core technologies often call "adaptors" or "integration servers" that translate ERP content, structures, and formats, from one system environment to another. WebMethods is one such adaptor but any such technology may be employed.

Figure 15:
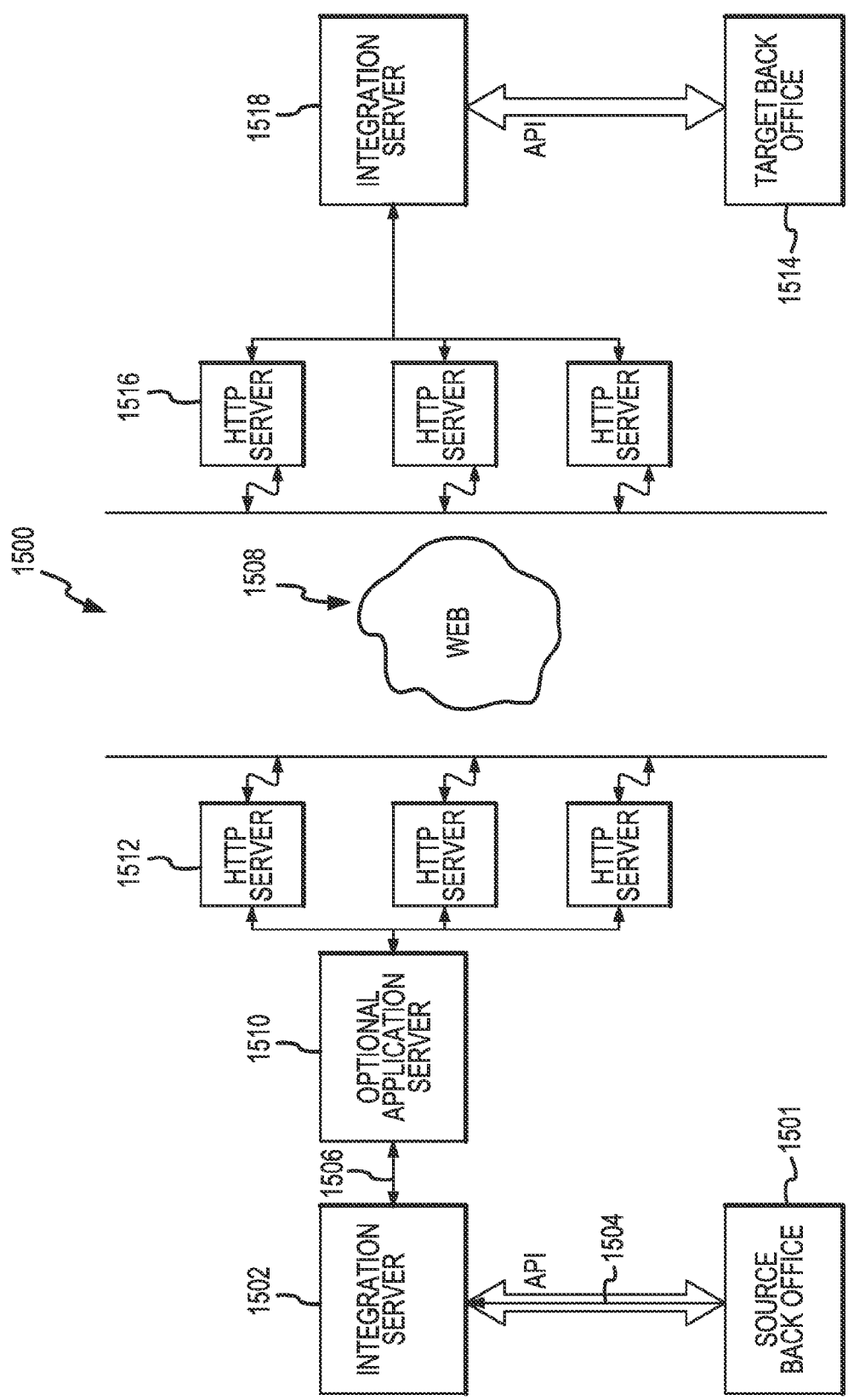
FIG. 15 illustrates a conventional network/web interface.

FIG. 15 shows a conventional web system 1500 where, the WebMethods integration server 1502 takes as input an SAP-formatted content called an IDOC 1504 from a source back office 1501 via API 1503 and converts it into an XML-formatted document 1506 for transmission over the Web 1508 via optional application server 1510 and HTTP servers 1512 to some other receiver such as a Target back office 1510 or other ERP system. The document 1506 may be transmitted to Target back office 1514 via HTTP servers 1516 and an integration server 1518.

Figure 16:
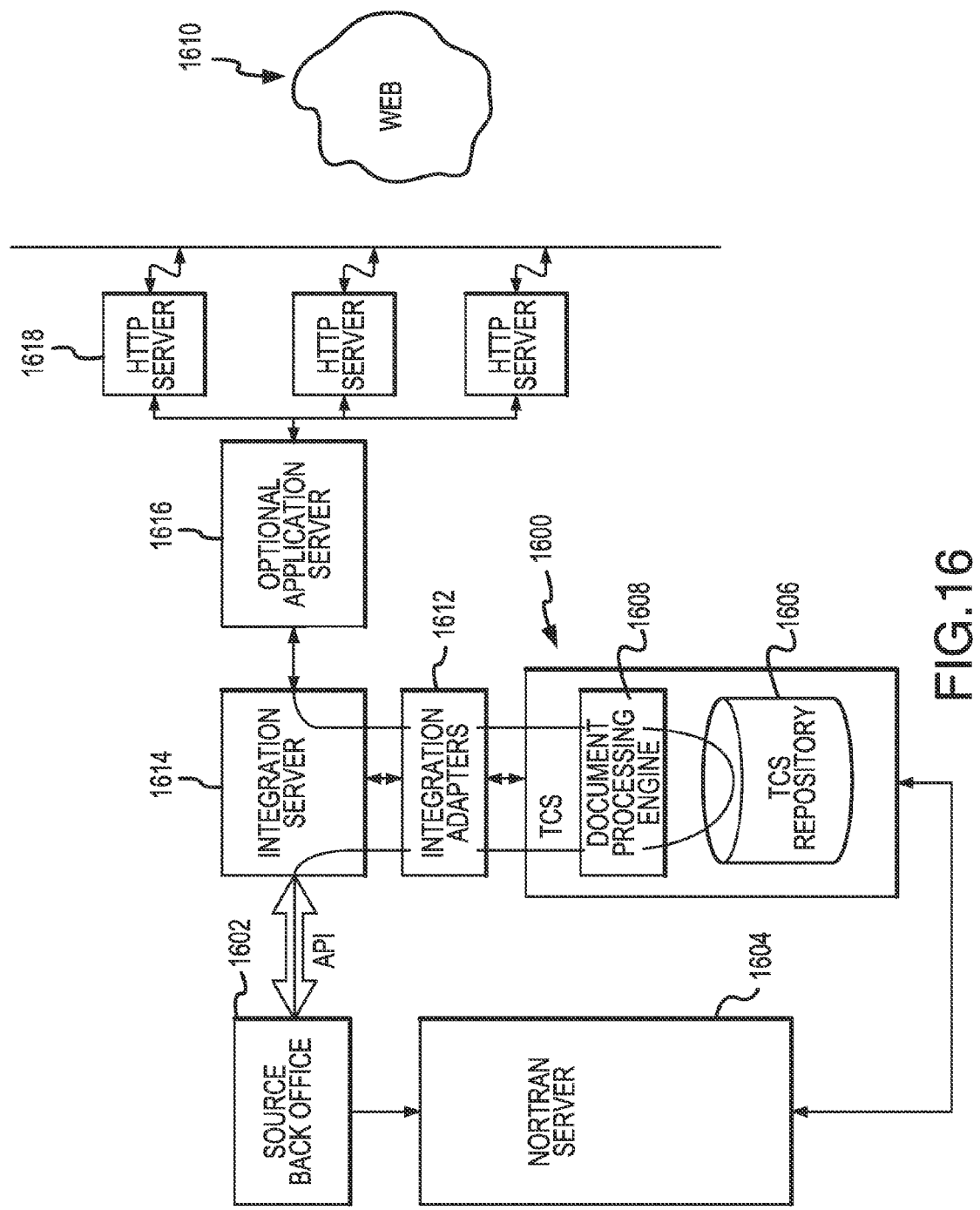
FIG. 16 illustrates a network interface for the SOLx system in accordance with the present invention.

FIG. 16 shows the modification of such a system that allows the TCS 1600 containing translated content to be accessed in a Web environment. In this figure, original content from the source system 1602 is translated by the NorTran Server 1604 and passed to a TCS repository 1606. A transaction request, whether requested from a foreign system or the source system 1602, will pass into the TCS 1600 through the Document Processing Engine 1608. From there, a communication can be transmitted across the Web 1610 via integration server adaptors 1612, an integration server 1614, an optional application server 1616 and HTTP servers 1618.

3. SOLx Component Structure

Figure 17:
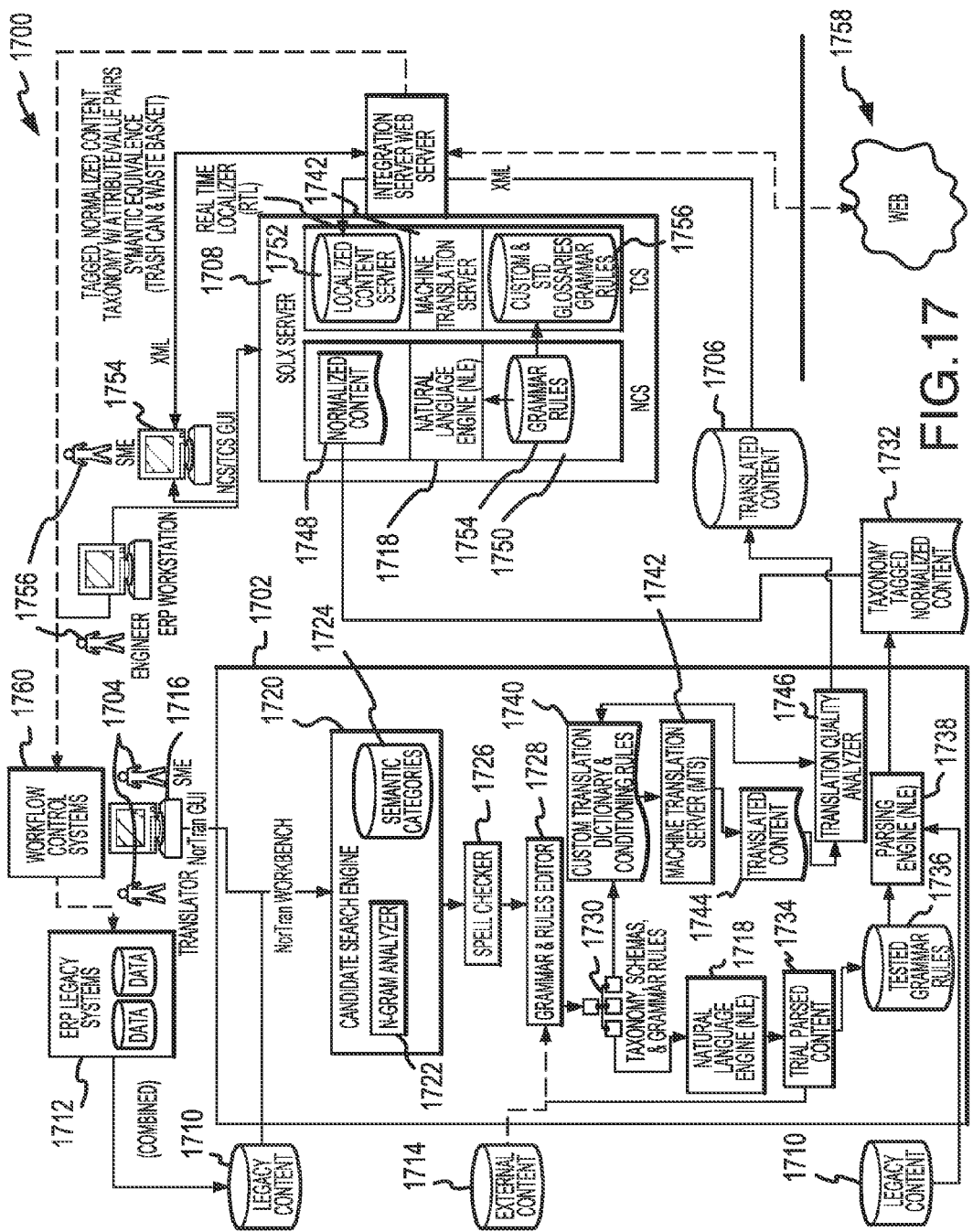
FIG. 17 illustrates a component level structure of the SOLx system in accordance with the present invention.

FIG. 17 depicts the major components of one implementation of the SOLx system 1700 and the SOLx normalization/classification processes as discussed above. The NorTran Workbench/Server 1702 is that component of the SOLx system 1700 that, under the control of a SME/translator 1704, creates normalized/translated content. The SOLx Server 1708 is responsible for the delivery of content either as previously cached content or as content that is created from the real-time application of the knowledge bases under control of various SOLx engines.

The initial step in either a normalization or translation process is to access legacy content 1710 that is associated with the firms' various legacy systems 1712. The legacy content 1710 may be provided as level 1 commerce data consisting of short descriptive phrases delivered as flat file structures that are used as input into the NorTran Workbench 1702.

There are a number of external product and part classification schemas 1714, both proprietary and public. These schemas 1714 relate one class of part in terms of a larger or more general family, a taxonomy of parts for example. These schemas 1714 define the attributes that differentiate one part class from another. For example, in bolts, head style is an attribute for various types of heads such as hex, fillister, Phillips, etc. Using this knowledge in the development of the grammar rules will drastically shorten the time to normalize large quantities of data. Further, it provides a reference to identify many of the synonyms and abbreviations that are used to describe the content.

The NorTran Workbench (NTW) 1702 is used to learn the structure and vocabulary of the content. The NTW user interface 1716 allows the SME 1704 to quickly provide the system 1700 with knowledge about the content. This knowledge is captured in the form of content parsing grammars, normalization rules, and the translation dictionary. As the SME 1704 "trains" the system 1700 in this manner, he can test to see how much of the content is understood based on the knowledge acquired so far. Once the structure and vocabulary are well understood, in other words an acceptable coverage has been gained, then NTW 1702 is used to normalize and translate large quantities of content.

Thus, one purpose of NTW 1702 is to allow SMEs 1704 to use a visual tool to specify rules for parsing domain data and rules for writing out parsed data in a normalized form. The NTW 1702 allows the SME 1704 to choose data samples from the main domain data, then to select a line at a time from that sample. Using visual tools such as drag and drop, and connecting items on a screen to establish relationships, the SME 1704 can build up parse rules that tell the Natural Language Engine (NLE) 1718 how to parse the domain data. The SME 1704 can then use visual tools to create rules to specify how the parsed data will be assembled for output—whether the data should be reordered, how particular groups of words should be represented, and so on. The NTW 1702 is tightly integrated with the NLE 1718. While the NTW 1702 allows the user to easily create, see, and edit parse rules and normalization rules, the NLE 1718 creates and stores grammars from these rules.

Although content parsing grammars, normalization rules, and context tokens constitute the core knowledge created by the SME 1704 using the system 1700, the GUI 1716 does not require the SME 1704 to have any background in computational linguistic, natural language processing or other abstract language skill whatsoever. The content SME 1704 must understand what the content really is, and translators must be technical translators. A "butterfly valve" in French does not translate to the French words for butterfly and valve.

The CSE 1720 is a system initially not under GUI 1716 control that identifies terms and small text strings that repeat often throughout the data set and are good candidates for the initial normalization process.

One purpose of this component is to address issues of scale in finding candidates for grammar and normalization rules. The SOLx system 1700 provides components and processes that allow the SME 1704 to incorporate the knowledge that he already has into the process of writing rules. However, some domains and data sets are so large and complex that they require normalization of things other than those that the SME 1704 is already aware of. Manually discovering these things in a large data set is time-consuming and tedious. The CSE 1720 allows automatic application of the "rules of thumb" and other heuristic techniques that data analysts apply in finding candidates for rule writing.

The CSE component works through the programmatic application of heuristic techniques for the identification of rule candidates. These heuristics were developed from applying knowledge elicitation techniques to two experienced grammar writers. The component is given a body of input data, applies heuristics to that data, and returns a set of rule candidates.

The N-Gram Analysis (NGA) lexical based tool 1722 identifies word and string patterns that reoccur in the content. It identifies single and two and higher word phrases that repeat throughout the data set. It is one of the core technologies in the CSE 1720. It is also used to identify those key phrases that should be translated after the content has been normalized.

Figure 18:
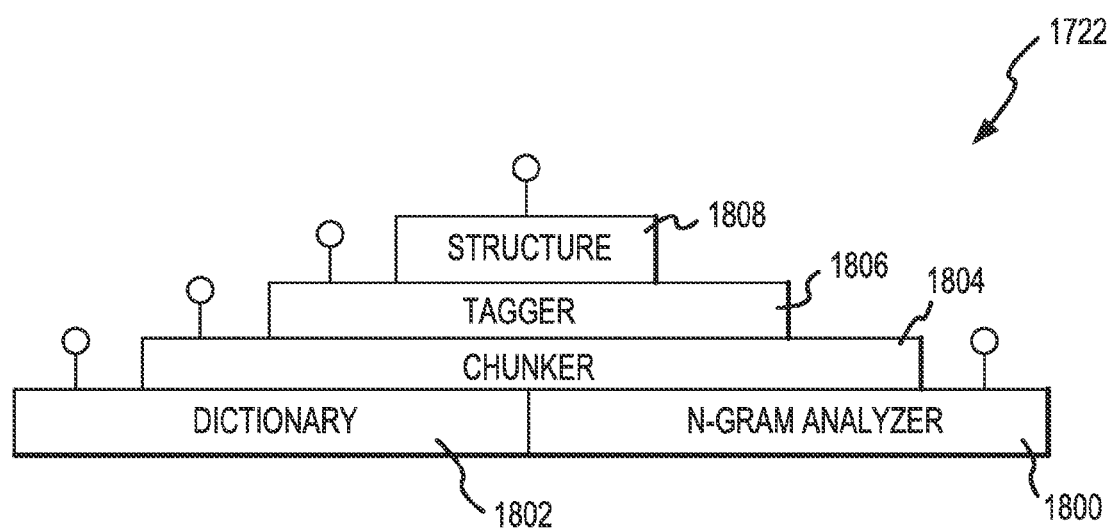
FIG. 18 illustrates a component diagram of an N-Gram Analyzer of the SOLx system in accordance with the present invention.

The N-Gram Analysis tool 1722 consists of a basic statistical engine, and a dictionary, upon which a series of application engines rely. The applications are a chunker, a tagger, and a device that recognizes the structure in structured text. FIG. 18 shows the relationships between these layers.

One purpose of the base N-Gram Analyzer component 1800 is to contribute to the discovery of the structure in structured text. That structure appears on multiple levels, and each layer of the architecture works on a different level. The levels from the bottom up are "words", "terms", "usage", and "dimensions of schema". The following example shows the structure of a typical product description.

acetone amber glass bottle, assay >99.5% color (alpha)<11
The word-level of structure is a list of the tokens in the order of their appearance. The word "acetone" is first, then the word "amber", and so forth.

The terminology-level of structure is a list of the groups of words that act like a single word. Another way of describing terminology is to say that a group of words is a term when it names a standard concept for the people who work in the subject matter. In the example, "acetone", "amber glass", and "color (alpha)" are probably terms.

The next two levels of structure connect the words and terms to the goal of understanding the product description. The SOLx system approximates that goal with a schema for understanding. When the SOLx system operates on product description texts, the schema has a simple form that repeats across many kinds of products. The schema for product descriptions looks like a table.

| Product | Where Used | Color | Quantity/ Package | ... |
|---------|------------|-------|-------------------|-----|
| pliers  | non sterile | black | 1 | ... |
| forceps | sterile    | silver | 6 | ... |
| paint   | exterior   | red   | 1 | ... |
| ...     | ...        | ...   | ... | ... |

Each column of the table is a property that characterizes a product. Each row of the table is a different product. In the cells of the row are the particular values of each property for that product. Different columns may be possible for different kinds of products. This report refers to the columns as "dimensions" of the schema. For other subject matter, the schema may have other forms. This fragment does not consider those other forms.

Returning to the example, the next level of structure is the usage level. That level classifies each word or term according to the dimension of the schema that it can describe. In the example, "acetone" is a "chemical"; "amber glass" is a material; "bottle" is a "product"; and so forth. The following tagged text shows the usage level of structure of the example in detail.

[chemical](acetone) [material](amber glass) [product](bottle) [,](,)

[measurement](assay) [>](>) [number](99) [.](.) [number](5)

[unit_of measure](%) [measurement](color (alpha)) [<](<) [number](11)

The top level of structure that SOLx considers for translation consists of the dimensions of the schema. At that level, grammatical sequences of words describe features of the product in some dimensions that are relevant to that product. In the example, "acetone" describes the dimension "product";

"amber glass bottle" describes a "container of product"; and so forth. The following doubly tagged text shows the dimension-level of structure for the example, without identifying the dimensions.

[schema]([chemical](acetone))
[schema]([material](amber glass) [product](bottle) [,](,))
[schema]([measurement](assay) [>](>) [number](99) [.](.[) [number](5)
[unit_of measure](%))
[schema]([measurement](color (alpha)) [<](<) [number] (11))

Given the structure above, it is possible to insert commas into the original text of the example, making it more readable. The following text shows the example with commas inserted.

acetone, amber glass bottle, assay>99.5%, color (alpha) <11

This model of the structure of text makes it possible to translate more accurately.

The discovery of structure by N-Gram Analysis is parallel to the discovery of structure by parsing in the Natural Language Engine. The two components are complementary, because each can serve where the other is weak. For example, in the example above, the NLE parser could discover the structure of the decimal number, "[number](99.5)", saving NGA the task of modeling the grammar of decimal fractions. The statistical model of grammar in NGA can make it unnecessary for human experts to write extensive grammars for NLE to extract a diverse larger-scale grammar. By balancing the expenditure of effort in NGA and NLE, people can minimize the work necessary to analyze the structure of texts.

One of the basic parts of the NGA component 1800 is a statistical modeler, which provides the name for the whole component. The statistical idea is to count the sequences of words in a body of text in order to measure the odds that a particular word appears after a particular sequence. In mathematical terms, the statistical modeler computes the conditional probability of word n, given words 1 through n−1: $P(w_n|w_1, \ldots, w_{n-1})$.

Using that statistical information about a body of text, it is possible to make reasonable guesses about the structure of text. The first approximation of a reasonable guess is to assume that the most likely structure is also the structure that the author of the text intended. That assumption is easily incorrect, given the variety of human authors, but it is a good starting place for further improvement.

The next improvement toward recognizing the intent of the author is to add some specific information about the subject matter. The dictionary component 1802 captures that kind of information at the levels of words, terms, and usage. Two sources may provide that information. First, a human expert could add words and terms to the dictionary, indicating their usage. Second, the NLE component could tag the text, using its grammar rules, and the NGA component adds the phrases inside the tags to the dictionary, using the name of the tag to indicate the usage.

The information in the dictionary complements the information in the statistical model by providing a better interpretation of text when the statistical assumption is inappropriate. The statistical model acts as a fallback analysis when the dictionary does not contain information about particular words and phrases.

The chunker 1804 combines the information in the dictionary 1802 and the information in the statistical model to partition a body of texts into phrases. Partitioning is an approximation of parsing that sacrifices some of the details of parsing in order to execute without the grammar rules that parsing requires. The chunker 1804 attempts to optimize the partitions so each cell is likely to contain a useful phrase. One part of that optimization uses the dictionary to identify function words and excludes phrases that would cut off grammatical structures that involve the function words.

The chunker can detect new terms for the dictionary in the form of cells of partitions that contain phrases that are not already in the dictionary. The output of the chunker is a list of cells that it used to partition the body of text.

The tagger 1806 is an enhanced form of the chunker that reports the partitions instead of the cells in the partitions. When a phrase in a cell of a partition appears in the dictionary, and the dictionary entry has the usage of the phrase, the tagger prints the phrase with the usage for a tag. Otherwise, the tagger prints the phrase without a tag. The result is text tagged with the usage of the phrases.

The structurer 1808 uses the statistical modeler to determine how to divide the text into dimensions of the schema, without requiring a person to write grammar rules. The training data for the structurer's statistical model is a set of tagged texts with explicit "walls" between the dimensions of the schema. The structurer trains by using the N-Gram Analyzer 1800 to compute the conditional probabilities of the walls in the training data. The structurer 1808 operates by first tagging a body of text and then placing walls into the tagged text where they are most probable.

Referring again to FIG. 17, the candidate heuristics are a series of knowledge bases, much like pre-defined templates that kick-start the normalization process. They are intended to address pieces of content that pervade user content. Items such as units of measure, power consumption, colors, capacities, etc. will be developed and semantic categories 1724 are developed.

The spell checker 1726 is a conventional module added to SOLx to increase the effectiveness of the normalization.

The Grammar & Rules Editor (GRE) 1728 is a text-editing environment that uses many Unix like tools for creation of rules and grammars for describing the content. It can always be used in a "fall-back" situation, but will rarely be necessary when the GUI 1716 is available.

The Taxonomy, Schemas, & Grammar Rules module 1730 is the output from either the GRE 1728 or the GUI 1716. It consists of a set of ASCII files that are the input into the natural language parsing engine (NLE) 1718.

On initialization, the NLE 1718 reads a set of grammar and normalization rules from the file system or some other persistent storage medium and compiles them into a set of Rule objects employed by the runtime tokenizer and parser and a set of NormRule objects employed by the normalizer. Once initialized the NLE 1718 will parse and normalize input text one line at a time or may instead process a text input file in batch mode, generating a text output file in the desired form.

Configuration and initialization generally requires that a configuration file be specified. The configuration file enumerates the contents of the NLE knowledge base, providing a list of all files containing format, grammar, and normalization rules.

NLE 1718 works in three steps: tokenization, parsing, and normalization. First, the input text is tokenized into one or more candidate token sequences. Tokenization is based on what sequences of tokens may occur in any top-level phrase parsed by the grammar. Tokens must be delineated by white space unless one or more of such tokens are represented as regular expressions in the grammar, in which case the tokens may be contiguous, undelineated by white space. Tokenization may yield ambiguous results, i.e., identical strings that may be parsed by more than one grammar rule. The parser resolves such ambiguities.

The parser is a modified top-down chart parser. Standard chart parsers assume that the input text is already tokenized, scanning the string of tokens and classify each according to its part-of-speech or semantic category. This parser omits the scanning operation, replacing it with the prior tokenization step. Like other chart parsers, it recursively predicts those constituents and child constituents that may occur per the grammar rules and tries to match such constituents against tokens that have been extracted from the input string. Unlike the prototypical chart parser, it is unconstrained where phrases may begin and end, how often they may occur in an input string, or some of the input text might be unable to be parsed. It generates all possible parses that occur, starting at any arbitrary white space delineated point in the input text, and compares all possible parse sequences, selecting the best scoring alternative and generating a parse tree for each. If more than one parse sequence achieves the best score, both parse trees are extracted from the chart and retained. Others are ignored.

Output of the chart parser and the scoring algorithm is the set of alternative high scoring parse trees. Each parse tree object includes methods for transforming itself according to a knowledge base of normalization rules. Each parse tree object may also emit a String corresponding to text contained by the parse tree or such a String together with a string tag. Most such transformation or emission methods traverse the parse tree in post-order, being applied to a parse tree's children first, then being applied to the tree itself. For example, a toString( )method collects the results of toString( ) for each child and only then concatenates them, returning the parse tree's String representation. Thus, normalization and output is accomplished as a set of traversal methods inherent in each parse tree. Normalization includes parse tree transformation and traversal methods for replacing or reordering children (re-write rules), for unconditional or lookup table based text replacement, for decimal punctuation changes, for joining constituents together with specified delimiters or without white space, and for changing tag labels.

The Trial Parsed Content 1734 is a set of test samples of either tagged or untagged normalized content. This sample corresponds to a set of rules and grammars that have been parsed. Trial parsed content is the output of a statistical sample of the original input data. When a sequence of content samples parses to a constant level of unparsed input, then the set if grammars and rules are likely to be sufficiently complete that the entire data may be successfully parsed with a minimum of ambiguities and unparsed components. It is part of the interactive process to build grammars and rules for the normalization of content.

A complete tested grammar and rule set 1736 corresponding to the full unambiguous tagging of content is the goal of the normalization process. It insures that all ambiguous terms or phrases such as Mil that could be either a trade name abbreviation for Milwaukee or an abbreviation for Military have been defined in a larger context. This set 1736 is then given as input to the NLE Parsing Engine 1738 that computes the final normalized content, and is listed in the figure as Taxonomy Tagged Normalized Content 1732.

The custom translation dictionary 1740 is a collection of words and phrases that are first identified through the grammar rule creation process and passed to an external technical translator. This content is returned and is entered into one of the custom dictionaries associated with the machine translation process. There are standard formats that translators typically use for sending translated content.

The MTS 1742 may be any of various conventional machine translation products that given a set of custom dictionaries as well as its standard ones, a string of text in one language, produces a string of test in the desired language. Current languages supported by one such product marked under the name SYSTRAN include: French, Portuguese, English, German, Greek, Spanish, Italian, simplified Chinese, Japanese, and Korean. Output from the MTS is a Translated Content file 1744.

The one purpose of the Machine Translation Server 1742 is to translate structured texts, such as product descriptions. The state of the art in commercial machine translation is too weak for many practical applications. The MTS component 1742 increases the number of applications of machine translation by wrapping a standard machine translation product in a process that simplifies its task. The simplification that MTS provides comes from its ability to recognize the structure of texts to be translated. The MTS decomposes the text to be translated into its structural constituents, and then applies machine translation to the constituents, where the translation problem is simpler. This approach sacrifices the fidelity of references between constituents in order to translate the individual constituents correctly. For example, adjective inflections could disagree with the gender of their objects, if they occur in different constituents. The compromise results in adequate quality for many new applications in electronic commerce. Future releases of the software will address this issue, because the compromise is driven by expedience.

The conditioning component of MTS 1742 uses the NGA component to recognize the structure of each text to be translated. It prepares the texts for translation in a way that exploits the ability of the machine translation system to operate on batches of texts. For example, SYSTRAN can interpret lists of texts delimited by new-lines, given a parameter stating that the document it receives is a parts list. Within each line of text, SYSTRAN can often translate independently between commas, so the conditioning component inserts commas between dimensions of the schema if they are not already present. The conditioning component may completely withhold a dimension from machine translation, if it has a complete translation of that dimension in its dictionary.

The machine translation component provides a consistent interface for a variety of machine translation software products, in order to allow coverage of language pairs.

The repair component is a simple automated text editor that removes unnecessary words, such as articles, from SYSTRAN's Spanish translations of product descriptions. In general, this component will correct for small-scale stylistic variations among machine translation tools.

The Translation Quality Estimation Analyzer (TQA) 1746 merges the structural information from conditioning with the translations from repair, producing a list of translation pairs. If any phrases bypassed machine translation, this merging process gets their translations from the dictionary.

After merging, translation quality estimation places each translation pair into one of three categories. The "good" category contains pairs whose source and target texts have acceptable grammar, and the content of the source and target texts agrees. A pair in the "bad" category has a source text with recognizable grammar, but its target grammar is unacceptable or the content of the source text disagrees with the content of the target text. The "ugly" category contains pairs whose source grammar is unfamiliar.

The feedback loop extracts linguistic knowledge from a person. The person examines the "bad" and "ugly" pairs and takes one of the following actions. The person may define words and terms in the dictionary, indicating their usage. The person may define grammar rules for the NLE component in order to tag some part of the text. The person may correct the translation pair (if it requires correction), and place it into the set of examples for training the translation quality estimation models. The person may take the source text, mark it with walls between dimensions of the schema, and place it into the set of examples for training the structure model. An appropriate graphical user interface will make the first and last actions implicit in the third action, so a person will only have to decide whether to write grammars or to correct examples.

The translation quality estimation component uses two models from the N-Gram Analyzer that represent the grammar of the source and target texts. The translation quality estimation component also uses a content model that is partially statistical and partially the dictionary. The two parts overlap in their ability to represent the correspondence in content between source and target texts. The dictionary can represent exact correspondences between words and terms. The statistical model can recognize words that occur in one language, but are unnecessary in the other, and other inexact correspondences.

It is well known that the accuracy of machine translations based on standard glossaries are only sufficient to get the gist of the translation. There are no metrics associated with the level of accuracy of any particular translation. The TQA 1746 attempts to define a measure of accuracy for any single translation. The basis for the accuracy estimate is a statistical overlap between the translated content at the individual phrase level, and prior translations that have been manually evaluated.

The Normalized Content 1748 and/or Translated Content 1706 can next be cached in the Normalized Content Server and Localized Content Server (LCS) 1752, respectively. This cached data is made available through the SOLx Server 1708.

The LCS 1752 is a fast lookup translation cache. There are two parts to the LCS 1752: an API that is called by Java clients (such as a JSP server process) to retrieve translations, and an user interface 1754 that allows the user 1756 to manage and maintain translations in the LCS database 1752.

As well as being the translation memory foundation of the SOLx system 1700, the LCS 1752 is also intended to be used as a standalone product that can be integrated into legacy customer servers to provide translation lookups.

The LCS 1752 takes as input source language text, the source locale, and the target locale. The output from LCS 1752 is the target text, if available in the cache, which represents the translation from the source text and source locale, into the target locale. The LCS 1752 is loaded ahead of run-time with translations produced by the SOLx system 1700. The cache is stored in a relational database.

The SOLx Server 1708 provides the customer with a mechanism for run-time access to the previously cached, normalized and translated data. The SOLx Server 1708 also uses a pipeline processing mechanism that not only permits access to the cached data, but also allows true on-the-fly processing of previously unprocessed content. When the SOLx Server encounters content that has not been cached, it then performs the normalization and/or translation on the fly. The existing knowledge base of the content structure and vocabulary is used to do the on-the-fly processing.

Additionally, the NCS and LCS user interface 1754 provides a way for SMEs 1756 to search and use normalized 1748 and translated 1706 data. The NCS and LCS data is tied back to the original ERP information via the customer's external key information, typically an item part number.

As shown in FIG. 1700, the primary NorTran Workbench engines are also used in the SOLx Server 1708. These include: N-Gram Analyzer 1722, Machine Translation Server 1742, Natural Language Engine 1718, Candidate Search Engine 1720, and Translation Quality Analyzer 1746. The SOLx server 1708 also uses the grammar rules 1754 and custom and standard glossaries 1756 from the Workbench 1702. Integration of the SOLx server 1708 for managing communication between the source/legacy system 1712 and targets via the Web 1758 is managed by an integration server 1758 and a workflow control system 1760.

Figure 21:
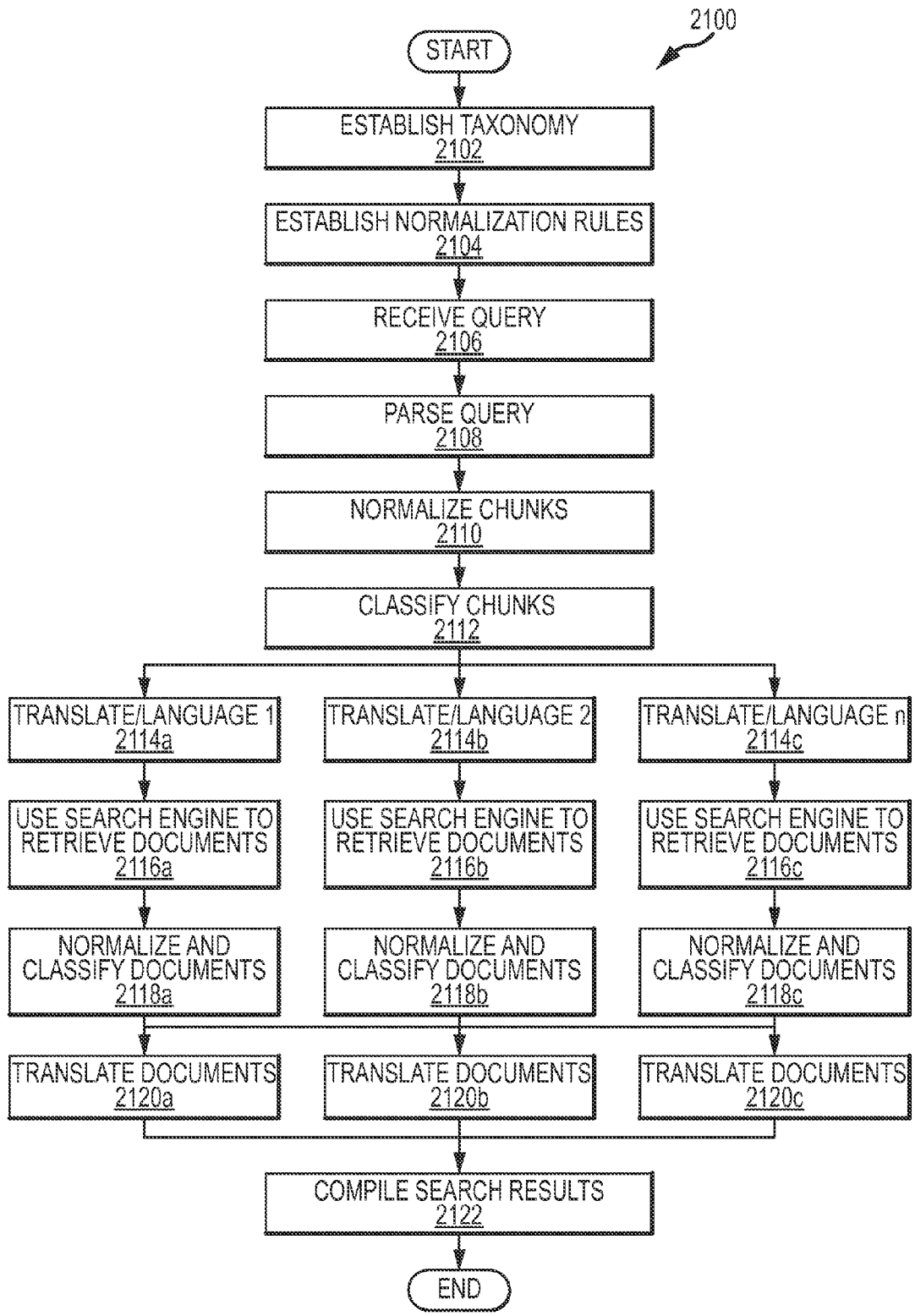
FIG. 21 is a flowchart illustrating a process for searching a database in accordance with the present invention.

FIG. 21 is a flowchart illustrating a process 2100 for searching a database or network using normalization and classification as discussed above. The process 2100 is initiated by establishing (2102) a taxonomy and establishing (2104) normalization rules as discussed above. For example, the taxonomy may define a subject matter area in the case of a specialized search engine or a substantial portion of a language for a more generalized tool. Once the taxonomy and normalization rules have been initially established, a query is received (2106) and parsed (2108) into chunks. The chunks are then normalized (2110) and classified (2112) using the normalization rules and taxonomy. The classification information may be associated with the chunks via tags, e.g., XML tags.

At this point, the normalized chunks may be translated (2114 a-c) to facilitate multi-language searching. The process for translating is described in more detail below. One or more research engines are then used (2116 a-c) to perform term searches using the normalized chunks and the classification information. Preferably, documents that are searched have also been processed using compatible normalization rules and a corresponding taxonomy as discussed above such that responsive documents can be retrieved based on a term match and/or a tag match. However, the illustrated process 2100 may be advantageously used even in connection with searching unprocessed documents, e.g., by using the normalized chunks and/or terms associated with the classification to perform a conventional term search. The responsive documents may then be normalized and classified (2118 a-c) and translated (2120 a-c) as described in more detail below. Finally, the search results are compiled (2122) for presentation to the searcher. It will be appreciated that normalization and classification of the search query thus facilitates more structured searching of information in a database or network including in a multi-language environment. Normalization and classification also assist in translation by reducing the quantity of terms required to be translated and by using the classification structure to reduce ambiguities.

III. Information Sharing

As will be appreciated from the discussion above, preparing the transformation system for a particular application involves significant effort by one or more human operators or SMEs. Such effort relates, inter alia, to mapping of source collection terms to a standardized terminology, associating terms with a classification system or taxonomy, e.g., as reflected in a tag structure, and establishing syntax rules. This is accomplished with the assistance of a tool denoted the Knowledge Builder tool below.

Even with the assistance of the Knowledge Builder tool, this preparation process can be time consuming and cumbersome. It is therefore desirable to allow for reuse of pre-existing information, for example, previously developed mapping rules for mapping source collection terms to standardized terminology or previously developed classification structure or taxonomy. Such sharing of information may be used to provide a head-start in connection with a new knowledge base creation project, to accommodate multiple users or SMEs working on the same subject area or domain (including at the same time) or in various other information sharing contexts. The invention is described below in connection with supporting multiple SMEs developing a SMM that involves working in the same domains or at least one common domain. While this example aptly illustrates the information sharing functionality, it will be appreciated that the invention is not limited to this context.

Two issues that are addressed by the Knowledge Builder tool in connection with sharing information are: 1) using or importing only selected information, as may be desired, rather than being limited to using or importing a full knowledge base; and 2) resolving potential conflicts or inconsistencies resulting from multiple users working in a single domain. By addressing these issues as discussed below, benefits of information sharing can be efficiently realized.

A. Domain Management

Figure 22:
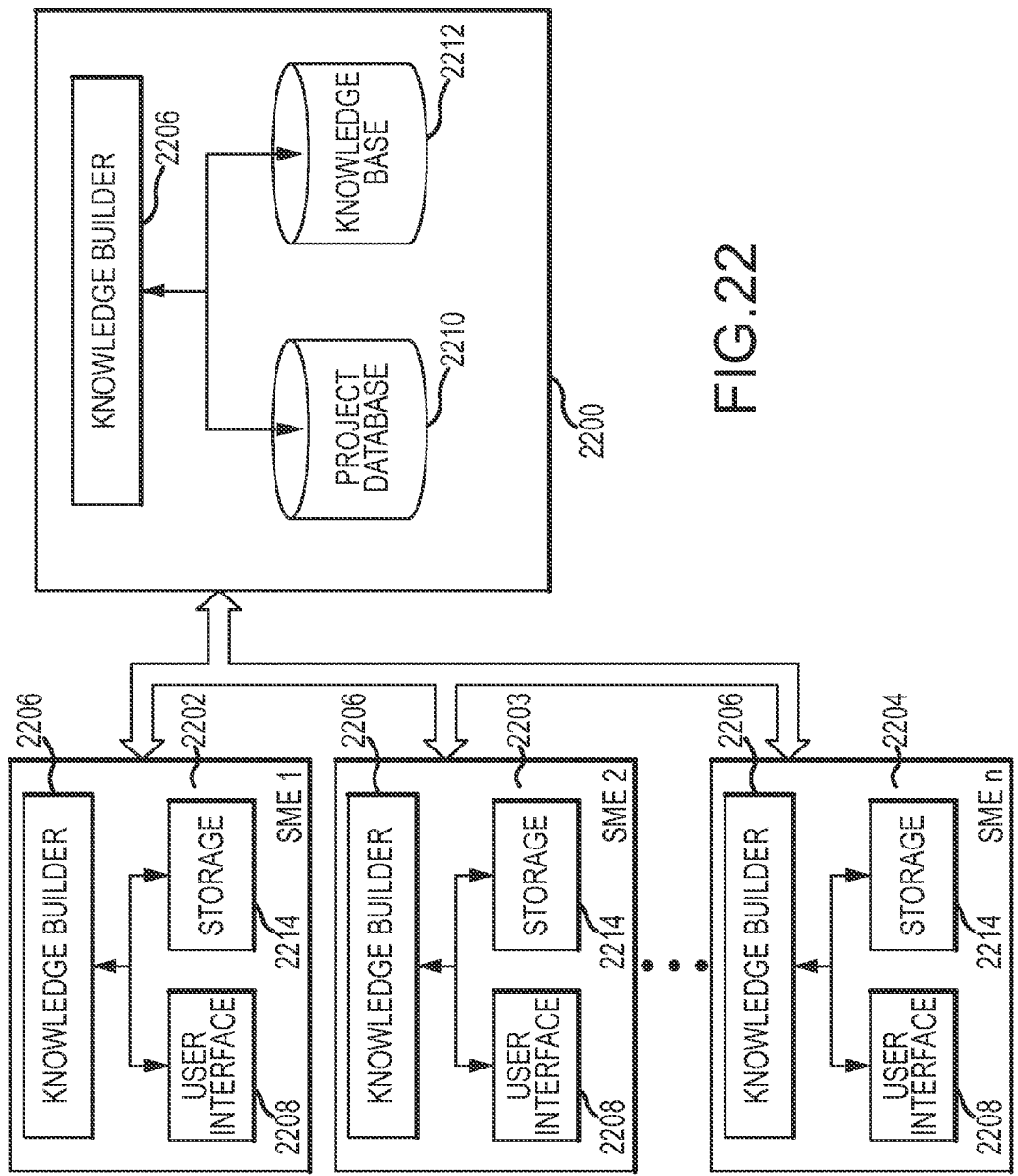
FIG. 22 is a schematic diagram of a transformation information sharing system in accordance with the present invention.

FIG. 22 generally illustrates an architecture for an information sharing environment involving multiple SMEs. For purposes of illustration, this is shown as involving a server-client model involving server 2200 and clients 2202-2204. As will be described in more detail below, certain knowledge base development functionality including information sharing functionality is executed by a Knowledge Builder tool 2206. In the illustrated embodiment, the functionality of this tool is illustrated as being distributed over the server 2200 and client 2202-2204 platforms, however, it will be appreciated that other hardware implementations are possible.

The SMEs use graphical interfaces 2208 at the clients 2202-2204, in the illustrated embodiment, to access a project database 2210 and a developing knowledge base 2212, each of which is schematically illustrated, in this example, as residing at the server 2202. The project database 2210 may include, for example, the collection of source data that is to be transformed. The knowledge base 2212 includes classification or taxonomy structure, rules and the like, that have been developed by the SMEs or others. The illustrated clients 2202-2204 also include storage 2214, for storing rules and the like under development, or to temporarily store a version of the knowledge base or portions thereof, as will be described in more detail below.

The Knowledge Builder tool includes a Domain Management module to address the issue of using or importing only selected information. The Domain Management module segments the various rules in the developing knowledge base into smaller, easily managed compartments. More specifically, the knowledge base may be graphically represented in the familiar form of files and folders.

Figure 23:
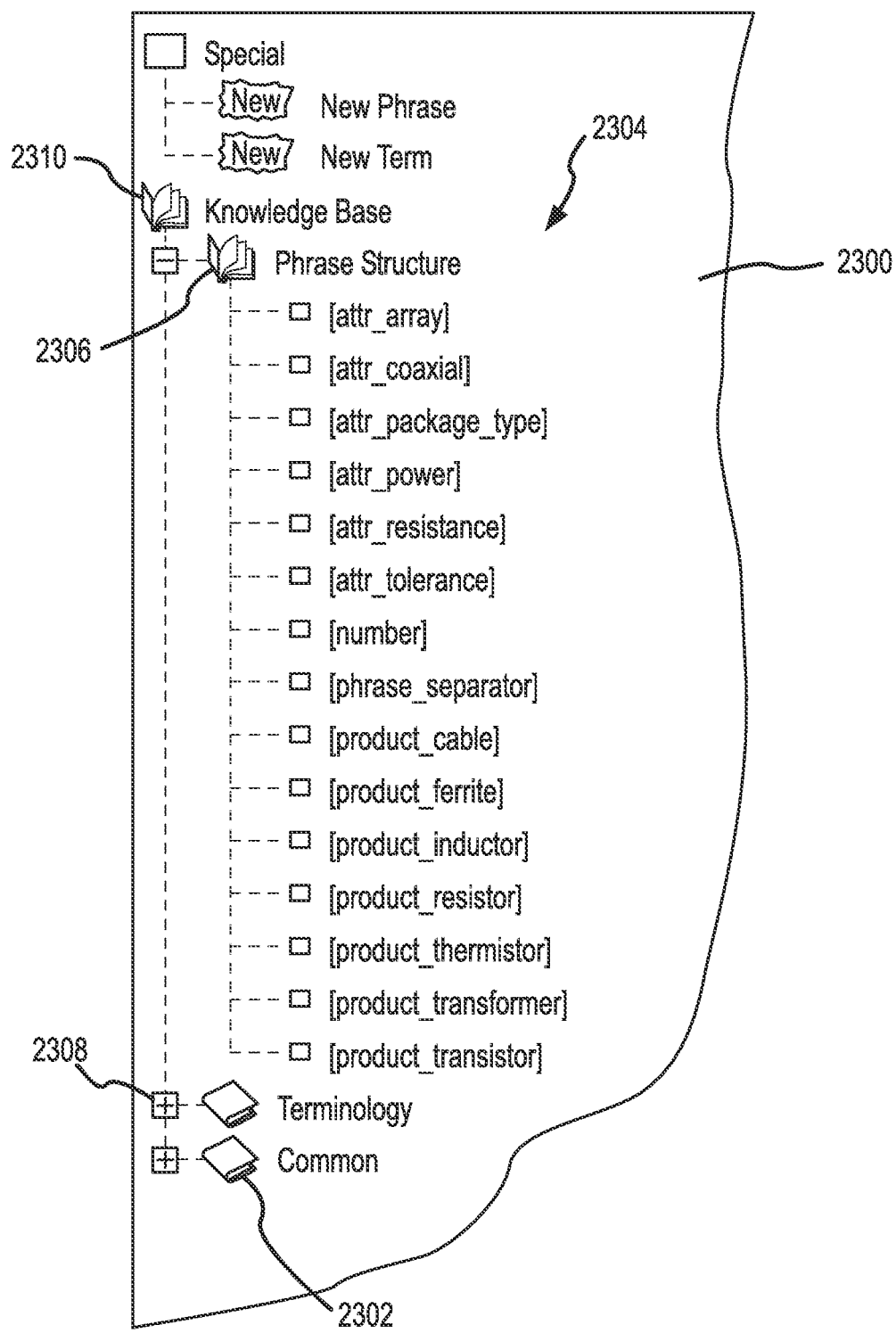

This is illustrated in FIG. 23. In the illustrated example, a new knowledge base project is started with at least two domain folders as shown in panel 2300 of a graphical user interface. Specifically, the knowledge base includes a default domain folder and the common folder 2302. The default domain folder includes phrases and terms that have not been assigned to other domain folders.

These phrases and terms appear in the knowledge base tree 2304 under the nodes labeled "Phrase Structure" 2306 and "Terminology" 2308 directly under the "Knowledge Base" node 2310. Initially, the common folder does not contain any phrases or terms.

The Knowledge Builder tool attempts to automatically place the rules into the appropriate domain folder when they are created. If a domain has not been specified, all created rules are placed in the phrase structure or terminology folders 2306 or 2308 under the knowledge base node 2310. When a new domain is created, the Knowledge Builder tool continues to place rules in the phrase structure or terminology folders 2306 or 2308 until the user manually drags the rules into the new domain. Thereafter, when new rules are created, the Knowledge Builder tool analyzes the new rules to determine whether the new rules are related to the rules in the new folder. If so, the tool will automatically place the newly created rules in the same folder. Such analysis may involve consideration of the associated terminology or any identification of a classification or other taxonomical structure, for example, dependencies and references as described below.

Domains can be nested to any level. When a domain is created the Knowledge Builder tool automatically creates a common folder at the same level. Whenever a subdomain is created the system creates a sub common folder that is initially empty. If an additional subdomain is created and populated with rules, the Knowledge Builder tool will automatically move rules common to the two subdomains into the sub common. The tool moves rules into and out of common domains as additional rules are created and depending on where they are positioned within the domain hierarchy.

The user can also move phrase rules from one domain to another. As phrases are moved into a domain, related phrases and terminal rules are also moved either into the same domain or into the appropriate common domain. For improved efficiency, top-level phrased rules can be moved thereby implicitly dragging related phrase and terminal rules into a domain.

A user can also move domain folders into other domains. When a domain folder is moved, all of the associated rules are also moved. This can also create additional common folders. As noted above, information sharing can facilitate creation of new knowledge bases. In this regard, when a new project is created, the user can select a single domain from an existing project to import into the new project. Multiple domains can be imported in this manner with any resulting inconsistencies addressed as discussed below.

1. Domain Creation

Figure 24:
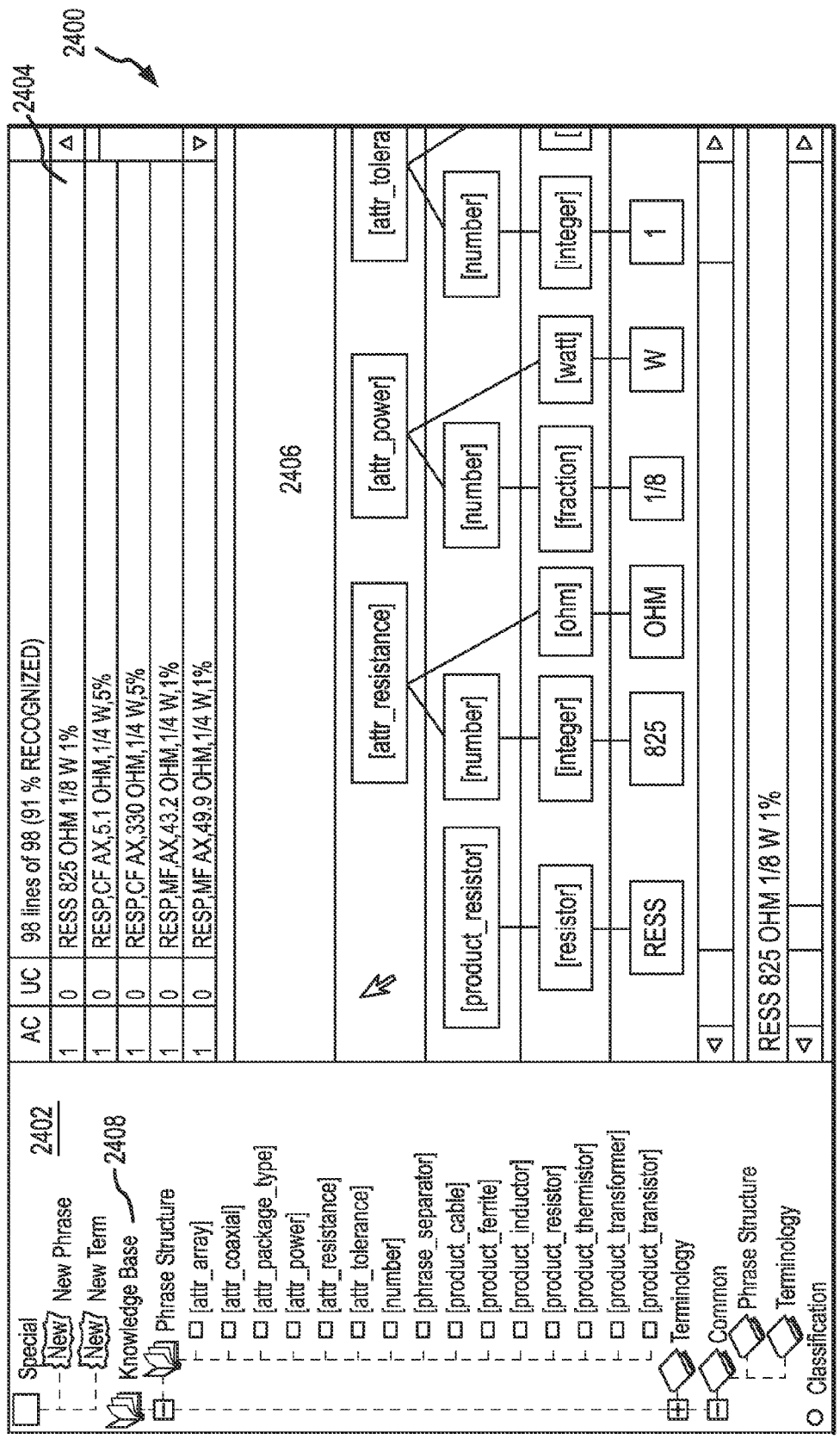

A fundamental step in the process of knowledge base development is domain creation. Domain creation can be accomplished using the Knowledge Builder tool. In this regard, FIG. 24 illustrates a graphical user interface 2400 that may be displayed upon launching the Knowledge Builder tool. The graphical user interface 2400 generally includes a knowledge base structure or classification panel 2402, a source collection or project panel 2404, and a taxonomy or parse tree panel 2406. The interoperation of these panels is described below.

Figure 25:
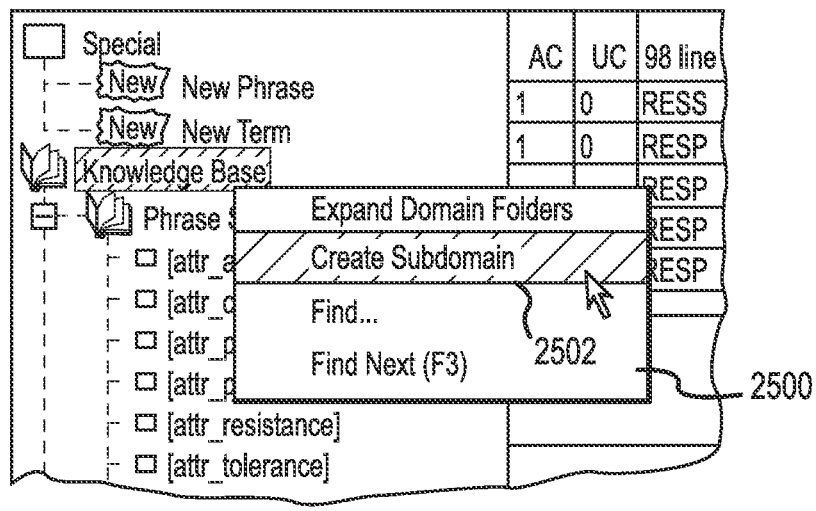
Figure 26:
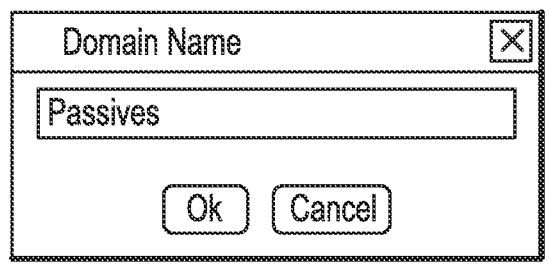
Figure 27:
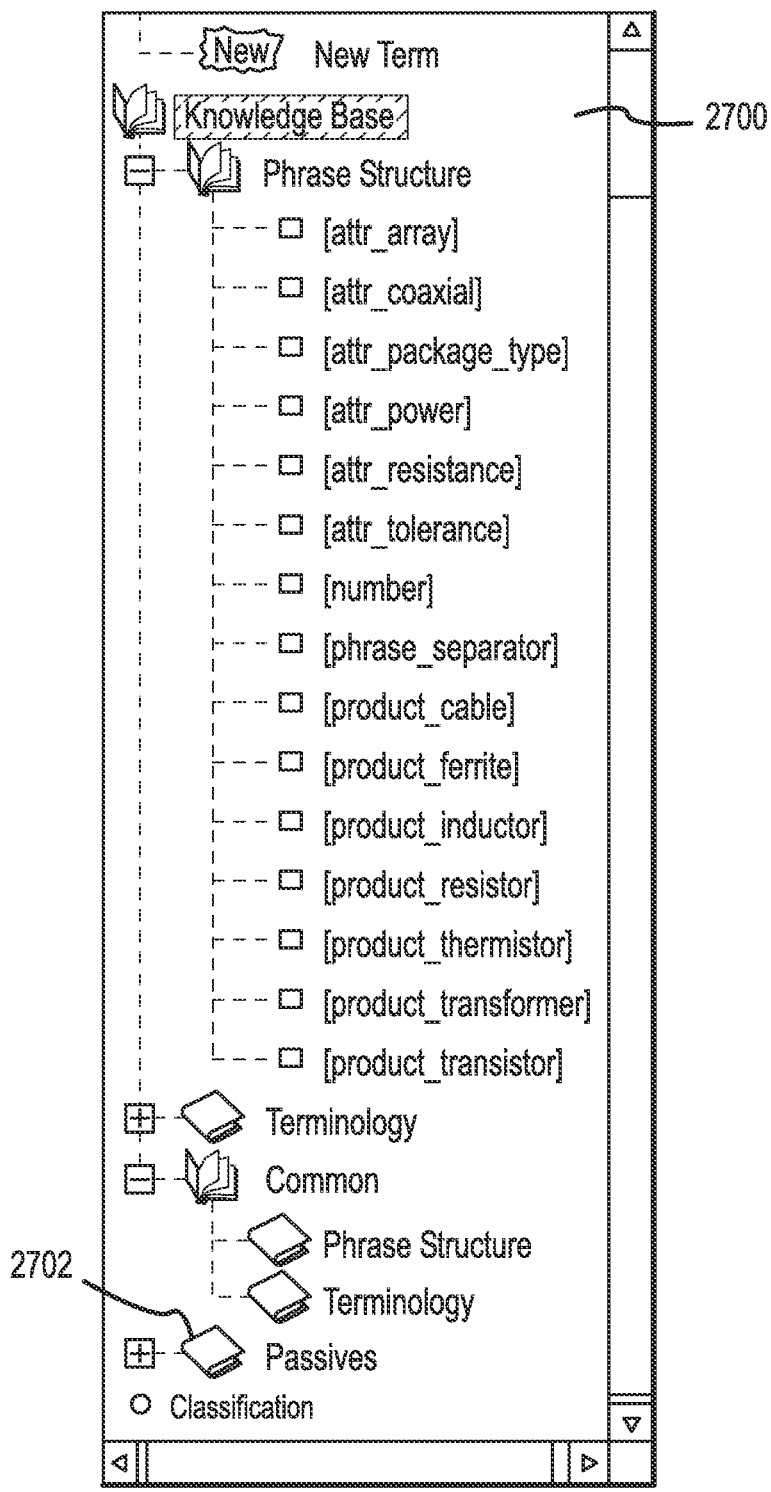

To create a domain, the user can right-click on the knowledge base node 2408 of the knowledge base panel 2402. This causes a pop-up window 2500 to be displayed as shown in FIG. 25. From the pop-up window 2500, the user selects the create subdomain entry 2502. The user is then prompted to name this first domain as shown in FIG. 26. In the illustrated example, the new domain is named "passives." As shown in FIG. 27, the knowledge base panel 2700 is then updated to include a folder icon 2702 for the "passives" domain.

2. Domain Editing

A variety of domain editing functions are supported by the Knowledge Builder tool including functionality for moving rules, renaming domains and deleting domains. In the example discussed above, rules may be moved into the passives domain after that domain is established. For example, rules may be dragged from their current location in the knowledge base panel to the desired domain folder. Alternatively, rules can be dragged into domain folders using a move rules dialog. To open the move rules dialog, the edit/move rules menu (not shown) is selected and the rule is dragged from the knowledge base tree onto the desire domain in the resulting dialog. The advantage of using the move rules dialog is minimizing scrolling through the knowledge base tree.

Domains may be renamed by selecting the appropriate domain, right-clicking and selecting the rename domain menu item. A domain name dialog is then opened as shown above and can be used to enter the new name.

Domains may be deleted by selecting the appropriate domain, right-clicking and selecting the delete domain menu item. It should be noted that the associated rules are not deleted. They move to the next level in the knowledge base tree. This may involve moving rules to other domains, other common folders or root folders. In the illustrated implementation, it is not possible to simultaneously delete domains and associated rules by deleting only the domain (though such functionality could optionally be supported). Individual rules are deleted either before or after the domain itself is deleted.

3. Domain Reuse

Figure 28:
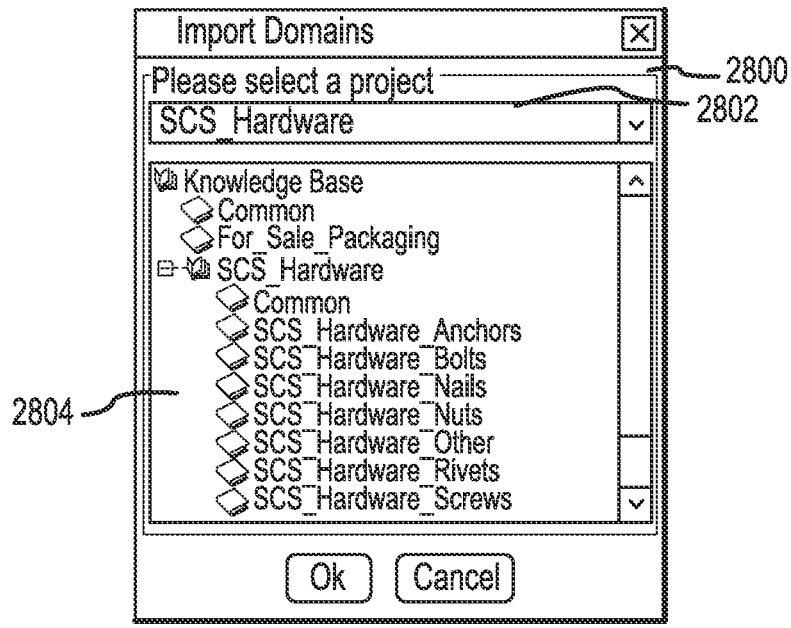
Figure 29:
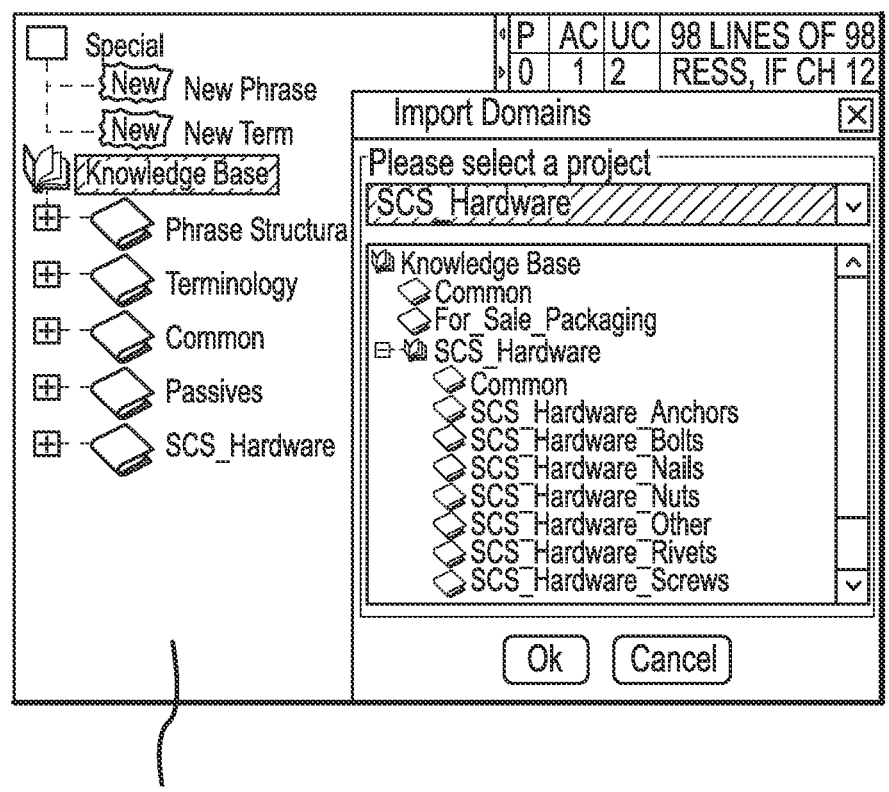

As noted above, one of the advantages of domains is that they may be imported into a new project without importing the entire prior project. This allows for more efficient reuse of knowledge previously created. To import a domain from an existing project, the file/input domain's menu item is selected. This opens an import domain's dialog box 2800 as shown in FIG. 28. A pull-down menu 2802 can then be utilized to select the project from which the user wishes to import a domain. Panel 2804 of the dialog box 2800 displays the knowledge base tree from the selected project. The desired domain can then be dragged to the target position and the knowledge base tree of knowledge base panel 2900 as shown in FIG. 29.

B. Multi-User Functionality

The discussion above described how domains can be created, populated and edited. These same processes may be used by multiple SMEs to jointly develop a knowledge base. For example, the developing database may be accessed on a server by multiple SMEs at different workstations via a LAN, WAN or the like. Each of the SMEs may import particular domains on which to work. In order to accommodate such multi-user development, it is useful to provide a mechanism for resolving conflicts or ambiguities. Such conflicts or ambiguities may result from inconsistent mapping of terms, inconsistent rule definitions or the like, which may be identified based on dependency and reference relationships as described below.

There are a number of ways that such conflicts and ambiguities can be avoided or resolved. For example, when one SME selects a domain for editing or extension, other SMEs may be locked out of that domain so as to substantially avoid conflicts and inconsistencies. Such an implementation may be practical in the context of the present invention because the knowledge base is divided into multiple domains, thus allowing for concurrent access to selected portions of the knowledge base. However, it is often desirable to allow multiple SMEs to concurrently work on the same domain, e.g., to more rapidly process a large volume of data.

Many architectures are possible for resolving conflicts or ambiguities in the case of multiple SMEs working on a single domain. For example, one definitive version of the domain may be retained, for example, at the server. Each SME may then "check-out" a version of the domain for revision and extension. When a version of the domain is checked back-in, the revisions and extensions may be analyzed relative to pre-defined rules. Thus, the rules may cause the Knowledge Builder tool to accept revisions and extensions that do not result in conflicts relative to the definitive version and reject all other revisions or extensions. Alternatively, revisions and extensions that result in conflicts or inconsistencies may be identified so that they can be resolved by an authorized SME, e.g., by selecting one of the conflicting rules and editing the other to be replaced by or consistent therewith. Similarly, upon importing a domain, all conflicts or inconsistencies may be listed or highlighted for arbitration.

Alternatively, one of the SMEs may be designated as dominant with respect to a particular project, such that his revisions and extensions are accepted as definitive. Revisions and extensions by other, subservient SMEs would then be rejected or harmonized with the knowledge base of the dominant SME by arbitration rules as discussed above. Further, rather than checking-out and checking back-in domain versions as discussed above, arbitration can be executed in real time as knowledge base development is occurring. For example, if an SME proposes that the term "mil" be rewritten as "milliliter" and a rule already exists (in the same domain or anywhere within the knowledge base, depending on the specific implementation) that requires "mil" to be rewritten as "Milwaukee," the SME may be immediately notified by way of an error message upon entry of the proposed rule.

Regardless of the specific architecture employed, the Knowledge Builder tool executes logic for identifying or preventing conflicts and inconsistencies. This may be based on dependencies and references. A rule dependency is a relationship between two rules. The dependency is a second rule that must be defined in order for the first rule to be valid. Only phrase structure rules have dependencies. A first structure rule's dependency set is that set of rules that appear as constituents in its productions.

Figure 30:
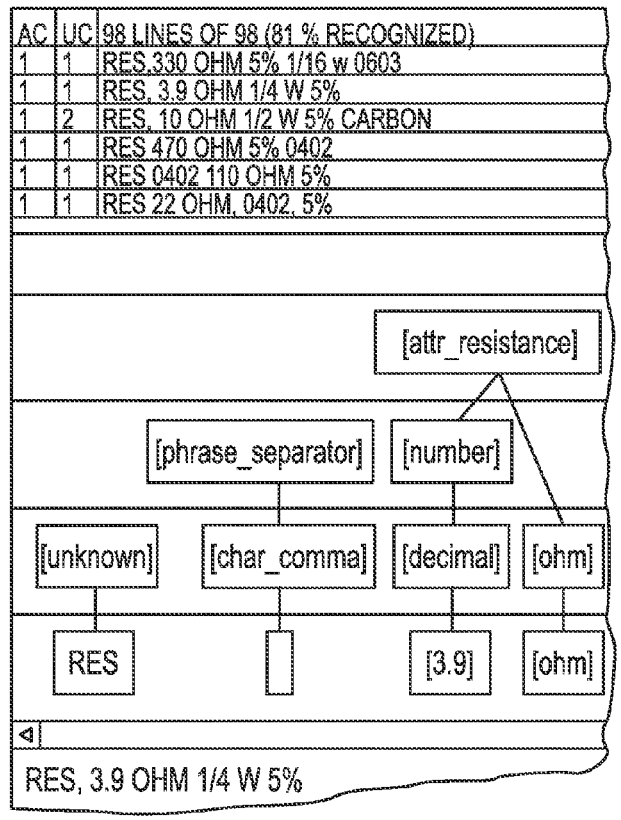

Those dependencies are apparent by inspecting a parse tree of the knowledge base panel. Thus, the rule corresponding to a parent node in a parse tree is said to depend on any rule corresponding to child nodes. In the example of FIG. 30, [attr_resistance] has dependencies on [number] and [ohm], and [number] has at least a dependency on [period] that is apparent in this particular parse tree. Other parse trees may reveal other [number] dependencies, e.g., [integer] and [fraction].

Figure 31:
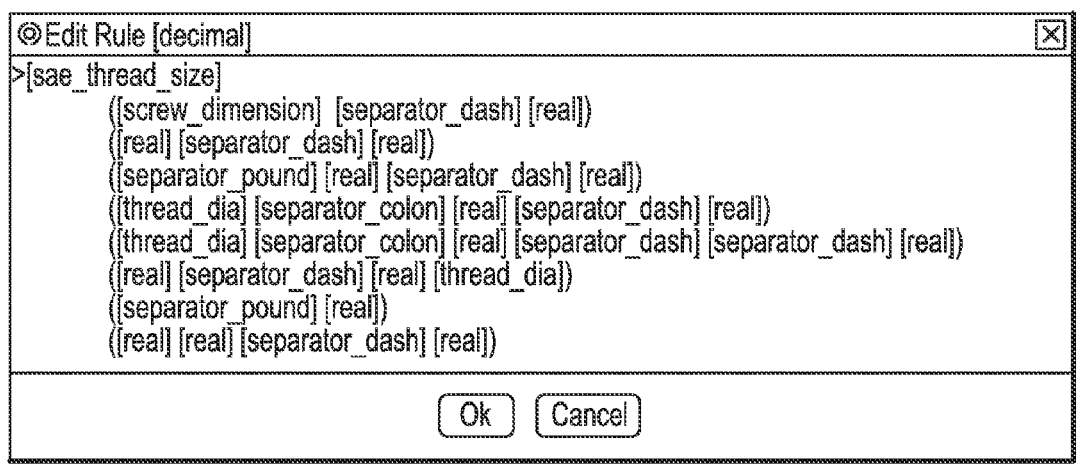

It will be appreciated that one may not be able to see all dependencies in a single parse tree. A phrase structure rule's productions define all possible dependencies. Thus, one can manually edit a rule to view all dependencies. In the example of FIG. 31, [sae_thread_size] has dependencies on [screw_dimension], [thread_dia], [real], [separator_-], [separator_pound] and [separator_colon].

References are the inverse of dependencies. A reference is one of possibly several rules that depends on the current rule. In the example above, rules [screw_dimension], [thread_dia], [real], [separator_-], [separator_pound] and [separator_colon] are each referenced by [sae_thread_size], although each may be referenced by other rules, too.

One would have to inspect the entire grammar to determine all references, so the Knowledge Builder tool provides a utility to get a list of references for any rule. The utility is accessed by right-clicking on any rule in the knowledge tree. A menu is then displayed that includes the entry "get references." By selecting the "get references" item, a display is provided as shown in FIG. 32.

In general, terminology rules do not have dependencies although any one terminology rule may have many references.

The rules that govern legal dependencies among the domains are aimed at keeping knowledge contained in each domain as self sufficient as possible. An exception is that knowledge that is shared among multiple domains is stored in a Common domain. There may be several Common domains in a single project. A Common domain is automatically added to a domain when a child domain is created there.

A grammar rule that resides in some domain may have dependencies on any of the following objects: any rule that resides in the same domain; any rule that resides in a child or descendant domain; and any rule that resides in a Common domain that is a child of a parent or ancestor domain. Thus, the scope of a domain is limited to that domain, any child or descendant domain, and any Common domain that is the child of a parent or ancestor domain.

Figure 33:
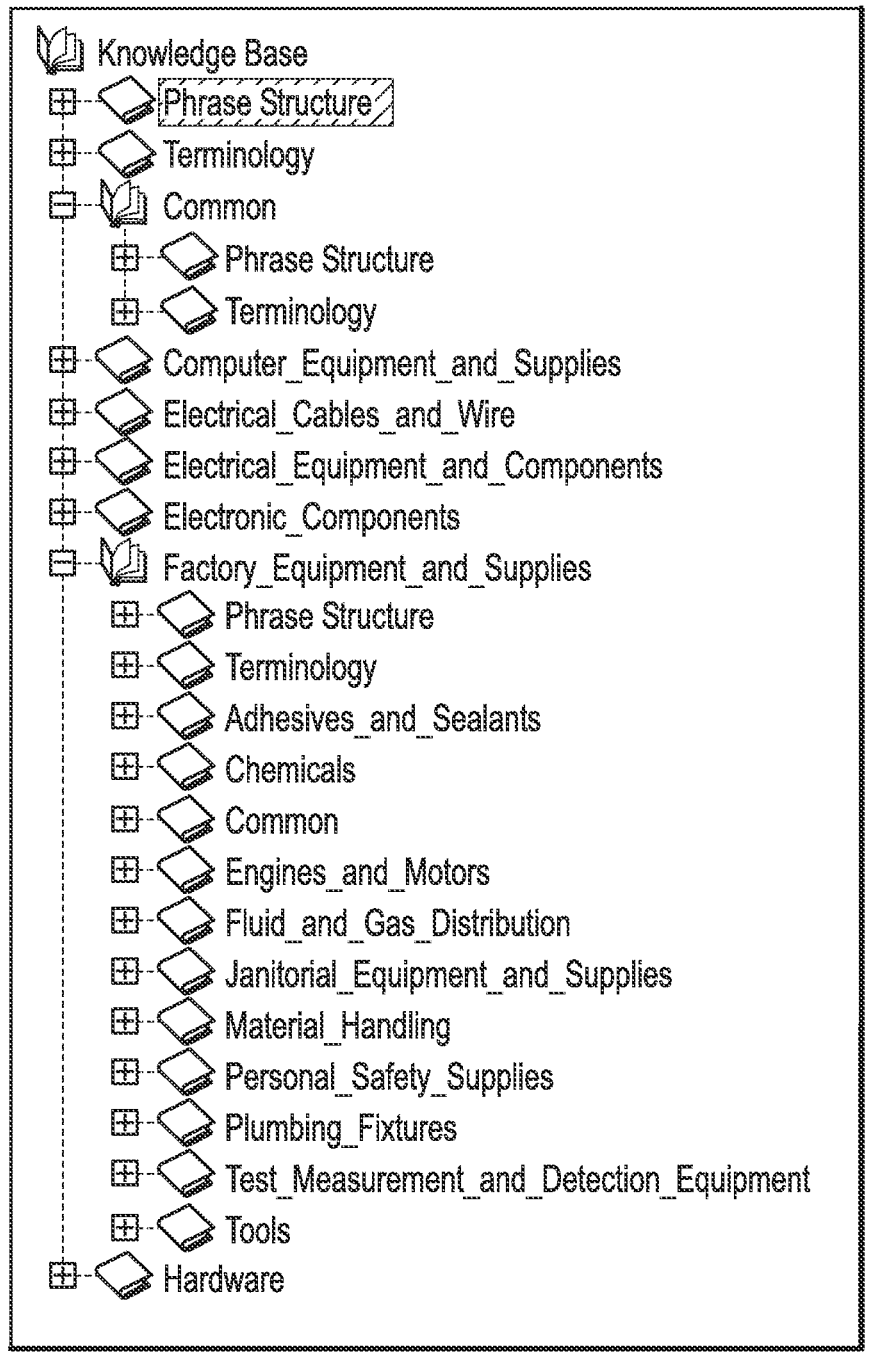

Referring to FIG. 33, any rule in FactoryEquipment_and_supplies may have dependencies on all rules in adhesives_and_sealants, chemicals, Common, engines_and_motors, and any other of its subdomains, because they are all children and in the top level Common. On the other hand, a rule in FactoryEquipment_and_supplies may not have dependencies on any rules in ComputerEquipment_and_supplies hardware, or other siblings. Nor may it reference rules at the root level in the "phrase structure" and "terminology" folders immediately under the "knowledge base" node. Likewise, "chemicals" may not have dependencies on "tools," "hardware," or the root domain, but rules in "chemicals" may reference the factory equipment Common and the root Common.

Thus, the assignment of a rule to a domain and other operations on domains are governed by dependencies among rules. Whether an operation is legal is governed by such dependencies and automatic assignments are governed by such dependencies. Dependencies among rules are used to govern domain operations in order to preserve a grammar consistency and to enable the use of domains as containers for moving knowledge from one project to another. Any branch in a domain hierarchy, if copied to a new project, should act as consistent and correct grammar. As a result, consistency is constantly maintained by inspecting dependencies among rules when rules or domains are moved or when new productions and new rules are introduced or when existing rules are edited manually.

This is illustrated by the example of FIG. 34. FIG. 34 generally illustrates a grammar. If a user creates a new domain "PassiveElectronics" and new subdomains "resistors" and "capacitors" under it, a new Common will automatically be inserted under "PassiveElectronics."

In the illustrated example, the rule [resistor] has no dependencies. If one drags it to "resistors," no other rules will move there. However, if the user was to drag [product_resistor] to "resistors," more than half the rules in the grammar will be automatically moved there, including [res_type], [variable], [carbon_film], [resistance], [number], and [ohms] and any other direct or indirect dependency.

Now, if the user moves [capacitor] to "capacitors," only the one rule moves. If, instead, the rule [product_capacitor] is moved, all the remaining rules move to "capacitors" too. However, several other rules are moved to PassiveElectronics: Common. Those are the rules that are referenced, either directly or indirectly by rules in resistors_and_capacitors, including [variable], [number], [tolerance], and [percent], all which have first been moved to "resistors."

Now consider the grammar rules illustrated in FIG. 35. The user may insert a new domain at the root called "hardware" and then drag [screw_variety] into the new domain. All of the new rules are automatically assigned to "hardware." But [number], previously assigned to PassiveElectronics: Common, is now moved instead to Common under the root. This is because the root is the only ancestor common to "hardware," "resistors" and "capacitors," and [number], which has references in all three domains and may only be assigned to the Common under the root.

Thus, the Knowledge Builder tool uses dependencies and references for a variety of purposes including governing whether an operation is legal.

Figure 36:
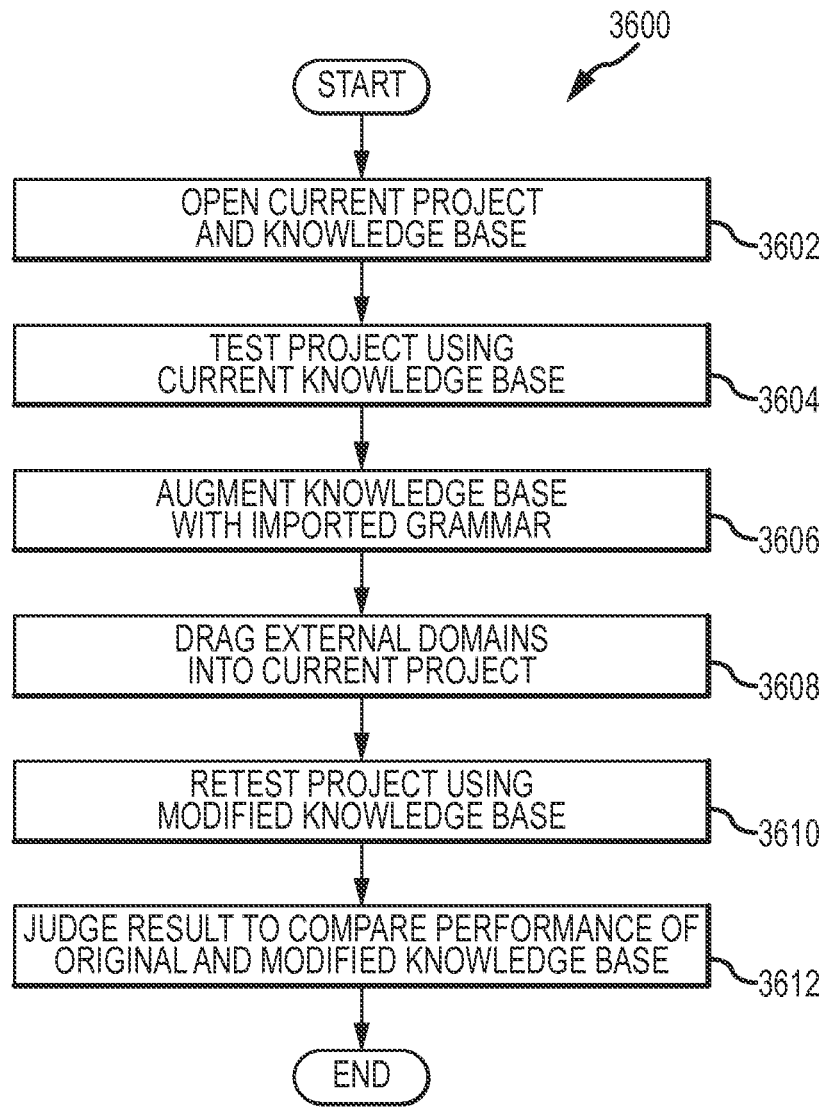
FIG. 36 is a flowchart illustrating an information import and testing process in accordance with the present invention.

FIG. 36 is a flow chart illustrating a process 3600 for augmenting a grammar from component domains. The process 3600 is initiated by opening 3602 the current project and knowledge base. The current project includes a source listing that is to be transformed. The user then tests 3604 the current project using the current knowledge base and saves the result for regression testing. Next, the user augments 3606 the knowledge base from a grammar in an external project, as described above. In this regard, the user may drag 3608 one or more domains from the external project into the current project. The Knowledge Builder tool then checks for inconsistencies and conflicts, for example, based on the dependency and reference listings. Each inconsistency and conflict is identified to the user who responds to each, for example, by harmonizing such inconsistencies and conflicts. The user can then retest 3610 the project using the modified knowledge base and run a further regression test with the previously saved data. The user then judges 3612 the result to determine whether the original knowledge base or the modified knowledge base is more effective. The Knowledge Builder tool may also analyze the regression test to identify the sources of progressions and regressions so as to facilitate trouble shooting.

The present invention thus allows for knowledge sharing for a variety of purposes including facilitating the processing of developing a new knowledge base and allowing multiple users to work on a single project, including simultaneous development involving a common domain. In this manner, the process for developing a knowledge base is significantly streamlined.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:
1. A method utilizing at least one computing device for searching stored data, comprising steps of:
providing a list of potential search terms pertaining to a subject matter of interest, wherein the list of potential search terms is generated independent of the stored data;
identifying source terms in a source form from the stored data;
establishing a set of rules for transforming the potential search terms from a first form to a standardized form and for transforming the source terms in the source form to the standardized form, wherein the standardized form differs from both the first form and the source form with respect to at least one of linguistics and syntax;
transforming, using the set of rules, a given term of the potential search terms, thereby providing a transformed potential search term in the standardized form, wherein at least two separate terms from the list of potential search terms in the first form correspond to a first single term in the standardized form;
transforming, using the set of rules, a given term of the source terms, thereby providing a transformed source term in the standardized form, wherein two separate terms from the source terms correspond to a second single term in the standardized form;
associating the transformed potential search term and the transformed source term with a common classification structure;
receiving a search request comprising one term of the list of potential search terms; and using the transformed potential search term corresponding to the one term of the potential search terms of the search request relative to the common classification structure having the transformed source term to search the stored data in response to the search request;

wherein the transforming steps and the associating step occur prior to the receiving of the search request.

2. The method as set forth in claim 1, wherein the given term of the potential search terms is identical to the given term of the source terms of the stored data.

3. The method as set forth in claim 1, wherein the steps of transforming, using the set of rules, each comprises converting the corresponding given term to the standardized form and then translating the standardized form.

4. The method as set forth in claim 1, wherein the steps of transforming, using the set of rules, each comprises associating contextual metadata with the corresponding given term, wherein the contextual metadata assists in searching the stored data.

5. A searchable data system, comprising:
- a controller comprising a hardware processor for processing a search request;
- a first storage structure for storing a first knowledge base for transforming potential search terms from a first form to a standardized form, wherein at least two separate potential search terms in the first form correspond to a single standardized term in the standardized form;
- an input port for receiving the search request including a search term, wherein the input port is in operative communication with the controller;
- a second storage structure for storing a second knowledge base for relating the transformed potential search terms in the standardized form to a defined classification structure of a subject matter of the searchable data system, wherein the defined classification structure includes at least one classification having a parent and child relationship, wherein a child classification corresponds to a subset of an associated parent classification in relation to the subject matter;
- logic, executed by the controller for
  - processing the search request, for transforming the search term of the search request into the standardized form using said first knowledge base and
  - identifying the standardized search term, using the second knowledge base, to relate the standardized search term to a determined classification of the defined classification structure, and using the determined classification to relate the standardized search term to at least one term of the potential search terms to access the first storage structure to obtain data responsive to the search request, wherein the controller attempts to relate the at least one potential search term to the child classification prior to attempting to relate the at least one potential search term to the associated parent classification in the event the responsive data is unavailable using the child classification; and an output port for outputting the responsive data from the controller.

6. The system as set forth in claim 5, wherein the defined classification structure includes multiple classifications having parent and child relationships.

7. The method as set forth in claim 6, wherein a given child classification is associated with a plurality of parent classifications.

\* \* \* \* \*